(12) United States Patent
Brown

(10) Patent No.: US 11,899,331 B2
(45) Date of Patent: *Feb. 13, 2024

(54) CONTROL METHOD FOR TINTABLE WINDOWS

(71) Applicant: View, Inc., Milpitas, CA (US)

(72) Inventor: Stephen Clark Brown, San Mateo, CA (US)

(73) Assignee: View, Inc., Milpitas, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 17/008,342

(22) Filed: Aug. 31, 2020

(65) Prior Publication Data

US 2020/0393733 A1 Dec. 17, 2020

Related U.S. Application Data

(63) Continuation of application No. 16/013,770, filed on Jun. 20, 2018, now Pat. No. 10,802,372, which is a continuation of application No. 15/347,677, filed on Nov. 9, 2016, now Pat. No. 10,048,561, which is a continuation-in-part of application No. PCT/US2015/029675, filed on May 7, 2015, and a (Continued)

(51) Int. Cl.
*G02F 1/163* (2006.01)
*G05B 19/048* (2006.01)
*G02B 5/20* (2006.01)
*E06B 9/24* (2006.01)

(52) U.S. Cl.
CPC .......... *G02F 1/163* (2013.01); *G05B 19/048* (2013.01); *E06B 2009/2464* (2013.01); *G02B 5/20* (2013.01); *Y02P 90/84* (2015.11)

(58) Field of Classification Search
CPC ..... G02F 1/163; G02F 1/1523; G05B 19/048; Y02P 90/84; E06B 2009/2464; G02B 5/20
USPC .................... 359/245, 265, 275, 296; 700/11
See application file for complete search history.

(56) References Cited

U.S. PATENT DOCUMENTS

| | | | |
|---|---|---|---|
| 3,963,347 A | 6/1976 | Segre et al. | |
| 4,355,896 A | 10/1982 | Laue et al. | |

(Continued)

FOREIGN PATENT DOCUMENTS

| | | | |
|---|---|---|---|
| CN | 1333807 A | 1/2002 | |
| CN | 1359479 A | 7/2002 | |

(Continued)

OTHER PUBLICATIONS

U.S. Notice of Allowance dated Aug. 7, 2020 in U.S. Appl. No. 15/891,866.

(Continued)

*Primary Examiner* — William Choi
(74) *Attorney, Agent, or Firm* — Weaver Austin Villeneuve & Sampson LLP; Brian D. Griedel

(57) ABSTRACT

A method of controlling tint of a tintable window to account for occupant comfort in a room of a building. The tintable window is between the interior and exterior of the building. The method predicts a tint level for the tintable window at a future time based on a penetration depth of direct sunlight through the tintable window into the room at the future time and space type in the room. The method also provides instructions over a network to transition tint of the tintable window to the tint level.

6 Claims, 50 Drawing Sheets

Related U.S. Application Data continuation-in-part of application No. 13/772,969, filed on Feb. 21, 2013, now Pat. No. 9,638,978.

(60) Provisional application No. 61/991,375, filed on May 9, 2014.

(56) References Cited

U.S. PATENT DOCUMENTS

| | | | |
|---|---|---|---|
| 5,124,833 A | 6/1992 | Barton et al. | |
| 5,170,108 A | 12/1992 | Peterson et al. | |
| 5,204,778 A | 4/1993 | Bechtel | |
| 5,220,317 A | 6/1993 | Lynam et al. | |
| 5,290,986 A | 3/1994 | Colon et al. | |
| 5,353,148 A | 10/1994 | Eid et al. | |
| 5,365,365 A | 11/1994 | Ripoche et al. | |
| 5,379,146 A | 1/1995 | Defendini | |
| 5,379,215 A | 1/1995 | Kruhoeffer et al. | |
| 5,384,578 A | 1/1995 | Lynam et al. | |
| 5,402,144 A | 3/1995 | Ripoche | |
| 5,451,822 A | 9/1995 | Bechtel et al. | |
| 5,583,972 A | 12/1996 | Miller | |
| 5,598,000 A | 1/1997 | Popat | |
| 5,621,526 A | 4/1997 | Kuze | |
| 5,663,621 A | 9/1997 | Popat | |
| 5,673,028 A | 9/1997 | Levy | |
| 5,694,144 A | 12/1997 | Lefrou et al. | |
| 5,760,558 A | 6/1998 | Popat | |
| 5,764,402 A | 6/1998 | Thomas et al. | |
| 5,822,107 A | 10/1998 | Lefrou et al. | |
| 5,900,720 A | 5/1999 | Kallman et al. | |
| 5,956,012 A | 9/1999 | Turnbull et al. | |
| 5,973,818 A | 10/1999 | Sjursen et al. | |
| 5,973,819 A | 10/1999 | Pletcher et al. | |
| 5,978,126 A | 11/1999 | Sjursen et al. | |
| 6,002,511 A | 12/1999 | Varaprasad et al. | |
| 6,039,390 A | 3/2000 | Agrawal et al. | |
| 6,039,850 A | 3/2000 | Schulz et al. | |
| 6,055,089 A | 4/2000 | Schulz et al. | |
| 6,064,949 A | 5/2000 | Werner et al. | |
| 6,084,231 A | 7/2000 | Popat | |
| 6,084,700 A | 7/2000 | Knapp et al. | |
| 6,125,327 A | 9/2000 | Kalenian | |
| 6,130,448 A | 10/2000 | Bauer et al. | |
| 6,130,772 A | 10/2000 | Cava | |
| 6,163,756 A | 12/2000 | Baron et al. | |
| 6,222,177 B1 | 4/2001 | Bechtel et al. | |
| 6,262,831 B1 | 7/2001 | Bauer et al. | |
| 6,266,063 B1 | 7/2001 | Baron et al. | |
| 6,386,713 B1 | 5/2002 | Turnbull et al. | |
| 6,398,118 B1 | 6/2002 | Rosen | |
| 6,407,468 B1 | 6/2002 | LeVesque et al. | |
| 6,407,847 B1 | 6/2002 | Poll et al. | |
| 6,449,082 B1 | 9/2002 | Agrawal et al. | |
| 6,471,360 B2 | 10/2002 | Rukavina et al. | |
| 6,493,128 B1 | 12/2002 | Agrawal et al. | |
| 6,535,126 B2 | 3/2003 | Lin et al. | |
| 6,567,708 B1 | 5/2003 | Bechtel et al. | |
| 6,614,577 B1 | 9/2003 | Yu et al. | |
| 6,795,226 B2 | 9/2004 | Agrawal et al. | |
| 6,819,367 B1 | 11/2004 | Cava | |
| 6,829,511 B2 | 12/2004 | Bechtel et al. | |
| 6,856,444 B2 | 2/2005 | Ingalls et al. | |
| 6,897,936 B1 | 5/2005 | Li et al. | |
| 6,940,627 B2 | 9/2005 | Freeman et al. | |
| 6,965,813 B2 | 11/2005 | Granqvist et al. | |
| 7,085,609 B2 | 8/2006 | Bechtel et al. | |
| 7,111,952 B2 | 9/2006 | Veskovic | |
| 7,133,181 B2 | 11/2006 | Greer | |
| 7,215,318 B2 | 5/2007 | Turnbull et al. | |
| 7,277,215 B2 | 10/2007 | Greer | |
| 7,304,787 B2 | 12/2007 | Whitesides et al. | |
| 7,417,397 B2 | 8/2008 | Berman et al. | |
| 7,542,809 B2 | 6/2009 | Bechtel et al. | |
| 7,548,833 B2 | 6/2009 | Ahmed | |
| 7,567,183 B2 | 7/2009 | Schwenke | |
| 7,588,067 B2 | 9/2009 | Veskovic | |
| 7,610,910 B2 | 11/2009 | Ahmed | |
| 7,800,812 B2 | 9/2010 | Moskowitz | |
| 7,817,326 B1 | 10/2010 | Rennig et al. | |
| 7,822,490 B2 | 10/2010 | Bechtel et al. | |
| 7,873,490 B2 | 1/2011 | MacDonald | |
| 7,941,245 B1 | 5/2011 | Popat | |
| 7,950,827 B2 | 5/2011 | Veskovic | |
| 7,963,675 B2 | 6/2011 | Veskovic | |
| 7,972,021 B2 | 7/2011 | Scherer | |
| 7,977,904 B2 | 7/2011 | Berman et al. | |
| 7,990,603 B2 | 8/2011 | Ash et al. | |
| 8,004,739 B2 | 8/2011 | Letocart | |
| 8,018,644 B2 | 9/2011 | Gustavsson et al. | |
| 8,102,586 B2 | 1/2012 | Albahri | |
| 8,120,292 B2 | 2/2012 | Berman et al. | |
| 8,125,172 B2 | 2/2012 | Berman et al. | |
| 8,164,818 B2 | 4/2012 | Collins et al. | |
| 8,213,074 B1 | 7/2012 | Shrivastava et al. | |
| 8,248,014 B2 | 8/2012 | Berman et al. | |
| 8,254,013 B2 | 8/2012 | Mehtani et al. | |
| 8,270,059 B2 | 9/2012 | Friedman et al. | |
| 8,288,981 B2 | 10/2012 | Zaharchuk et al. | |
| 8,292,228 B2 | 10/2012 | Mitchell et al. | |
| 8,300,298 B2 | 10/2012 | Wang et al. | |
| 8,380,393 B1 | 2/2013 | Ohtomo | |
| 8,432,603 B2 | 4/2013 | Wang et al. | |
| 8,456,729 B2 | 6/2013 | Brown et al. | |
| 8,547,624 B2 | 10/2013 | Ash et al. | |
| 8,582,193 B2 | 11/2013 | Wang et al. | |
| 8,705,162 B2 | 4/2014 | Brown et al. | |
| 8,723,467 B2 | 5/2014 | Berman et al. | |
| 8,764,950 B2 | 7/2014 | Wang et al. | |
| 8,764,951 B2 | 7/2014 | Wang et al. | |
| 8,836,263 B2 | 9/2014 | Berman et al. | |
| 8,864,321 B2 | 10/2014 | Mehtani et al. | |
| 8,902,486 B1 | 12/2014 | Chandrasekhar | |
| 8,934,170 B2 | 1/2015 | Takeda et al. | |
| 8,976,440 B2 | 3/2015 | Berland et al. | |
| 9,016,630 B2 | 4/2015 | Mitchell et al. | |
| 9,030,725 B2 | 5/2015 | Pradhan et al. | |
| 9,078,299 B2 | 7/2015 | Ashdown | |
| 9,081,246 B2 | 7/2015 | Rozbicki | |
| 9,081,247 B1 | 7/2015 | Pradhan et al. | |
| 9,128,346 B2 | 9/2015 | Shrivastava et al. | |
| 9,226,366 B2 | 12/2015 | Orillard et al. | |
| 9,261,751 B2 | 2/2016 | Pradhan et al. | |
| 9,298,203 B2 | 3/2016 | Wenzel | |
| 9,341,912 B2 | 5/2016 | Shrivastava et al. | |
| 9,348,192 B2 | 5/2016 | Brown et al. | |
| 9,404,793 B2 | 8/2016 | Yang et al. | |
| 9,406,028 B2 | 8/2016 | Humann | |
| 9,423,664 B2 | 8/2016 | Brown et al. | |
| 9,454,055 B2 | 9/2016 | Brown et al. | |
| 9,523,902 B2 | 12/2016 | Parker | |
| 9,546,515 B2 | 1/2017 | Hall et al. | |
| 9,574,934 B2 | 2/2017 | Verbeek et al. | |
| 9,638,978 B2 | 5/2017 | Brown et al. | |
| 9,645,465 B2 | 5/2017 | Brown et al. | |
| 9,664,974 B2 | 5/2017 | Kozlowski et al. | |
| 9,668,315 B2 | 5/2017 | Shearer et al. | |
| 9,674,924 B2 | 6/2017 | Lashina et al. | |
| 9,709,869 B2 | 7/2017 | Baumann et al. | |
| 9,807,857 B2 | 10/2017 | Huang | |
| 9,927,674 B2 | 3/2018 | Brown et al. | |
| 9,938,765 B2 | 4/2018 | Berman et al. | |
| 10,048,561 B2 | 8/2018 | Brown et al. | |
| 10,234,596 B2 | 3/2019 | Frank et al. | |
| 10,254,618 B2 | 4/2019 | Parker et al. | |
| 10,316,581 B1 | 6/2019 | Nagel et al. | |
| 10,495,939 B2 | 12/2019 | Brown et al. | |
| 10,520,784 B2 | 12/2019 | Brown et al. | |
| 10,539,854 B2 | 1/2020 | Brown et al. | |
| 10,605,970 B2 | 3/2020 | Blair et al. | |
| 10,690,540 B2 | 6/2020 | Brown et al. | |
| 10,712,627 B2 | 7/2020 | Brown et al. | |
| 10,802,372 B2 * | 10/2020 | Brown | G05B 19/048 |
| 10,908,470 B2 | 2/2021 | Brown et al. | |
| 10,921,675 B2 | 2/2021 | Barnum et al. | |

(56) References Cited

U.S. PATENT DOCUMENTS

| | | |
|---|---|---|
| 10,982,487 B2 | 4/2021 | Ramirez |
| 11,126,057 B2 | 9/2021 | Brown et al. |
| 11,255,722 B2 | 2/2022 | Zedlitz et al. |
| 11,261,654 B2 | 3/2022 | Brown et al. |
| 11,520,207 B2 | 12/2022 | Brown et al. |
| 11,635,666 B2 | 4/2023 | Klawuhn et al. |
| 11,674,843 B2 | 6/2023 | Zedlitz et al. |
| 11,719,990 B2 | 8/2023 | Zedlitz et al. |
| 2002/0075472 A1 | 6/2002 | Holton |
| 2002/0135881 A1 | 9/2002 | Rukavina et al. |
| 2002/0144831 A1 | 10/2002 | Kalt |
| 2002/0152298 A1 | 10/2002 | Kikta et al. |
| 2003/0142140 A1 | 7/2003 | Brown et al. |
| 2003/0191546 A1 | 10/2003 | Bechtel et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0108191 A1 | 6/2004 | Su et al. |
| 2004/0135989 A1 | 7/2004 | Klebe |
| 2004/0160322 A1 | 8/2004 | Stilp |
| 2005/0046584 A1 | 3/2005 | Breed |
| 2005/0046920 A1 | 3/2005 | Freeman et al. |
| 2005/0063036 A1 | 3/2005 | Bechtel et al. |
| 2005/0200934 A1 | 9/2005 | Callahan et al. |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0278047 A1 | 12/2005 | Ahmed |
| 2006/0018000 A1 | 1/2006 | Greer |
| 2006/0107616 A1 | 5/2006 | Ratti et al. |
| 2006/0170376 A1 | 8/2006 | Piepgras et al. |
| 2006/0187608 A1 | 8/2006 | Stark |
| 2006/0207730 A1 | 9/2006 | Berman et al. |
| 2006/0209007 A1 | 9/2006 | Pyo et al. |
| 2006/0245024 A1 | 11/2006 | Greer |
| 2007/0002007 A1 | 1/2007 | Tam |
| 2007/0055757 A1 | 3/2007 | Mairs et al. |
| 2007/0067048 A1 | 3/2007 | Bechtel et al. |
| 2007/0162233 A1 | 7/2007 | Schwenke |
| 2007/0285759 A1 | 12/2007 | Ash et al. |
| 2008/0012755 A1 | 1/2008 | Venkatachalam et al. |
| 2008/0018979 A1 | 1/2008 | Mahe et al. |
| 2008/0043316 A2 | 2/2008 | Moskowitz |
| 2008/0283621 A1 | 11/2008 | Quirino et al. |
| 2009/0020233 A1 | 1/2009 | Berman et al. |
| 2009/0027759 A1 | 1/2009 | Albahri |
| 2009/0066157 A1 | 3/2009 | Tarng et al. |
| 2009/0139669 A1 | 6/2009 | Robin |
| 2009/0143141 A1 | 6/2009 | Wells et al. |
| 2009/0187287 A1 | 7/2009 | Bmhnke et al. |
| 2009/0204269 A1 | 8/2009 | Bechtel et al. |
| 2009/0222137 A1 | 9/2009 | Berman et al. |
| 2009/0231092 A1 | 9/2009 | Maegawa et al. |
| 2009/0243732 A1 | 10/2009 | Tarng et al. |
| 2009/0243802 A1 | 10/2009 | Wolf et al. |
| 2009/0254222 A1 | 10/2009 | Berman et al. |
| 2009/0296188 A1 | 12/2009 | Jain et al. |
| 2009/0323160 A1 | 12/2009 | Egerton et al. |
| 2010/0039410 A1 | 2/2010 | Becker et al. |
| 2010/0066484 A1 | 3/2010 | Hanwright et al. |
| 2010/0071856 A1 | 3/2010 | Zaharchuk et al. |
| 2010/0082081 A1 | 4/2010 | Niessen et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0245973 A1 | 9/2010 | Wang et al. |
| 2010/0294330 A1 | 11/2010 | Huang et al. |
| 2010/0296081 A1 | 11/2010 | Granqvist |
| 2010/0313476 A1 | 12/2010 | Sethuraman et al. |
| 2010/0315693 A1 | 12/2010 | Lam et al. |
| 2011/0035061 A1 | 2/2011 | Altonen et al. |
| 2011/0046810 A1 | 2/2011 | Bechtel et al. |
| 2011/0063708 A1 | 3/2011 | Letocart |
| 2011/0066302 A1 | 3/2011 | McEwan |
| 2011/0080629 A1 | 4/2011 | Neuman et al. |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0235152 A1 | 9/2011 | Letocart |
| 2011/0249313 A1 | 10/2011 | Letocart |
| 2011/0255142 A1 | 10/2011 | Ash et al. |
| 2011/0260961 A1 | 10/2011 | Burdis |
| 2011/0266137 A1 | 11/2011 | Wang et al. |
| 2011/0266138 A1 | 11/2011 | Wang et al. |
| 2011/0266419 A1 | 11/2011 | Jones et al. |
| 2011/0267674 A1 | 11/2011 | Wang et al. |
| 2011/0267675 A1 | 11/2011 | Wang et al. |
| 2011/0292488 A1 | 12/2011 | McCarthy et al. |
| 2011/0295575 A1 | 12/2011 | Levine et al. |
| 2011/0304898 A1 | 12/2011 | Letocart |
| 2011/0304899 A1 | 12/2011 | Kwak et al. |
| 2012/0007507 A1 | 1/2012 | Niemann et al. |
| 2012/0190386 A1 | 1/2012 | Anderson |
| 2012/0026573 A1 | 2/2012 | Collins et al. |
| 2012/0033287 A1 | 2/2012 | Friedman et al. |
| 2012/0033288 A1 | 2/2012 | Lee et al. |
| 2012/0062975 A1 | 3/2012 | Mehtani et al. |
| 2012/0069420 A1 | 3/2012 | Suzuki |
| 2012/0091315 A1 | 4/2012 | Moskowitz |
| 2012/0095601 A1 | 4/2012 | Abraham et al. |
| 2012/0133315 A1 | 5/2012 | Berman et al. |
| 2012/0147449 A1 | 6/2012 | Bhatnagar et al. |
| 2012/0188627 A1 | 7/2012 | Chen et al. |
| 2012/0194895 A1 | 8/2012 | Podbelski et al. |
| 2012/0200908 A1 | 8/2012 | Bergh et al. |
| 2012/0236386 A1 | 9/2012 | Mehtani et al. |
| 2012/0239209 A1 | 9/2012 | Brown et al. |
| 2012/0261078 A1 | 10/2012 | Adams et al. |
| 2012/0265350 A1 | 10/2012 | Ashdown |
| 2012/0268803 A1 | 10/2012 | Greer |
| 2012/0275008 A1 | 11/2012 | Pradhan et al. |
| 2012/0285630 A1 | 11/2012 | Berman et al. |
| 2012/0293855 A1 | 11/2012 | Shrivastava et al. |
| 2013/0011315 A1 | 1/2013 | Ahmed et al. |
| 2013/0021659 A1 | 1/2013 | Friedman et al. |
| 2013/0038093 A1 | 2/2013 | Snider |
| 2013/0057157 A1 | 3/2013 | Nackaerts et al. |
| 2013/0057937 A1 | 3/2013 | Berman et al. |
| 2013/0063065 A1 | 3/2013 | Berman et al. |
| 2013/0139804 A1 | 6/2013 | Goldberg |
| 2013/0158790 A1 | 6/2013 | McIntyre, Jr. et al. |
| 2013/0173926 A1 | 7/2013 | Morese et al. |
| 2013/0242370 A1 | 9/2013 | Wang |
| 2013/0263510 A1 | 10/2013 | Gassion |
| 2013/0264948 A1 | 10/2013 | Orillard et al. |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0321923 A1 | 12/2013 | Thuot et al. |
| 2014/0043667 A1 | 2/2014 | Bergh et al. |
| 2014/0067733 A1 | 3/2014 | Humann |
| 2014/0083413 A1 | 3/2014 | Bibi et al. |
| 2014/0104667 A1 | 4/2014 | Greer et al. |
| 2014/0145002 A1 | 5/2014 | Caldeira et al. |
| 2014/0160550 A1 | 6/2014 | Brown et al. |
| 2014/0177025 A1 | 6/2014 | Lee et al. |
| 2014/0177028 A1 | 6/2014 | Shrivastava et al. |
| 2014/0236323 A1 | 8/2014 | Brown et al. |
| 2014/0259931 A1 | 9/2014 | Plummer |
| 2014/0262057 A1 | 9/2014 | Chambers et al. |
| 2014/0268287 A1 | 9/2014 | Brown et al. |
| 2014/0288715 A1 | 9/2014 | Beaujeu et al. |
| 2014/0300945 A1 | 10/2014 | Parker |
| 2014/0303788 A1 | 10/2014 | Sanders et al. |
| 2014/0330538 A1 | 11/2014 | Conklin et al. |
| 2014/0371931 A1 | 12/2014 | Lin et al. |
| 2015/0002919 A1 | 1/2015 | Jack et al. |
| 2015/0035440 A1 | 2/2015 | Spero |

(56) References Cited

U.S. PATENT DOCUMENTS

| | | |
|---|---|---|
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0092259 A1 | 4/2015 | Greer et al. |
| 2015/0116811 A1 | 4/2015 | Shrivastava et al. |
| 2015/0122474 A1 | 5/2015 | Peterson |
| 2015/0185581 A1 | 7/2015 | Pradhan et al. |
| 2015/0219975 A1 | 8/2015 | Phillips et al. |
| 2015/0234945 A1 | 8/2015 | Marceau et al. |
| 2015/0293422 A1 | 10/2015 | Pradhan et al. |
| 2015/0338713 A1 | 11/2015 | Brown |
| 2015/0368967 A1 | 12/2015 | Lundy et al. |
| 2016/0040478 A1 | 2/2016 | Lundy et al. |
| 2016/0054633 A1 | 2/2016 | Brown et al. |
| 2016/0054634 A1 | 2/2016 | Brown et al. |
| 2016/0062332 A1 | 3/2016 | Call et al. |
| 2016/0124283 A1 | 5/2016 | Brown et al. |
| 2016/0154290 A1 | 6/2016 | Brown et al. |
| 2016/0202589 A1 | 7/2016 | Nagel et al. |
| 2016/0203403 A1 | 7/2016 | Nagel et al. |
| 2016/0223878 A1 | 8/2016 | Tran et al. |
| 2016/0258209 A1 | 9/2016 | Berman et al. |
| 2017/0053068 A1 | 2/2017 | Pillai et al. |
| 2017/0075183 A1 | 3/2017 | Brown |
| 2017/0097259 A1 | 4/2017 | Brown et al. |
| 2017/0122802 A1 | 5/2017 | Brown et al. |
| 2017/0123286 A1 | 5/2017 | Parker |
| 2017/0130523 A1 | 5/2017 | Shrivastava et al. |
| 2017/0168368 A1 | 6/2017 | Brown et al. |
| 2017/0219907 A1 | 8/2017 | Brown et al. |
| 2017/0242315 A1 | 8/2017 | Ash et al. |
| 2017/0276542 A1 | 9/2017 | Klawuhn et al. |
| 2017/0279876 A1 | 9/2017 | Prasad et al. |
| 2017/0328121 A1 | 11/2017 | Purdy et al. |
| 2017/0365908 A1 | 12/2017 | Hughes et al. |
| 2018/0073712 A1 | 3/2018 | Baaijens et al. |
| 2018/0129172 A1 | 5/2018 | Shrivastava et al. |
| 2018/0141414 A1 | 5/2018 | Lota |
| 2018/0157141 A1 | 6/2018 | Brown et al. |
| 2018/0162203 A1 | 6/2018 | Boehm |
| 2018/0187484 A1 | 7/2018 | Hebeisen et al. |
| 2018/0231860 A1 | 8/2018 | Podbelski et al. |
| 2018/0284555 A1 | 10/2018 | Klawuhn et al. |
| 2018/0307114 A1 | 10/2018 | Brown et al. |
| 2018/0373111 A1 | 12/2018 | Brown |
| 2019/0025661 A9 | 5/2019 | Brown et al. |
| 2019/0171081 A1 | 6/2019 | Zedlitz et al. |
| 2019/0230776 A1 | 7/2019 | Casey et al. |
| 2019/0250029 A1 | 8/2019 | Zedlitz et al. |
| 2019/0257143 A1 | 8/2019 | Nagel et al. |
| 2020/0007762 A1 | 1/2020 | Dallmeier |
| 2020/0057346 A1 | 2/2020 | Zedlitz et al. |
| 2020/0063490 A1 | 2/2020 | Hebeisen et al. |
| 2020/0072674 A1 | 3/2020 | Baker et al. |
| 2020/0096831 A1 | 3/2020 | Brown et al. |
| 2020/0260556 A1 | 8/2020 | Rozbicki et al. |
| 2020/0355977 A1 | 11/2020 | Brown et al. |
| 2021/0003899 A1 | 1/2021 | Zedlitz et al. |
| 2021/0080319 A1 | 3/2021 | Brown et al. |
| 2021/0190991 A1 | 6/2021 | Frank et al. |
| 2021/0214274 A1 | 7/2021 | Friedman et al. |
| 2021/0325754 A1 | 10/2021 | Brown et al. |
| 2022/0113184 A1 | 4/2022 | Zedlitz et al. |
| 2022/0214592 A1 | 7/2022 | Brown et al. |
| 2022/0326584 A1 | 10/2022 | Khanna et al. |
| 2023/0004059 A1 | 1/2023 | Klawuhn et al. |
| 2023/0152654 A1 | 5/2023 | Klawuhn et al. |
| 2023/0341259 A1 | 10/2023 | Zedlitz et al. |
| 2023/0408883 A1 | 12/2023 | Zedlitz et al. |

FOREIGN PATENT DOCUMENTS

| | | |
|---|---|---|
| CN | 1380482 A | 11/2002 |
| CN | 1097760 C | 1/2003 |
| CN | 2590732 Y | 12/2003 |
| CN | 1534413 A | 10/2004 |
| CN | 1659080 A | 8/2005 |
| CN | 1672189 A | 9/2005 |
| CN | 1704556 A | 12/2005 |
| CN | 1822951 A | 8/2006 |
| CN | 201104273 Y | 8/2008 |
| CN | 101322069 A | 12/2008 |
| CN | 101421558 A | 4/2009 |
| CN | 101438205 A | 5/2009 |
| CN | 101501757 A | 8/2009 |
| CN | 101600604 A | 12/2009 |
| CN | 101641618 A | 2/2010 |
| CN | 101678209 A | 3/2010 |
| CN | 101702036 A | 5/2010 |
| CN | 101707892 A | 5/2010 |
| CN | 101762920 A | 6/2010 |
| CN | 101969207 A | 2/2011 |
| CN | 102168517 A | 8/2011 |
| CN | 102203370 A | 9/2011 |
| CN | 102330530 A | 1/2012 |
| CN | 202110359 U | 1/2012 |
| CN | 202230346 U | 5/2012 |
| CN | 102183237 B | 8/2012 |
| CN | 102749781 A | 10/2012 |
| CN | 202794021 U | 3/2013 |
| CN | 103168269 A | 6/2013 |
| CN | 103370192 A | 10/2013 |
| CN | 103370490 A | 10/2013 |
| CN | 103370649 A | 10/2013 |
| CN | 103370986 A | 10/2013 |
| CN | 203271490 U | 11/2013 |
| CN | 103547965 A | 1/2014 |
| CN | 103649826 A | 3/2014 |
| CN | 103987909 A | 8/2014 |
| CN | 203870367 U | 10/2014 |
| CN | 104181612 A | 12/2014 |
| CN | 104321497 A | 1/2015 |
| CN | 104429162 A | 3/2015 |
| CN | 104685428 A | 6/2015 |
| CN | 104781493 A | 7/2015 |
| CN | 105143586 A | 12/2015 |
| CN | 105549293 A | 5/2016 |
| CN | 106103191 A | 11/2016 |
| CN | 106462023 A | 2/2017 |
| CN | 106971028 A | 7/2017 |
| CN | 108351471 A | 7/2018 |
| DE | 10124673 A1 | 11/2002 |
| DE | 102014220818 A1 | 4/2016 |
| EP | 0445314 A1 | 9/1991 |
| EP | 0869032 | 10/1998 |
| EP | 1078818 A2 | 2/2001 |
| EP | 1441269 | 7/2004 |
| EP | 0835475 B1 | 9/2004 |
| EP | 1510854 A1 | 3/2005 |
| EP | 1417535 | 11/2005 |
| EP | 1619546 A2 | 1/2006 |
| EP | 0920210 | 6/2009 |
| EP | 2161615 | 3/2010 |
| EP | 2357544 | 8/2011 |
| EP | 2590095 A1 | 5/2013 |
| EP | 2764998 A1 | 8/2014 |
| EP | 3114903 A1 | 1/2017 |
| EP | 2517332 B1 | 9/2018 |
| EP | 2638429 B1 | 2/2021 |
| GB | 2462754 A | 5/2004 |
| JP | S61-022897 U | 2/1986 |
| JP | S6282194 A | 4/1987 |
| JP | 63-208830 | 8/1988 |
| JP | 02-132420 | 5/1990 |
| JP | H04-031833 A | 2/1992 |
| JP | H04-363495 A | 12/1992 |
| JP | 05-178645 | 7/1993 |
| JP | H06282194 A | 10/1994 |
| JP | 10-063216 | 3/1998 |
| JP | H10159465 A | 6/1998 |
| JP | H10249278 A | 9/1998 |
| JP | 2000-008476 A | 1/2000 |
| JP | 2000-096956 A | 4/2000 |
| JP | 2002-148573 A | 5/2002 |

(56) References Cited

FOREIGN PATENT DOCUMENTS

| | | |
|---|---|---|
| JP | 2004170350 A | 6/2004 |
| JP | 2004-245985 | 9/2004 |
| JP | 2005054356 A | 3/2005 |
| JP | 2005-282106 A | 10/2005 |
| JP | 2005-314870 A | 11/2005 |
| JP | 2006-009281 A | 1/2006 |
| JP | 2006-029027 A | 2/2006 |
| JP | 2007-120090 A | 5/2007 |
| JP | 2007-308971 A | 11/2007 |
| JP | 2008502949 A | 1/2008 |
| JP | 2008531879 A | 8/2008 |
| JP | 2009-508387 A | 2/2009 |
| JP | 2009540376 A | 11/2009 |
| JP | 2010-101151 A | 5/2010 |
| JP | 2010-529488 | 8/2010 |
| JP | 4694816 B2 | 6/2011 |
| JP | 4799113 B2 | 10/2011 |
| JP | 2013-057975 A | 3/2013 |
| JP | 2016516921 A | 6/2016 |
| JP | 6541003 B2 | 7/2019 |
| JP | 6818386 B2 | 1/2021 |
| KR | 20-0412640 | 3/2006 |
| KR | 10-752041 B1 | 8/2007 |
| KR | 10-2008-0022319 | 3/2008 |
| KR | 10-2009-0026181 | 3/2009 |
| KR | 10-0904847 B1 | 6/2009 |
| KR | 10-0931183 | 12/2009 |
| KR | 10-2010-0034361 | 4/2010 |
| KR | 10-2011-0003698 | 1/2011 |
| KR | 20110052721 A | 5/2011 |
| KR | 10-2011-0094672 | 8/2011 |
| KR | 10-2011-0118783 | 11/2011 |
| KR | 20130018527 A | 2/2013 |
| KR | 20140139894 A | 12/2014 |
| KR | 10-1815919 B1 | 1/2018 |
| RU | 29501 U1 | 5/2003 |
| TW | 200532346 A | 10/2005 |
| TW | 200920987 A | 5/2009 |
| TW | M368189 U | 11/2009 |
| TW | 201029838 A | 8/2010 |
| TW | 201215981 A | 4/2012 |
| TW | 201231789 A | 8/2012 |
| TW | 201243470 A1 | 11/2012 |
| TW | 201248286 A1 | 12/2012 |
| TW | I395809 B | 5/2013 |
| TW | 201447089 A | 12/2014 |
| WO | WO1996/32560 A1 | 10/1996 |
| WO | WO1998/016870 | 4/1998 |
| WO | WO02/09338 A2 | 1/2002 |
| WO | WO2002/013052 | 2/2002 |
| WO | WO2004/003649 | 1/2004 |
| WO | WO2005/098811 | 10/2005 |
| WO | WO2005/103807 | 11/2005 |
| WO | WO2007/016546 A2 | 2/2007 |
| WO | WO2007/146862 | 12/2007 |
| WO | WO2008/030018 | 3/2008 |
| WO | WO2008/048181 A1 | 4/2008 |
| WO | WO2008/147322 | 12/2008 |
| WO | WO2009/044330 A1 | 4/2009 |
| WO | WO2009/124647 | 10/2009 |
| WO | WO-2010007988 A1 | 1/2010 |
| WO | WO2010/024966 | 3/2010 |
| WO | WO2010/079388 A1 | 7/2010 |
| WO | WO2010/120771 | 10/2010 |
| WO | WO2011/020478 | 2/2011 |
| WO | WO2011/087684 | 7/2011 |
| WO | WO2011/087687 | 7/2011 |
| WO | WO-2011087677 A1 | 7/2011 |
| WO | WO2011/124720 | 10/2011 |
| WO | WO2011/127015 | 10/2011 |
| WO | WO2012/079159 | 6/2012 |
| WO | WO2012/080589 | 6/2012 |
| WO | WO2012/080618 | 6/2012 |
| WO | WO2012/080656 | 6/2012 |
| WO | WO2012/080657 | 6/2012 |
| WO | WO2012/125332 A2 | 9/2012 |
| WO | WO2012/145155 | 10/2012 |
| WO | WO-2012138074 A2 | 10/2012 |
| WO | WO2013/059674 | 4/2013 |
| WO | WO2013/102932 A2 | 7/2013 |
| WO | WO2013/105244 A1 | 7/2013 |
| WO | WO2013/109881 | 7/2013 |
| WO | WO2013/130781 A1 | 9/2013 |
| WO | WO2013/155467 | 10/2013 |
| WO | WO-2014045163 A2 | 3/2014 |
| WO | WO-2014078429 A1 | 5/2014 |
| WO | WO2014/121863 | 8/2014 |
| WO | WO2014/130471 | 8/2014 |
| WO | WO2014/134451 | 9/2014 |
| WO | WO2014/150153 | 9/2014 |
| WO | WO2014/165692 A1 | 10/2014 |
| WO | WO2014/209812 A1 | 12/2014 |
| WO | WO-2015023842 A2 | 2/2015 |
| WO | WO2015/077097 A1 | 5/2015 |
| WO | WO2015/095615 A1 | 6/2015 |
| WO | WO2015/171886 A1 | 11/2015 |
| WO | WO-2016004109 A1 | 1/2016 |
| WO | WO2016/029156 A1 | 2/2016 |
| WO | WO2016/029165 A2 | 2/2016 |
| WO | WO2016/053960 | 4/2016 |
| WO | WO2016/058695 A1 | 4/2016 |
| WO | WO2016/054112 A1 | 5/2016 |
| WO | WO2016/085964 | 6/2016 |
| WO | WO-2016094445 A1 | 6/2016 |
| WO | WO2016/191406 | 12/2016 |
| WO | WO2017/007942 | 1/2017 |
| WO | WO2017/059362 A1 | 4/2017 |
| WO | WO2017/062592 | 4/2017 |
| WO | WO2017/075472 | 5/2017 |
| WO | WO2017/189437 A1 | 11/2017 |
| WO | WO2018/034935 A1 | 2/2018 |
| WO | WO2018/038972 A1 | 3/2018 |
| WO | WO2018/039433 A1 | 3/2018 |
| WO | WO2018/067996 | 4/2018 |
| WO | WO2018/098089 A1 | 5/2018 |
| WO | WO2018/112095 | 6/2018 |
| WO | WO-2018112095 A3 | 7/2018 |
| WO | WO2018/140495 A1 | 8/2018 |
| WO | WO2018/157063 A1 | 8/2018 |
| WO | WO2019/183289 | 9/2019 |

OTHER PUBLICATIONS

U.S. Office Action dated Dec. 10, 2020 in U.S. Appl. No. 16/695,004.
U.S. Office Action dated Oct. 27, 2020 in U.S. Appl. No. 15/762,077.
European Office Action dated Oct. 2, 2020 in EP Application No. 13777540.9.
Canadian Notice of Allowance dated Aug. 12, 2020 in Canadian Application No. 2,902,106.
Taiwanese Office Action dated Sep. 11, 2020 in TW Application No. 109103256, with English Translation.
Taiwan Office Action dated Jul. 30, 2020 in ROC (Taiwan) Pat. Appln. No. 105121480, with English Translation.
Invitation to Pay Fees and Communication Relating to the Result of the Partial International Search, dated Jul. 12, 2019, issued in PCT/US2019/023268.
International Search Report and Written Opinion dated Sep. 4, 2019, issued in PCT/US2019/023268.
International Preliminary Report on Patentability dated Sep. 22, 2020, issued in PCT/US2019/023268.
Chinese Office Action dated Nov. 3, 2020 in Chinese Application No. 201710600395.2, with English Translation.
European Intention to Grant, dated Sep. 21, 2020, in EP Application No. 19165771.7.
Taiwanese Office Action dated Sep. 16, 2020 in TW Application No. 108143706, with English Translation.
Australian Notice of Acceptance for Patent Application, dated Sep. 29, 2020, for Australian Patent Application No. 2015255913.
European Intention to Grant, dated Jul. 9, 2020, in EP Application No. 18208971.4.

(56) References Cited

OTHER PUBLICATIONS

Decision to Grant, dated Oct. 27, 2020, for Japanese Patent Application No. JP 2019-031229, with partial translation.
EP Extended Search Report dated Dec. 4, 2020 in EP Application No. 18756696.3.
U.S. Appl. No. 16/982,535, filed Sep. 18, 2020, Zedlitz et al.
U.S. Appl. No. 63/080,899, filed Sep. 21, 2020, Makker et atl.
Preliminary Amendment No. 2, dated Dec. 9, 2020 for U.S. Appl. No. 16/695,004.
Preliminary Amendment dated Jul. 10, 2020 for U.S. Appl. No. 15/929,958.
Preliminary Amendment dated Sep. 18, 2020 for U.S. Appl. No. 16/982,535.
Preliminary Amendment dated Aug. 21, 2019 for U.S. Appl. No. 16/487,802.
U.S. Preliminary Amendment dated Oct. 30, 2019 for U.S. Appl. No. 16/013,770.
U.S. Final Office Action dated Jul. 2, 2015 in U.S. Appl. No. 13/049,756.
U.S. Final Office Action dated Aug. 19, 2013 in U.S. Appl. No. 13/049,756.
U.S. Notice of Allowance dated Jan. 8, 2016 in U.S. Appl. No. 13/049,756.
U.S. Notice of Allowance dated Jun. 22, 2016 in U.S. Appl. No. 13/049,756.
U.S. Office Action dated Oct. 6, 2014 in U.S. Appl. No. 13/049,756.
U.S. Office Action dated Jan. 18, 2013 in U.S. Appl. No. 13/049,756.
U.S. Final Office Action dated Jun. 5, 2015 U.S. Appl. No. 13/968,258.
U.S. Office Action dated Oct. 6, 2014 in U.S. Appl. No. 13/968,258.
U.S. Office Action dated Aug. 28, 2017 in U.S. Appl. No. 14/932,474.
U.S. Notice of Allowance dated Jan. 12, 2018 in U.S. Appl. No. 14/932,474.
U.S. Office Action dated May 18, 2018 in U.S. Appl. No. 15/891,866.
U.S. Final Office Action dated Jan. 11, 2019 in U.S. Appl. No. 15/891,866.
U.S. Office Action dated Sep. 19, 2019 in U.S. Appl. No. 15/891,866.
U.S. Final Office Action dated Apr. 30, 2020 in U.S. Appl. No. 15/891,866.
U.S. Notice of Allowance dated May 8, 2012 in U.S. Appl. No. 13/049,750.
U.S. Final Office Action dated Apr. 30, 2012 in U.S. Appl. No. 13/049,750.
U.S. Office Action dated Feb. 3, 2012 in U.S. Appl. No. 13/049,750.
U.S. Final Office Action dated Feb. 26, 2015 in U.S. Appl. No. 13/479,137.
U.S. Final Office Action dated Jan. 27, 2014 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Jul. 3, 2014 in U.S. Appl. No. 13/479,137.
U.S. Office Action dated Sep. 23, 2013 in U.S. Appl. No. 13/479,137.
U.S. Office Action dated Jan. 16, 2015 in U.S. Appl. No. 14/468,778.
U.S. Notice of Allowance dated Jul. 20, 2012 in U.S. Appl. No. 13/049,623.
U.S. Office Action dated Mar. 27, 2012 in U.S. Appl. No. 13/049,623.
U.S. Notice of Allowance dated Jun. 17, 2014 in U.S. Appl. No. 13/309,990.
U.S. Office Action dated Dec. 24, 2013 in U.S. Appl. No. 13/309,990.
U.S. Notice of Allowance dated Aug. 12, 2016 in U.S. Appl. No. 14/352,973.
U.S. Office Action dated Nov. 27, 2015 in U.S. Appl. No. 14/352,973.
U.S. Office Action dated Nov. 2, 2017 in U.S. Appl. No. 15/349,860.
U.S. Notice of Allowance dated Aug. 16, 2018 in U.S. Appl. No. 15/349,860.
U.S. Notice of Allowance dated Nov. 16, 2018 in U.S. Appl. No. 15/349,860.
U.S. Notice of Allowance dated Jan. 10, 2014 in U.S. Appl. No. 13/449,235.
U.S. Office Action dated Oct. 11, 2013 in U.S. Appl. No. 13/449,235.
U.S. Notice of Allowability (corrected) dated Jul. 28, 2016 in U.S. Appl. No. 14/163,026.
U.S. Notice of Allowance dated Jun. 8, 2016 in U.S. Appl. No. 14/163,026.
U.S. Office Action dated Apr. 14, 2016 in U.S. Appl. No. 14/163,026.
U.S. Office Action dated Feb. 24, 2015 in U.S. Appl. No. 14/163,026.
U.S. Office Action dated Nov. 27, 2015 in U.S. Appl. No. 14/163,026.
U.S. Notice of Allowance dated Apr. 4, 2016 in U.S. Appl. No. 14/535,080.
U.S. Office Action dated Feb. 22, 2016 in U.S. Appl. No. 14/535,080.
U.S. Office Action dated Nov. 19, 2015 in U.S. Appl. No. 14/535,080.
U.S. Office Action dated Mar. 8, 2017 in U.S. Appl. No. 14/993,822.
U.S. Office Action dated Oct. 11, 2017 in U.S. Appl. No. 14/993,822.
U.S. Notice of Allowance dated May 3, 2018 in U.S. Appl. No. 14/993,822.
U.S. Office Action dated Sep. 14, 2018 in U.S. Appl. No. 14/993,822.
U.S. Office Action dated Mar. 27, 2019 in U.S. Appl. No. 14/993,822.
U.S. Notice of Allowance dated Sep. 6, 2019 in U.S. Appl. No. 14/993,822.
U.S. Notice of Allowance dated Jan. 27, 2017 in U.S. Appl. No. 14/931,390.
U.S. Office Action dated Jun. 6, 2017 in U.S. Appl. No. 15/442,509.
U.S. Office Action dated Jan. 5, 2018 in U.S. Appl. No. 15/442,509.
U.S. Notice of Allowance dated Sep. 25, 2018 in U.S. Appl. No. 15/442,509.
U.S. Office Action dated Mar. 5, 2019 in U.S. Appl. No. 15/442,509.
U.S. Notice of Allowance dated Sep. 3, 2019 in U.S. Appl. No. 15/442,509.
U.S. Office Action dated Jan. 2, 2020 in U.S. Appl. No. 15/442,509.
U.S. Notice of Allowance dated May 27, 2020 in U.S. Appl. No. 15/442,509.
U.S. Notice of Allowance (corrected) dated Jun. 9, 2020 in U.S. Appl. No. 15/442,509.
U.S. Final Office Action dated May 16, 2014 in U.S. Appl. No. 13/449,248.
U.S. Office Action dated Nov. 29, 2013 in U.S. Appl. No. 13/449,248.
U.S. Office Action dated Sep. 29, 2014 in U.S. Appl. No. 13/449,248.
U.S. Final Office Action dated May 15, 2014 in U.S. Appl. No. 13/449,251.
U.S. Office Action dated Jun. 3, 2015 in U.S. Appl. No. 13/449,251.
U.S. Office Action dated Oct. 28, 2014 in U.S. Appl. No. 13/449,251.
U.S. Office Action dated Nov. 29, 2013 in U.S. Appl. No. 13/449,251.
U.S. Notice of Allowance dated Jan. 22, 2015 in U.S. Appl. No. 13/682,618.
U.S. Office Action dated Sep. 15, 2014 in U.S. Appl. No. 13/682,618.
U.S. Notice of Allowance dated Apr. 13, 2015 in U.S. Appl. No. 14/657,380.
U.S. Final Office Action dated Jul. 29, 2016 in U.S. Appl. No. 13/772,969.
U.S. Notice of Allowance dated Dec. 22, 2016 in U.S. Appl. No. 13/772,969.
U.S. Office Action dated Jan. 5, 2016 in U.S. Appl. No. 13/772,969.
U.S. Notice of Allowance dated Jan. 22, 2018 in U.S. Appl. No. 15/464,837.
U.S. Office Action dated May 30, 2018 in U.S. Appl. No. 15/464,837.
U.S. Office Action dated Mar. 12, 2019 in U.S. Appl. No. 15/464,837.
U.S. Notice of Allowance dated Oct. 2, 2019 in U.S. Appl. No. 15/464,837.
U.S. Notice of Allowance dated Mar. 20, 2018 in U.S. Appl. No. 15/347,677.
U.S. Office Action dated Mar. 18, 2020 in U.S. Appl. No. 16/013,770.
U.S. Notice of Allowance dated Jul. 23, 2020 in U.S. Appl. No. 16/013,770.
U.S. Notice of Allowance dated Aug. 12, 2020 in U.S. Appl. No. 16/013,770.
U.S. Office Action dated Jan. 23, 2020 in U.S. Appl. No. 15/762,077.
U.S. Office Action dated Oct. 21, 2019 in U.S. Appl. No. 15/742,015.
U.S. Office Action dated Jun. 23, 2020 in U.S. Appl. No. 15/742,015.
U.S. Office Action dated Jun. 11, 2020 in U.S. Appl. No. 16/303,384.
Letter dated Dec. 1, 2014 re Prior Art re U.S. Appl. No. 13/772,969 from Ryan D. Ricks representing MechoShade Systems, Inc.

(56) References Cited

OTHER PUBLICATIONS

Third-Party Submission dated Feb. 2, 2015 and Feb. 18, 2015 PTO Notice re Third-Party Submission for U.S. Appl. No. 13/772,969.
Chinese Office Action dated Apr. 5, 2016 in Chinese Application No. 201280023631.4.
Chinese Office Action dated Dec. 1, 2016 in Chinese Application No. 201280023631.4.
Chinese Office Action dated Jun. 26, 2015 in Chinese Application No. 201280023631.4.
European Search Report dated Aug. 11, 2014 in European Application No. 12757877.1.
European Extended Search Report dated Jun. 18, 2019 in EP Application No. 19165771.7.
Taiwanese Office Action dated Jan. 11, 2016 in TW Application No. 101108958.
Taiwanese Office Action dated Nov. 23, 2016 in TW Application No. 105129854.
Taiwanese Office Action dated Oct. 17, 2017 in TW Application No. 106115702.
Taiwanese Office Action dated May 8, 2019 in TW Application No. 107122055.
International Preliminary Report on Patentability dated Sep. 26, 2013, issued in PCT/US2012/027828.
International Search Report and Written Opinion dated Sep. 26, 2012, issued in PCT/US2012/027828.
European Search Report dated Jul. 29, 2014 in European Application No. 12758250.0.
International Preliminary Report on Patentability dated Sep. 26, 2013, issued in PCT/US2012/027909.
International Search Report and Written Opinion dated Sep. 24, 2012, issued in PCT/US2012/027909.
European Search Report dated Jul. 23, 2014 in European Application No. 12756917.6.
International Preliminary Report on Patentability dated Sep. 26, 2013, issued in PCT/US2012/027742.
International Search Report and Written Opinion dated Sep. 24, 2012, issued in PCT/US2012/027742.
Chinese Office Action dated Mar. 26, 2015 in Chinese Application No. 2015032301101560.
Chinese Office Action dated Nov. 27, 2015 in Chinese Application No. 2015032301101560.
Chinese Office Action dated Jul. 2, 2018 in Chinese Application No. 201710111979.3.
Chinese Office Action dated Dec. 25, 2018 in CN Application No. 201710111979.3.
European Office Action dated May 15, 2017 in EP Application No. EP 12841714.4.
European Search Report dated Mar. 5, 2015 in European Application No. 12841714.4.
European Office Action dated Dec. 2, 2015 in EP Application No. 12841714.4.
International Preliminary Report on Patentability dated May 1, 2014 in PCT/US2012/061137.
International Search Report and Written Opinion dated Mar. 28, 2013 in PCT/US2012/061137.
Australian Examination Report dated Sep. 9, 2016 in AU Application No. 2013249621.
Australian Examination Report dated Dec. 19, 2018 in AU Application No. 2017270472.
Chinese Office Action dated Oct. 10, 2015 in CN Application No. 201380026428.7.
Chinese Office Action dated Dec. 19, 2018 in CN Application No. 201610645398.3.
Chinese Office Action dated Aug. 19, 2019 in CN Application No. 201610645398.3.
European Search Report dated May 11, 2016 in EP Application No. 13777540.9.
European Office Action dated Jul. 15, 2019 in EP Application No. 13777540.9.
Indian Office Action dated Dec. 18, 2019 in IN Application No. 2371/KOLNP/2014.
Korean Office Action, dated Jun. 15, 2020, for Korean Patent Application No. 10-2020-7002032.
Russian Office Action dated Apr. 13, 2017 in RU Application No. 2014144632.
Russian Office Action dated Nov. 22, 2017 in RU Application No. 2014144632.
Singapore Supplementary Examination Report dated Dec. 7, 2016 in SG Application No. 11201406676Q.
Singapore Search Report dated May 29, 2020 in SG Application No. 10201608572S.
International Preliminary Report on Patentability dated Oct. 30, 2014 issued in PCT/US2013/036235.
International Search Report and Written Opinion dated Jul. 23, 2013, issued in PCT/US2013/036235.
International Preliminary Report on Patentability dated Oct. 23, 2014 issued in PCT/US2013/036456.
International Search Report and Written Opinion dated Jul. 26, 2013, issued in PCT/US2013/036456.
International Preliminary Report on Patentability dated Oct. 30, 2014 issued in PCT/US2013/034998.
International Search Report and Written Opinion dated Jul. 11, 2013, issued in PCT/US2013/034998.
International Preliminary Report on Patentability dated Feb. 19, 2015 issued in PCT/US2013/053625.
International Search Report and Written Opinion dated Dec. 26, 2013, issued in PCT/US2013/053625.
Australian Examination Report dated Mar. 31, 2017 in AU Application No. 2014219076.
Australian Examination Report dated Feb. 21, 2019 in AU Application No. 2018201341.
Canadian Office Action dated Jan. 28, 2020 in Canadian Application No. 2,902,106.
Chinese Office Action dated Jun. 27, 2016 in Chinese Application No. 201480022064.X.
Chinese Office Action dated May 15, 2017 in Chinese Application No. 201480022064.X.
Chinese Office Action dated Feb. 9, 2018 in CN Application No. 201480022064.X.
EP Invitation to Indicate Search dated Jun. 22, 2016 in EP Application No. 14753897.9.
European Extended Search Report dated Oct. 12, 2016 in EP Application No. 14753897.9.
European Office Action dated Dec. 12, 2017 in EP Application No. 14753897.9.
EPO Communication dated Sep. 2, 2015 in EP Application No. 14753897.9 re Third-Party Observations.
European Extended Search Report dated Jan. 18, 2019 in EP Application No. 18208971.4.
Indian Office Action dated Sep. 3, 2019 in IN Application No. 3074/KOLNP/2015.
Japanese Office Action dated Feb. 6, 2018 in JP Application No. 2015-558909.
Japanese Decision of Rejection dated Oct. 24, 2018 in JP Application No. JP 2015-558909.
Russian Decision to Grant with Search Report dated Feb. 28, 2018 in RU Application No. 2015139884.
Taiwanese Office Action dated Aug. 22, 2017 in TW Application No. 103105957.
International Preliminary Report on Patentability dated Sep. 3, 2015, issued in PCT/US2014/016974.
International Search Report and Written Opinion dated May 26, 2014 in PCT/US2014/016974.
Communication re Third-Party Observation dated Dec. 4, 2014 and Third-Party Observation dated Dec. 3, 2014 in PCT/US2014/016974.
Australian Office Action dated Jul. 1, 2019 in AU Application No. 2015255913.
Chinese Office Action dated Jan. 14, 2019 in CN Application No. 201580035315.2.
Chinese Notice of Allowance & Search Report dated Sep. 12, 2019 in CN Application No. 201580035315.2.

(56) References Cited

OTHER PUBLICATIONS

Extended European Search Report dated Apr. 3, 2018 in EP Application No. 15789108.6.
Partial EP Supplemental Search Report dated Nov. 29, 2017 in EP Application No. 15789108.6.
Indian Office Action dated Jul. 9, 2020 in IN Application No. 201637038970.
Japanese Office Action dated Apr. 2, 2019 in JP Application No. 2016-567021.
Russian Office Action dated Dec. 7, 2018 in RU Application No. 2016148196.
Taiwanese Office Action dated Jan. 30, 2019 in TW Application No. 104114812.
International Search Report and Written Opinion dated Jul. 23, 2015 in PCT/US2015/029675.
International Preliminary Report on Patentability dated Nov. 24, 2016 in PCT/US2015/029675.
International Search Report and Written Opinion dated Mar. 30, 2018 in PCT/US2017/066198.
International Preliminary Report on Patentability dated Jun. 17, 2019 in PCT/US2017/066198.
International Search Report and Written Opinion dated Oct. 16, 2014, issued in PCT/US2014/043514.
Chinese Office Action dated Aug. 23, 2019 in CN Application No. 201680063892.7.
Chinese Office Action dated Jul. 14, 2020 in CN Application No. 201680063892.7, with English Translation.
EP Partial Supplemental Search Report dated Apr. 12, 2019 in EP Application No. 16852784.4.
EP Extended Search Report dated May 16, 2019 in EP Application No. 16852784.4.
International Preliminary Report on Patentability dated Apr. 12, 2018, issued in PCT/US16/55005.
International Search Report and Written Opinion dated Dec. 13, 2016, issued in PCT/US16/55005.
Chinese Office Action dated Jun. 28, 2020 in CN Application No. 201680043725.6.
European Extended Search Report dated Jan. 17, 2019 in EP Application No. 16821984.8.
International Preliminary Report on Patentability dated Jan. 18, 2018 in PCT/US2016/041344.
International Search Report and Written Opinion dated Oct. 13, 2016, issued in PCT/US2016/041344.
International Search Report and Written Opinion dated Jan. 25, 2018 in PCT/US17/55631.
International Preliminary Report on Patentability dated Apr. 18, 2019 in PCT/US17/55631.
International Preliminary Report on Patentability dated Dec. 13, 2018 in PCT/US17/35290.
International Search Report and Written Opinion dated Sep. 8, 2017, issued in PCT/US17/35290.
European (Partial) Search Report dated Dec. 17, 2019 in EP Application No. 17807428.2.
International Search Report and Written Opinion (ISA: KIPO) dated Jun. 11, 2018 issued in PCT/US2018/019737.
International Preliminary Report on Patentability dated Sep. 6, 2019 issued in PCT/US2018/019737.
Chinese Office Action dated Feb. 3, 2020 in Chinese Application No. 201710600395.2, with English Translation.
Chinese Office Action dated Mar. 10, 2020 in CN Application No. 201610645398.3, with English Translation.
Notice of Allowance, dated Jun. 18, 2020 in CN Application No. 201610645398.3, No Translation.
Australian Examination Report No. 2 dated Feb. 12, 2020 in AU Application No. 2018201341.
Chinese Office Action dated Jan. 21, 2020 in Chinese Application No. 20181123277.4, with English Translation.
Japanese Office Action dated Mar. 10, 2020 in JP Application No. 2019-031229.
Korean Office Action dated Mar. 30, 2020 in KR Application No. KR 10-2015-7026041, no translation.
Taiwanese Office Action dated Apr. 21, 2020 in TW Application No. TW 107102210, no translation.
EP Extended Search Report dated Apr. 29, 2020 in EP Application No. 17881918.1.
European Office Action dated Mar. 20, 2020 in EP Application No. 16852784.4.
EP Extended Search Report dated May 12, 2020 in EP Application No. 17859286.1.
EP Extended Search Report dated Mar. 23, 2020 in EP Application No. 17807428.2.
"How Cleantech wants to make a 2012 comeback" http://mountainview.patch.com/articles/how-cleantech-wants-to-make-a-2012-comeback, Jan. 23, 2012.
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
"Remote Sensing: Clouds," Department of Atmospheric and Ocean Science, University of Maryland, (known as of Sep. 3, 2014) [http://www.atmos.umd.edu/~pinker/remote_sensing_clouds.htm].
"SageGlass helps Solar Decathlon—and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
APC by Schneider Electric, Smart-UPS 120V Product Brochure, 2013, 8 pp.
Benson D. K. et al., "Design goals and challenges for a photovoltaic-powered electrochromic window covering", Solar Energy Materials and Solar Cells, vol. 39, No. 2/04, Dec. 1995, pp. 203-211.
Duchon, Claude E. et al., "Estimating Cloud Type from Pyranometer Observations," Journal of Applied Meteorology, vol. 38, Jan. 1999, pp. 132-141.
Graham, Steve, "Clouds & Radiation," Mar. 1, 1999. [http://earthobservatory.nasa.gov/Features/Clouds/].
Haby, Jeff, "Cloud Detection (IR v. VIS)," (known as of Sep. 3, 2014) [http://theweatherprediction.com/habyhints2/512/].
Hoosier Energy, "How do they do that? Measuring Real-Time Cloud Activity" Hoosier Energy Current Connections, (known as of Sep. 3, 2014). (http://members.questline.com/Article.aspx?articleID=18550&accountID=196000&nl=11774).
Kipp & Zonen, "Solar Radiation" (known as of Sep. 3, 2014) [http://www.kippzonen.com/Knowledge-Center/Theoretical-info/Solar-Radiation].
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
National Aeronautics & Space Administration, "Cloud Radar System (CRS)," (known as of Sep. 3, 2014) [http://har.gsfc.nasa.gov/index.php?section=12].
National Aeronautics & Space Administration, "Cloud Remote Sensing and Modeling," (known as of Sep. 3, 2014) [http://atmospheres.gsfc.nasa.gov/climate/index.php?section=134].
Science and Technology Facilities Council. "Cloud Radar: Predicting The Weather More Accurately." ScienceDaily, Oct. 1, 2008. [www.sciencedaily.com/releases/2008/09/080924085200.htm].
American Chemical Society, "Solar smart window could offer privacy and light control on demand (video)," EurakAlert! Pub Release, Nov. 16, 2016 [https://www.eurekalert.org/pub_releases/2016-11/acs-ssw111616.php].
Selkowitz, S. et al., "Dynamic, Integrated Facade Systems for Energy Efficiency and Comfort," Journal of Buiding Enclosure Design, Summer 2006, pp. 11-17.
Idso, Sherwood B., "Humidity measurement by infrared thermometry," Remote Sensing of Environment, vol. 12, 1982, pp. 87-91.

(56) References Cited

OTHER PUBLICATIONS

Maghrabi, A., et al., "Design and development of a simple infrared monitor for cloud detection," Energy Conversion and Management, vol. 50, 2009, pp. 2732-2737.
Maghrabi, A., et al., "Precipitable water vapour estimation on the basis of sky temperatures measured by a single-pixel IR detector and screen temperatures under clear skies," Meteorological Applications, vol. 17, 2010, pp. 279-286.
Morris, V.R et al., "Deployment of an infrared thermometer network at the atmospheric radiation measurement program southern great plains climate research facility," Sixteenth ARM Science Team Meeting Proceedings, Albuquerque, NM, Mar. 27-31, 2006, 11 pp.
Thompson, Marcus, "Boltwood cloud sensor," Cloudynights.com, Nov. 25, 2005, 6 pp. [online], [retrieved Dec. 15, 2016]. Retrieved from the internet <URL http://www.cloudynights.com/page/articles/cat/user-reviews/photography/photography-accessories/boltwood-cloud-sensor-r1222>.
Werner, Christian, "Automatic cloud cover indicator system," Journal of Applied Meteorology, vol. 12, Dec. 1973, pp. 1394-1400.
Boltwood Cloud Sensor II by Diffraction Limited, 2016, [online], [retrieved Dec. 15, 2016]. Retrieved from the internet <URL http://diffractionlimited.com/product/boltwood-cloud-sensor-ii/>.
Mims III, Forrest M., et al., "Measuring total column water vapor by pointing an infrared thermometer at the sky," Bulletin of the American Meteorological Society, Oct. 2011, pp. 1311-1320.
Melexis "MLX90614 family Datasheet" (3901090614, Rev. 004), Jul. 30, 2008, 42 pp.
Halio Automation Brochure, halioglass.com, dated Aug. 2019, 13 pages.
"Smart Glazing: Making smart-tinting glazing even smarter", Daylighting: Design & Technology for Better Buildings, Issue 20 (Jan./Feb. 2020), 5 pages.
"Halio Rooftop Sensor Kit (Model SR500)," Product Data Sheet, Kinestral Technologies, 2020, 4 pp.
"SPN1 Sunshine Pyranometer," Product Overview, Specification, Accessories and Product Resources, Delta-T Devices, May 5, 2016, 9 pp. <<https://www.delta-t.co.uk/product/spn1/ >> (downloaded Apr. 28, 2020).
"Halio Smart-Tinting Glass System," Product Data Sheet, Kinestral Technologies, www.kinestral.com, copyright 2017, 4 pp.
Campbell-Burns, Peter, "Building a Cloud Sensor", Farnham Astronomical Society, (Apr. 15, 2013), Retrieved from the internet: URL: https://www.farnham-as.co.uk/2813/84/building-a-cloud-sensor/ [retrieved on 2828-84-24].
U.S. Appl. No. 16/487,802, filed Aug. 21, 2019, Rozbicki.
U.S. Appl. No. 15/929,958, filed May 29, 2020, Brown et al.
Preliminary Amendment dated Nov. 26, 2019 for U.S. Appl. No. 16/695,004,
AU Office action dated Nov. 28, 2022, in AU Application No. AU2021200070.
AU Examination Report dated Aug. 28, 2021, in the AU Application No. 2020202011.
AU Office Action dated Feb. 15, 2023, in Application No. AU2021200070.
AU Office Action dated Feb. 21, 2023, in Application No. AU2021200070.
AU Office Action dated Feb. 22, 2022, in Application No. AU2021200070.
Australian Examination Report dated Feb. 20, 2023, in Application No. AU2017376447.
Australian Examination Report dated Feb. 28, 2022, in Application No. 2017376447.
Australian Examination Report dated May 20, 2021 in AU Application No. 2020202135.
CA Office Action dated Nov. 23, 2022, in Application No. CA2902106.
CA Office Action dated Feb. 11, 2022, in Application No. CA2902106.
CA Office Action dated Dec. 24, 2021, in Application No. CA2948668.
CA Office Action dated Oct. 4, 2022, in Application No. CA2991419.
Canadian Notice of Allowance dated Jan. 18, 2021 in Canadian Application No. 2,902,106.
Canadian Office Action dated Feb. 11, 2021 in CA Application No. 2,870,627.
Canadian Office Action dated Jun. 10, 2021 in CA Application No. 2,948,668.
Chinese Notice of Allowance dated Jun. 3, 2021 in CN Application No. 201680043725.6, No Translation.
Chinese Office Action dated Dec. 16, 2020 in CN Application No. 201680063892.7, with English Translation.
Chinese Office Action dated Feb. 2, 2021 in Chinese Application No. 201880022572.6, with English Translation.
Chinese Office Action dated Jan. 12, 2021 in CN Application No. 201780065447.9 with Translation.
Chinese Office Action dated Jan. 13, 2021 in Chinese Application No. 201811232377.4, with English Translation.
Chinese Office Action dated Jun. 23, 2021 in Chinese Application No. 201811232377.4, with English Translation.
Chinese Office Action dated May 20, 2021 in Chinese Application No. 201710600395.2, with English Translation.
CN Office Action dated Mar. 9, 2022, in Application No. CN201911184096.0 with English Translation.
CN Office Action dated Apr. 25, 2022, in Application No. CN201980027469.5 with English translation.
CN Office Action dated Apr. 21, 2022 in Application No. CN201811232377.4 with English translation.
CN Office Action dated Apr. 27, 2022, in Application No. CN201780039437.8 with English translation.
CN Office Action dated Aug. 4, 2021, in CN Application No. 201780039437.8 with English translation.
CN Office Action dated Aug. 10, 2022, in Application No. CN201911184096.0 with English translation.
CN Office Action dated Aug. 17, 2021, in CN Application No. 201680063892.7 with English translation.
CN Office Action dated Feb. 14, 2023 in Application No. CN201780084583.2 with English translation.
CN Office Action dated Jan. 5, 2023, in Application No. CN201980027469.5 with English translation.
CN Office Action dated Jul. 7, 2022 in Application No. CN201780084583.2 with English translation.
CN Office Action dated Mar. 8, 2022, in Application No. CN201680063892.7 with English translation.
CN Office Action dated May 31, 2022, in Application No. CN201880022572.6 With English Translation.
CN Office Action dated Nov. 3, 2021, in Application No. 201780065447.9 with English translation.
CN Office Action dated Nov. 8, 2021, in Application No. 201880022572.6 with English translation.
CN Office Action dated Nov. 10, 2021, in Application No. CN201811232377.4 with English Translation.
CN office action dated Nov. 24, 2021, in application No. 201780084583.2 with English Translation.
CN Office Action dated Oct. 14, 2022, in Application No. CN201880022572.6 With English Translation.
CN Office action dated Oct. 29, 2021 in CN Application No. CN201710600395.2 with English translation.
CN Office Action dated Sep. 5, 2022, in Application No. CN201780039437.8 with English translation.
English translation of CN201104273 description form worldwide. espacenet.com.
English translation of JP2004170350 description form worldwide. espacenet.com.
EP Office Action dated Mar. 4, 2022, in Application No. EP17859286.1.
EP Office Action dated Oct. 1, 2021, in application No. EP17807428.2.
EP Search Report dated Nov. 25, 2021, in Application No. EP21171305.2.
European Intention to Grant, dated Jan. 18, 2021, in EP Application No. 18208971.4.
European Intention to Grant, dated Mar. 23, 2021, in EP Application No. 18208971.4.
European Office Action dated Feb. 22, 2023 for EP Application No. EP22197030.4.

(56) References Cited

OTHER PUBLICATIONS

European Office Action dated Mar. 12, 2021 in EP Application No. 16852784.4.
European office action dated Mar. 18, 2022, in Application No. 13777540.9.
European Office Action dated May 3, 2021 in EP Application No. 17881918.1.
European Office Action dated Sep. 5, 2022 in Application No. EP18756696.3.
Ex Parte Quayle Action, dated Feb. 2, 2021, in U.S. Appl. No. 16/335,222.
Extended European search report dated Oct. 10, 2022, in Application No. EP22161794.7.
Extended European Search Report dated Oct. 13, 2021, for EP Application No. EP21163294.8.
Extended European Search Report dated Oct. 15, 2020 in EP Application No. 20182982.7.
Humann, C., "HDR sky imaging for real time control of facades," presented Nov. 18, 2021 at Velux Build for Life conference. 21 pages of screenshots. Retrieved from internet: https://vimeo.com/647274396.
IN First Examination Report dated Jul. 7, 2021 in Indian Patent Application No. 201917013204.
IN Office Action dated Dec. 17, 2021, in Application No. IN201917027304.
IN Office Action dated Dec. 18, 2019 in Application No. IN202038052140.
IN Office Action dated Feb. 25, 2022 in Application No. IN202138016166.
IN office action dated Mar. 4, 2022, in application No. 202038052140.
Indian Office Action dated Jun. 10, 2021, in IN Application No. 202038025893.
International Search Report and Written Opinion dated Nov. 25, 2020, in PCT Application No. PCT/US2020/047525.
Japanese Office Action dated Jan. 27, 2021 in JP Application No. 2019-232669.
JP Office Action dated Jan. 4, 2022, in Application No. JP2020-215729 with English Translation.
JP Decision to Grant a Patent dated Jul. 29, 2021, in JP Application No. 2019-232669 with English translation.
JP Office Action dated Jan. 10, 2023 in Application No. JP2019-531271 with English translation.
JP Office Action dated Jul. 12, 2022, in Application No. JP2019-531271 with English translation.
JP Office Action dated Oct. 12, 2021, in Application No. JP2019531271 with Machine Translation.
Korean Notice of Decision to Grant dated Jun. 22, 2021 in KR Application No. KR10-2015-7026041, with English Translation.
Korean Notice of First Refusal dated Feb. 18, 2021 in KR Application No. KR10-2015-7026041.
Korean Notification of Provisional Rejection dated Jun. 22, 2021 in KR Application No. KR10-2016-7032512.
Korean Office Action, dated Jun. 15, 2020, for Korean Patent Application No. 10-2020-7002032 with English Translation.
Korean Office Action, dated Jun. 7, 2021, for Korean Patent Application No. 10-2020-7002032, with English Translation.
KR Office Action dated Apr. 27, 2022, in Application No. KR10-2016-7032512 with English Translation.
KR Office Action dated Dec. 23, 2021, in application No. 1020197011968 with English Translation.
Notice of Allowance dated Aug. 16, 2021 in U.S. Appl. No. 16/695,004.
Notice of Allowance dated Aug. 24, 2021 in U.S. Appl. No. 16/695,004.
Notice of Allowance dated Oct. 27, 2021 in U.S. Appl. No. 16/335,222.
Partial European Search Report dated Jul. 6, 2021 for EP Application No. EP21163294.8.
PCT International Preliminary Report on Patentability and Written Opinion dated Mar. 3, 2022, issued in PCT/US2020/047525.
Preliminary Amendment dated Jul. 1, 2021, in U.S. Appl. No. 17/305,132.
Preliminary Amendment dated Mar. 8, 2021, in U.S. Appl. No. 17/249,595.
Reno. M, et al., "Global Horizontal Irradiance Clear Sky Models: Implementation and Analysis", Sandia Report, SAND2012-2389, 2012, pp. 1-67.
Smith, et al. "Measuring Cloud Cover and Brightness Temperature with a Ground Based Thermal Infrared Camera", (Feb. 2008), American Meteorological Society, vol. 47, pp. 683-693.
Subramaniam, S., "Daylighting Simulations with Radiance using Matrix-based Methods", Lawrence Berkeley National Laboratory, Oct. 3, 2017, 145 pages.
Taiwan Office Action dated May 13, 2021 in Taiwan Patent Application No. 106134521 with English Translation.
Taiwanese Office Action dated Jun. 21, 2021 in TW Application No. TW 107106439 with English translation.
TW Notice of Allowance and Search Report dated Sep. 9, 2021, in application No. TW110106134 with English Translation.
TW Office Action dated Dec. 19, 2022, in Application No. TW111117328 with English translation.
TW Office Action dated Sep. 15, 2022 In Application No. TW110140343 with English translation.
TW Office Action dated Apr. 11, 2022, in Application No. TW106134521 with English Translation.
TW Office Action dated Dec. 29, 2021, in application No. TW110124070 with English Translation.
TW Office Action dated Jun. 29, 2022 In Application No. TW108109631 with English translation.
TW Office Action dated Mar. 16, 2022, in Application No. TW106143996 with English translation.
TW Office Action dated Oct. 26, 2021 in TW Application No. TW20170143996 with English translation.
TW Office Action dated Sep. 13, 2022, in Application No. TW106134521 with English Translation.
TW Reissued Office Action dated Jul. 8, 2021, in Taiwanese Application No. 107106439.
U.S. Non-Final office Action dated Aug. 31, 2022 in U.S. Appl. No. 16/469,851.
U.S. Non-Final office Action dated Jul. 14, 2022 in U.S. Appl. No. 16/487,802.
U.S Advisory Action dated Jun. 7, 2022 in U.S. Appl. No. 16/469,851.
U.S. Corrected Notice of Allowance dated Aug. 12, 2022 in U.S. Appl. No. 15/929,958.
U.S. Corrected Notice of Allowance dated Nov. 3, 2022 in U.S. Appl. No. 15/929,958.
U.S. Corrected Notice of Allowability dated Jan. 12, 2022, in U.S. Appl. No. 16/335,222.
U.S. Corrected Notice of Allowability dated Nov. 24, 2021, in U.S. Appl. No. 16/335,222.
U.S. Corrected Notice of Allowance dated Feb. 16, 2023 in U.S. Appl. No. 17/304,832.
U.S. Corrected Notice of Allowance dated Feb. 22, 2022 in U.S. Appl. No. 15/762,077.
U.S. Corrected Notice of Allowance dated Jan. 21, 2022 in U.S. Appl. No. 15/742,015.
U.S. Corrected Notice of Allowance dated May 18, 2022, in U.S. Appl. No. 16/303,384.
U.S. Final office Action dated Jan. 3, 2023 in U.S. Appl. No. 16/487,802.
U.S. Final office Action dated Jan. 4, 2023 in U.S. Appl. No. 17/249,595.
U.S. Final Office Action dated Mar. 10, 2022, in U.S. Appl. No. 16/487,802.
U.S. Non Final Office Action dated Feb. 16, 2022 in U.S. Appl. No. 15/929,958.
U.S. Non Final Office Action dated Jan. 21, 2022 in U.S. Appl. No. 16/303,384.
U.S. Non-Final office Action dated Dec. 22, 2022 in U.S. Appl. No. 17/305,132.
U.S. Non-Final office Action dated Jul. 21, 2022 in U.S. Appl. No. 17/249,595.

(56) References Cited

OTHER PUBLICATIONS

U.S. Non-Final Office Action dated Dec. 6, 2022 in U.S. Appl. No. 16/303,384.
U.S. Non-Final Office Action dated Oct. 13, 2022, in U.S. Appl. No. 17/304,832.
U.S. Notice of Allowance dated Aug. 24, 2022 in U.S. Appl. No. 16/303,384.
US Notice of Allowance dated Apr. 14, 2021 in U.S. Appl. No. 16/335,222.
U.S. Notice of Allowance dated Apr. 22, 2021 in U.S. Appl. No. 15/742,015.
U.S. Notice of Allowance dated Aug. 3, 2021 in U.S. Appl. No. 16/335,222.
U.S. Notice of Allowance dated Aug. 12, 2021 in U.S. Appl. No. 16/335,222.
U.S. Notice of Allowance dated Aug. 19, 2021 in U.S. Appl. No. 15/742,015.
U.S. Notice of Allowance dated Dec. 20, 2021, in U.S. Appl. No. 15/742,015.
U.S. Notice of Allowance dated Dec. 30, 2021, in U.S. Appl. No. 15/742,015.
U.S. Notice of Allowance dated Feb. 1, 2023 in U.S. Appl. No. 17/304,832.
U.S. Notice of Allowance dated Feb. 8, 2022 in U.S. Appl. No. 15/762,077.
U.S. Notice of Allowance dated Jul. 26, 2022, in U.S. Appl. No. 15/929,958.
U.S. Notice of Allowance dated Mar. 1, 2023 in U.S. Appl. No. 15/762,077.
U.S. Notice of Allowance dated Mar. 13, 2023 in U.S. Appl. No. 16/469,851.
U.S. Notice of Allowance dated Mar. 16, 2023 in U.S. Appl. No. 17/305,132.
U.S. Notice of Allowance dated Mar. 24, 2023 in U.S. Appl. No. 16/469,851.
U.S. Notice of Allowance dated Mar. 31, 2021 in U.S. Appl. No. 15/742,015.
U.S. Notice of Allowance dated May 4, 2022 in U.S. Appl. No. 16/303,384.
U.S. Notice of Allowance dated May 12, 2021 for U.S. Appl. No. 15/762,077.
U.S. Notice of Allowance dated May 13, 2021 in U.S. Appl. No. 16/695,004.
U.S. Notice of Allowance dated May 18, 2022, in U.S. Appl. No. 15/762,077.
U.S. Notice of Allowance dated Sep. 22, 2022 in U.S. Appl. No. 15/762,077.
U.S. Office Action dated Apr. 1, 2022, in U.S. Appl. No. 16/469,851.
U.S. Office Action dated Mar. 3, 2021 in U.S. Appl. No. 16/303,384.
U.S. Office Action dated Sep. 16, 2021, in U.S. Appl. No. 16/469,851.
U.S. Office Action dated Sep. 21, 2021, in U.S. Appl. No. 16/487,802.
U.S. Appl. No. 18/150,146, Inventors Klawuhn et al., filed Jan. 4, 2023.
Zhu, H. et al., "Understanding Radiance (Brightness), Irradiance and Radiant Flux," Energetiq Technology, Inc., Technical Note #004-3-25-2011, 2018, 4 Pages.
AU Office Action dated Jul. 3, 2023, in application No. AU20220200523.
CA Office Action dated Apr. 11, 2023, in Application No. CA2991419.
CA Office Action dated Jun. 23, 2023, in Application No. CA3025827.
CN Office Action dated Sep. 1, 2023, in application No. CN20208072995.6 with English Translation.
EP Extended European Search report dated Jun. 1, 2023, in Application No. EP23151011.6.
EP Extended European Search report dated May 15, 2023, in Application No. EP22201987.9.
EP office action dated Apr. 14, 2023, in application No. EP17859286.1.
EP office action dated Jun. 30, 2023, in application No. EP13777540.9.
EP office action dated Jun. 30, 2023, in application No. EP20768741.9.
European Office Action dated Apr. 5, 2023 in Application No. EP21163294.8.
European Office Action dated Feb. 23, 2023 in Application No. EP17807428.2.
International Search Report and Written Opinion dated Sep. 8, 2023, in Application No. PCT/US2023/022140.
JP Office Action dated Aug. 16, 2022 in Application No. JP2021-142788 with English translation.
JP Office Action dated Jun. 6, 2023 in Application No. JP2022-127648 with English translation.
JP Office Action dated Mar. 7, 2023 in Application No. JP2021-142788 with English translation.
JP Office Action dated Sep. 12, 2023, in application No. JP2022-180244 with English Translation.
KR Office Action dated Dec. 3, 2021, in Application No. KR1020217028534 with English translation.
KR Office Action dated Dec. 27, 2021, in Application No. KR1020217030376 with English translation.
KR Office Action dated Jul. 31, 2023, in Application No. KR10-2022-7039319 with English translation.
KR Office Action dated Mar. 6, 2023 in Application No. KR10-2022-7028868 with English translation.
KR Office Action dated Oct. 17, 2022 in Application No. KR10-2021-7030376 with English translation.
TW Office Action dated Mar. 23, 2023 in Application No. TW20210146592 with English translation.
TW Office Action dated Oct. 17, 2022, in Application No. TW111114527 with English Translation.
U.S. Corrected Notice of Allowance dated Jun. 23, 2023, in U.S. Appl. No. 16/469,851.
U.S. Final office Action dated Jul. 27, 2023 in U.S. Appl. No. 16/303,384.
U.S. Non-Final Office Action dated Jul. 18, 2023, in U.S. Appl. No. 17/931,014.
U.S. Non-Final Office Action dated Jul. 20, 2023, in U.S. Appl. No. 17/305,132.
U.S. Non-Final Office Action dated May 9, 2023 in U.S. Appl. No. 17/753,098.
U.S. Non-Final Office Action dated May 11, 2023, in U.S. Appl. No. 16/982,535.
U.S. Non-Final Office Action dated May 15, 2023 in U.S. Appl. No. 16/487,802.
U.S. Notice of Allowance dated Apr. 3, 2023 in U.S. Appl. No. 16/469,851.
U.S. Notice of Allowance dated May 4, 2023 in U.S. Appl. No. 17/304,832.
U.S. Notice of Allowance dated Sep. 5, 2023, in U.S. Appl. No. 17/249,595.
U.S. Appl. No. 18/308,658, inventors Zedlitz; Jason David., filed Apr. 27, 2023.
CA Office Action dated Nov. 2, 2023 in CA Application No. CA3047093.
EP Office Action dated Nov. 9, 2023 in EP Application No. 21171305.2.
JP Office Action dated Dec. 26, 2023 in JP Application No. 2022-127648 with English Translation.
U.S. Corrected Notice of Allowance dated Nov. 1, 2023, in U.S. Appl. No. 16/487,802.
U.S. Final Office Action dated Dec. 18, 2023 in U.S. Appl. No. 17/931,014.
U.S. Notice of Allowance dated Dec. 5, 2023 in U.S. Appl. No. 16/982,535.
U.S. Notice of Allowance dated Dec. 15, 2023 in U.S. Appl. No. 16/982,535.
U.S. Notice of Allowance dated Dec. 21, 2023 in U.S. Appl. No. 16/487,802.
U.S. Notice of Allowance dated Dec. 22, 2023 in U.S. Appl. No. 17/753,098.
U.S. Notice of Allowance dated Oct. 18, 2023 in U.S. Appl. No. 16/487,802.

(56) References Cited

OTHER PUBLICATIONS

U.S. Patent Application No. 18/486,197, inventors Brown et al., filed Oct. 13, 2023.
TW Office Action dated Oct. 24, 2023 in TW Application No. 111136120, with EnglishTranslation.

* cited by examiner

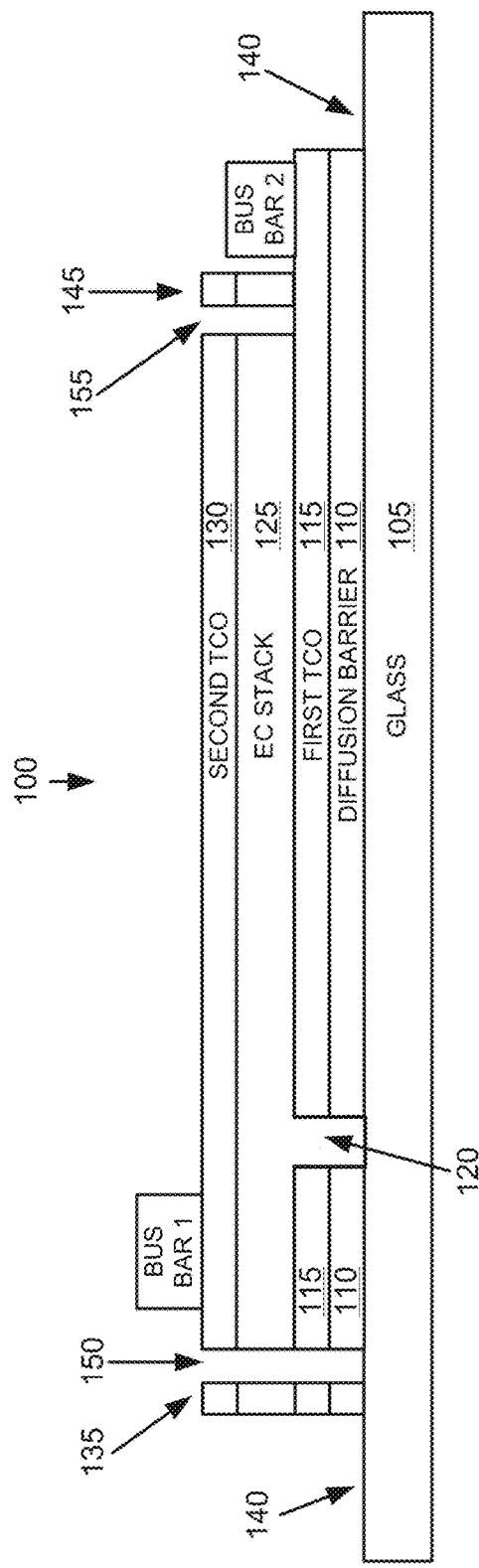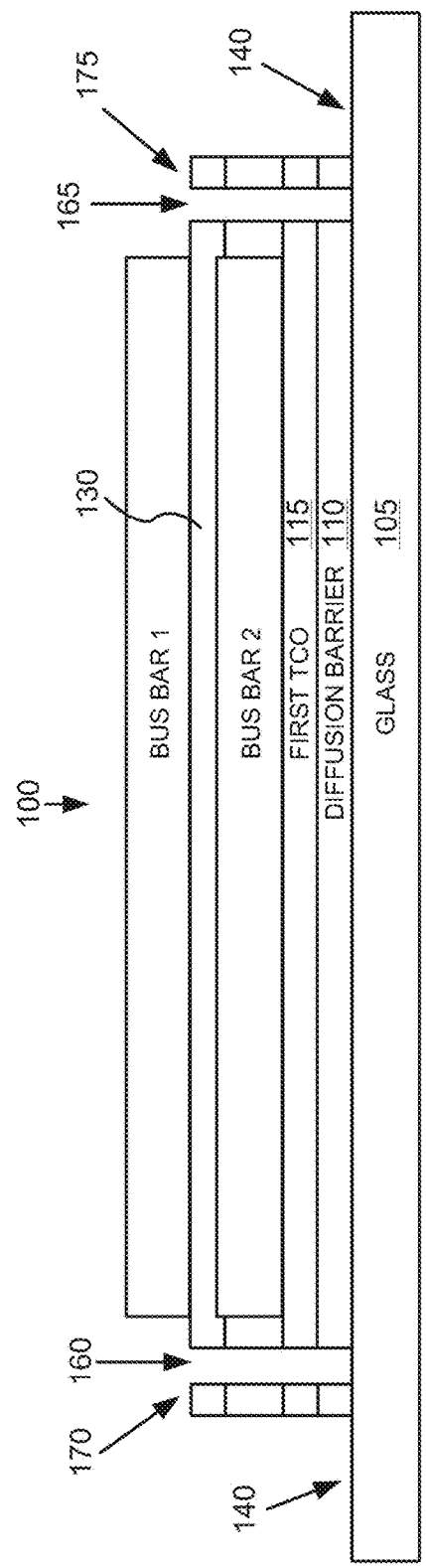

A - Direct Sunlight Penetration
B - Clear Sky Prediction
C - Real-time Irradiance accounting for obstructed and reflected

Occupancy Lookup Table

Tint level (SHGC value)

| Penetration Depth \ Space Type | Desk 1 | Desk 2 | Lobby |
|---|---|---|---|
| 2 feet | 10 (0.60) | 0 (0.80) | 0 (0.80) |
| 4 feet | 20 (0.40) | 5 (0.70) | 0 (0.80) |
| 6 feet | 30 (0.20) | 10 (0.60) | 5 (0.70) |
| 8 feet | 35 (0.10) | 20 (0.40) | 10 (0.60) |
| 10 feet | 35 (0.10) | 35 (0.10) | 10 (0.60) |
| 12 feet | 35 (0.10) | 35 (0.10) | 15 (0.50) |

*FIG. 10*

A - Direct Sunlight Penetration
B - Clear Sky Prediction
C - Real-time Irradiance accounting for obstructed and reflected Acceptance Angle between $\Theta_1$ to $\Theta_2$ If $\Theta_1 < \Theta_{sun} < \Theta_2$ and

| Penetration Depth | $T_{vis}$ | $\Theta_1$ | $\Theta_2$ |
|---|---|---|---|
| 2 feet | 63% | 30° | 120° |
| 4 feet | 40% | 30° | 120° |
| 8 feet | 20% | 30° | 120° |
| 15 feet | 4% | 30° | 120° |

CONTROL METHOD FOR TINTABLE WINDOWS

CROSS-REFERENCES TO RELATED APPLICATIONS

This application is a continuation of U.S. patent application Ser. No. 16/013,770, titled "CONTROL METHOD FOR TINTABLE WINDOWS" and filed on Jun. 20, 2018, which is a continuation of U.S. patent application Ser. No. 15/347,677, titled "CONTROL METHOD FOR TINTABLE WINDOWS" and filed on Nov. 9, 2016, which is a continuation-in-part of International Patent Application No. PCT/US15/29675 (designating the United States), titled "CONTROL METHOD FOR TINTABLE WINDOWS" and filed on May 7, 2015, which claims priority to and benefit of U.S. Provisional Patent Application No. 61/991,375, titled "CONTROL METHOD FOR TINTABLE WINDOWS" and filed on May 9, 2014; U.S. patent application Ser. No. 15/347,677 is also a continuation-in-part of U.S. patent application Ser. No. 13/772,969 (issued on May 2, 2017 as U.S. Pat. No. 9,638,978), titled "CONTROL METHOD FOR TINTABLE WINDOWS" and filed on Feb. 21, 2013; each of these applications is hereby incorporated by reference in its entirety and for all purposes.

FIELD

The embodiments disclosed herein relate generally to window controllers and related predictive control logic for implementing methods of controlling tint and other functions of tintable windows (e.g., electrochromic windows).

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960s, electrochromic devices, and particularly electrochromic windows, still unfortunately suffer various problems and have not begun to realize their full commercial potential despite many recent advances in electrochromic technology, apparatus and related methods of making and/or using electrochromic devices.

SUMMARY

Systems, methods, and apparatus for controlling transitions of electrochromic windows and other tintable windows to different tint levels are provided. Generally, embodiments include predictive control logic for implementing methods of controlling tint levels of electrochromic windows or other tintable windows. Typically, the control logic can be used in a building or other architecture having one or more electrochromic windows located between the interior and exterior of the building. The windows may have different configurations. For example, some may be vertical windows in offices or lobbies and others may be skylights in hallways. More particularly, disclosed embodiments include predictive control logic that provides a method of predicting and changing the tint level of one or more tintable windows to directly account for occupant comfort. The method can determined the tint level for a future time, for example, to allow for the predicted transition time of the tintable windows.

The comfort has to do with reducing direct glare and/or total radiant energy directed onto an occupant or the occupant's area of activity. In some cases, the comfort also has to do with allowing sufficient natural lighting into the area. The control logic may also make use of considerations for energy conservation. In a particular implementation, control logic may include one or more modules with at least one of the modules being associated with occupant comfort considerations. One or more of the modules may be concerned with energy consumption as well.

In one aspect, one or more modules of the control logic may determine a tint level that is determined based on occupant comfort from direct sunlight or glare on the occupant or their activity area such as their desk. These modules may determine how far into the room the sunlight penetrates at a particular instant in time. The modules may then determine an appropriate tint level that will transmit the level of light that will be comfortable to the occupant.

In another aspect, one or more modules of the control logic may modify the tint level determined based on occupant comfort to also take into account energy considerations from predicted irradiance under clear sky conditions. In this aspect, the tint level may be darkened to make sure that it performs at least as well as a reference window required in the building as specified by the local municipality codes or standards. The modified tint level will provide at least as much energy savings in cooling as the reference window. In some cases, the tint level may be lightened instead to provide energy savings in heating.

In yet another aspect, one or more modules of the control logic may modify the tint level determined based on occupant comfort and predicted clear sky irradiance to account for actual irradiance. The actual irradiance may be different than the predicted irradiance due to obstructions and reflection of light. A photosensor or other sensor that can measure radiation levels can be used to determine the actual irradiance. These one or more modules determine the lightest tint level that transmits as much or less light into the room than the tint level determined based on occupant comfort and predicted clear sky irradiance.

One embodiment is a method of controlling tint of a tintable window to account for occupant comfort in a room of a building. The tintable window is located between the interior and exterior of the building. The method predicts an appropriate tint level for the tintable window at a future time based on a penetration depth of direct sunlight through the tintable window into the room at the future time and space type in the room. The method provides instructions over a network to transition tint of the tintable window to the tint level.

Another embodiment is a controller for controlling tint of a tintable window to account for occupant comfort in a room of a building. The tintable window is located between the interior and exterior of the building. The controller comprises a processor configured to determine a tint level for the tintable window based on a penetration depth of direct sunlight through the tintable window into a room and space type in the room. The controller also comprises a pulse width modulator ("PWM") in communication with the processor and with the tintable window over a network. The pulse width modulator is configured to receive the tint level from the processor and send a signal with tint instructions over the network to transition the tint of the tintable window to the determined tint level.

Another embodiment is a master controller for controlling tint of a tintable window to account for occupant comfort in a building. The tintable window is located between the interior and exterior of the building. The master controller comprises a computer readable medium and a processor in communication with the computer readable medium and in communication with a local window controller for the tintable window. The computer readable medium has a configuration file with a space type associated with the tintable window. The processor is configured to receive the space type from the computer readable medium, determine a tint level for the tintable window based on a penetration depth of direct sunlight through the tintable window into a room and the space type, and send tint instructions over a network to the local window controller to transition tint of the tintable window to the determined tint level.

Another embodiment is a method of controlling tint of one or more tintable windows in a zone of a building to account for occupant comfort. The method calculates a future time based on a current time and based on a predicted transition time of a representative window of the zone. The method also predicts a solar position at the future time and determines a program designated by a user in schedule. The program includes logic for determining a tint level based on one or more independent variables. The method also employs the determined program to determining the tint level based on the predicted solar position at the future time and occupant comfort. The method also communicates instructions to the one or more tintable windows to transition tint to the determined tint level.

Another embodiment is a window controller for controlling tint of one or more tintable windows in a zone of a building to account for occupant comfort. The window controller comprises a computer readable medium having predictive control logic, and site data and zone/group data associated with the zone. The window controller further comprises a processor in communication with the computer readable medium and in communication with the tintable window. The processor is configured to calculate a future time based on a current time and a predicted transition time of a representative window of the zone. The processor is also configured to predict a solar position at the future time and determine a program designated by a user in a schedule. The program includes logic for determining a tint level based on one or more independent variables. The processor is also configured to employ the determined program to determine a tint level using the predicted solar position at the future time and based on occupant comfort. The processor is also configured to communicate instructions to the one or more tintable windows in the zone to transition tint to the determined tint level.

Certain aspects include methods of controlling tint of one or more tintable windows to account for occupancy comfort in a room of a building. One method comprises determining an intersection between an occupancy region and a three-dimensional projection of light through the one or more tintable windows; using the intersection to determine a tint level of the one or more tintable windows; and providing instructions to transition tint of the one or more tintable windows to the determined tint level. In some cases, the three-dimensional projection is a projection of the one or more tintable windows into the room from the sun's rays. The direction of the projection may be determined based on the sun's azimuth and altitude in some cases. In some cases, the intersection of the three-dimensional projection of light with a plane of interest is a P-image and the tint level is determined based on an amount of overlap of the P-image with the occupancy region and determining the tint level based on the amount of overlap. In some cases, the tint level is determined based on a percentage of overlap of the P-image with the occupancy region.

Certain aspects include controllers for controlling tint of one or more tintable windows to account for occupancy comfort in a room. In some cases, a controller comprises a processor configured to determine an intersection of a three-dimensional projection of light through the one or more tintable windows with a plane of interest, determine an overlap of the intersection with an occupancy region, use the determined overlap to determine a tint level of the one or more tintable windows, and provide instructions to transition tint of the one or more tintable windows to the determined tint level. In some aspects, the controller further comprises a pulse width modulator in communication with the processor and with the tintable window over a network. The pulse width modulator is configured to receive the determined tint level from the processor and send a signal with tint instructions over the network to transition the tint of the one or more tintable windows to the determined tint level. In some aspects, the intersection of the three-dimensional projection of light with a plane of interest is a P-image, wherein determining the P-image comprises determining an effective aperture of the one or more tintable windows and a geometric center of the effective aperture, determining a P-image offset from the geometric center based on sun azimuth and altitude, and determining the P-image by generating the effective aperture area around the P-image offset at the plane of interest.

Certain aspects include methods of controlling tint of one or more tintable windows to account for occupancy comfort in a room of a building. In some cases, the methods comprises determining whether one or more timers is set at the current time; and if one or more timers is not set, determining a filtered tint level and providing instructions to transition tint of the one or more tintable windows to the filtered tint level. In some cases, determining the filtered tint level comprises determining a short box car value of a short box car based on one or more sensor readings, determining a first long box car value of a first long box car based on one or more sensor readings, setting an illumination value to the short box car value and setting a first timer if the difference between the short box car value and the long box car value is positive and greater than a positive threshold value, and setting the illumination value to the first long box car value if the difference between the short box car value and the long box car value is positive and less than the positive threshold value or negative and more negative than a negative threshold value.

These and other features and embodiments will be described in more detail below with reference to the drawings.

BRIEF DESCRIPTION OF THE DRAWINGS

FIGS. 1A-1C show schematic diagrams of electrochromic devices formed on glass substrates, i.e., electrochromic lites.

FIG. 10 is an example of an occupancy lookup table according to disclosed embodiments.

DETAILED DESCRIPTION

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments.

I. Overview of Electrochromic Devices

It should be understood that while disclosed embodiments focus on electrochromic windows (also referred to as smart windows), the concepts disclosed herein may apply to other types of tintable windows. For example, a tintable window incorporating a liquid crystal device or a suspended particle device, instead of an electrochromic device could be incorporated in any of the disclosed embodiments.

In order to orient the reader to the embodiments of systems, window controllers, and methods disclosed herein, a brief discussion of electrochromic devices is provided. This initial discussion of electrochromic devices is provided for context only, and the subsequently described embodiments of systems, window controllers, and methods are not limited to the specific features and fabrication processes of this initial discussion.

Figure 1C:
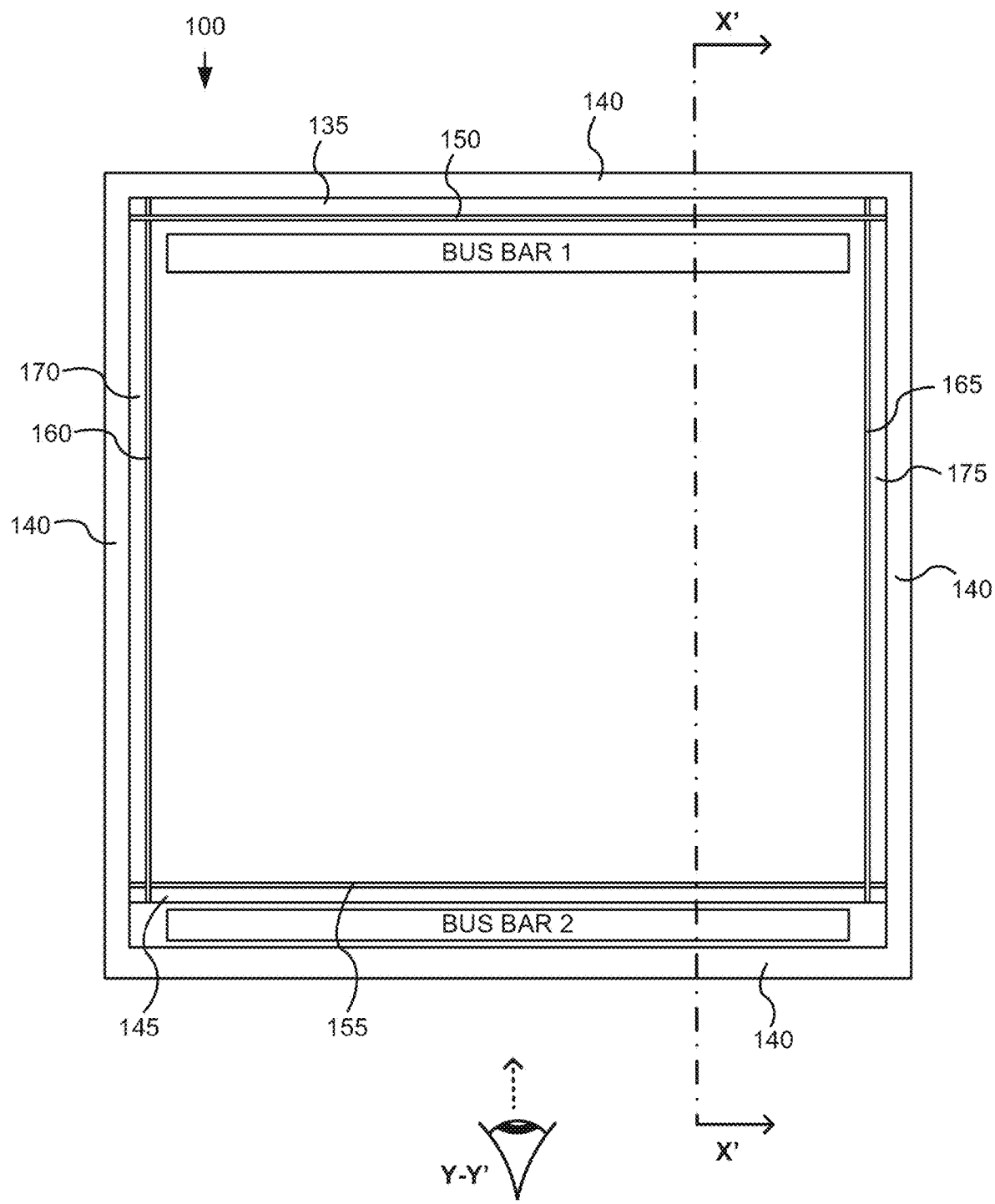

A particular example of an electrochromic lite is described with reference to FIGS. 1A-1C, in order to illustrate embodiments described herein. FIG. 1A is a cross-sectional representation (see section cut X'-X' of FIG. 1C) of an electrochromic lite 100, which is fabricated starting with a glass sheet 105. FIG. 1B shows an end view (see viewing perspective Y-Y' of FIG. 1C) of electrochromic lite 100, and FIG. 1C shows a top-down view of electrochromic lite 100. FIG. 1A shows the electrochromic lite after fabrication on glass sheet 105, edge deleted to produce area 140, around the perimeter of the lite. The electrochromic lite has also been laser scribed and bus bars have been attached. The glass lite 105 has a diffusion barrier 110, and a first transparent conducting oxide layer (TCO) 115, on the diffusion barrier. In this example, the edge deletion process removes both TCO 115 and diffusion barrier 110, but in other embodiments only the TCO is removed, leaving the diffusion barrier intact. The TCO 115 is the first of two conductive layers used to form the electrodes of the electrochromic device fabricated on the glass sheet. In this example, the glass sheet includes underlying glass and the diffusion barrier layer. Thus, in this example, the diffusion barrier is formed, and then the first TCO, an electrochromic stack 125, (e.g., having electrochromic, ion conductor, and counter electrode layers), and a second TCO 130, are formed. In one embodiment, the electrochromic device (electrochromic stack and second TCO) is fabricated in an integrated deposition system where the glass sheet does not leave the integrated deposition system at any time during fabrication of the stack. In one embodiment, the first TCO layer is also formed using the integrated deposition system where the glass sheet does not leave the integrated deposition system during deposition of the electrochromic stack and the (second) TCO layer. In one embodiment, all of the layers (diffusion barrier, first TCO, electrochromic stack, and second TCO) are deposited in the integrated deposition system where the glass sheet does not leave the integrated deposition system during deposition. In this example, prior to deposition of electrochromic stack 125, an isolation trench 120, is cut through TCO 115 and diffusion barrier 110. Trench 120 is made in contemplation of electrically isolating an area of TCO 115 that will reside under bus bar 1 after fabrication is complete (see FIG. 1A). This is done to avoid charge buildup and coloration of the electrochromic device under the bus bar, which can be undesirable.

After formation of the electrochromic device, edge deletion processes and additional laser scribing are performed. FIG. 1A depicts areas 140 where the device has been removed, in this example, from a perimeter region surrounding laser scribe trenches 150, 155, 160, and 165. Trenches 150, 160 and 165 pass through the electrochromic stack and also through the first TCO and diffusion barrier. Trench 155 passes through second TCO 130 and the electrochromic stack, but not the first TCO 115. Laser scribe trenches 150, 155, 160, and 165 are made to isolate portions of the electrochromic device, 135, 145, 170, and 175, which were potentially damaged during edge deletion processes from the operable electrochromic device. In this example, laser scribe trenches 150, 160, and 165 pass through the first TCO to aid in isolation of the device (laser scribe trench 155 does not pass through the first TCO, otherwise it would cut off bus bar 2's electrical communication with the first TCO and thus the electrochromic stack). The laser or lasers used for the laser scribe processes are typically, but not necessarily, pulse-type lasers, for example, diode-pumped solid state lasers. For example, the laser scribe processes can be performed using a suitable laser from IPG Photonics (of Oxford, Mass.), or from Ekspla (of Vilnius, Lithuania). Scribing can also be performed mechanically, for example, by a diamond tipped scribe. One of ordinary skill in the art would appreciate that the laser scribing processes can be performed at different depths and/or performed in a single process whereby the laser cutting depth is varied, or not, during a continuous path around the perimeter of the electrochromic device. In one embodiment, the edge deletion is performed to the depth of the first TCO.

After laser scribing is complete, bus bars are attached. Non-penetrating bus bar 1 is applied to the second TCO. Non-penetrating bus bar 2 is applied to an area where the device was not deposited (e.g., from a mask protecting the first TCO from device deposition), in contact with the first TCO or, in this example, where an edge deletion process (e.g., laser ablation using an apparatus having a XY or XYZ galvanometer) was used to remove material down to the first TCO. In this example, both bus bar 1 and bus bar 2 are non-penetrating bus bars. A penetrating bus bar is one that is typically pressed into and through the electrochromic stack to make contact with the TCO at the bottom of the stack. A non-penetrating bus bar is one that does not penetrate into the electrochromic stack layers, but rather makes electrical and physical contact on the surface of a conductive layer, for example, a TCO.

The TCO layers can be electrically connected using a non-traditional bus bar, for example, a bus bar fabricated with screen and lithography patterning methods. In one embodiment, electrical communication is established with the device's transparent conducting layers via silk screening (or using another patterning method) a conductive ink followed by heat curing or sintering the ink. Advantages to using the above described device configuration include simpler manufacturing, for example, and less laser scribing than conventional techniques which use penetrating bus bars.

After the bus bars are connected, the device is integrated into an insulated glass unit (IGU), which includes, for example, wiring the bus bars and the like. In some embodiments, one or both of the bus bars are inside the finished IGU, however in one embodiment one bus bar is outside the seal of the IGU and one bus bar is inside the IGU. In the former embodiment, area 140 is used to make the seal with one face of the spacer used to form the IGU. Thus, the wires or other connection to the bus bars runs between the spacer and the glass. As many spacers are made of metal, e.g., stainless steel, which is conductive, it is desirable to take steps to avoid short circuiting due to electrical communication between the bus bar and connector thereto and the metal spacer.

As described above, after the bus bars are connected, the electrochromic lite is integrated into an IGU, which includes, for example, wiring for the bus bars and the like. In the embodiments described herein, both of the bus bars are inside the primary seal of the finished IGU.

Figure 2A:
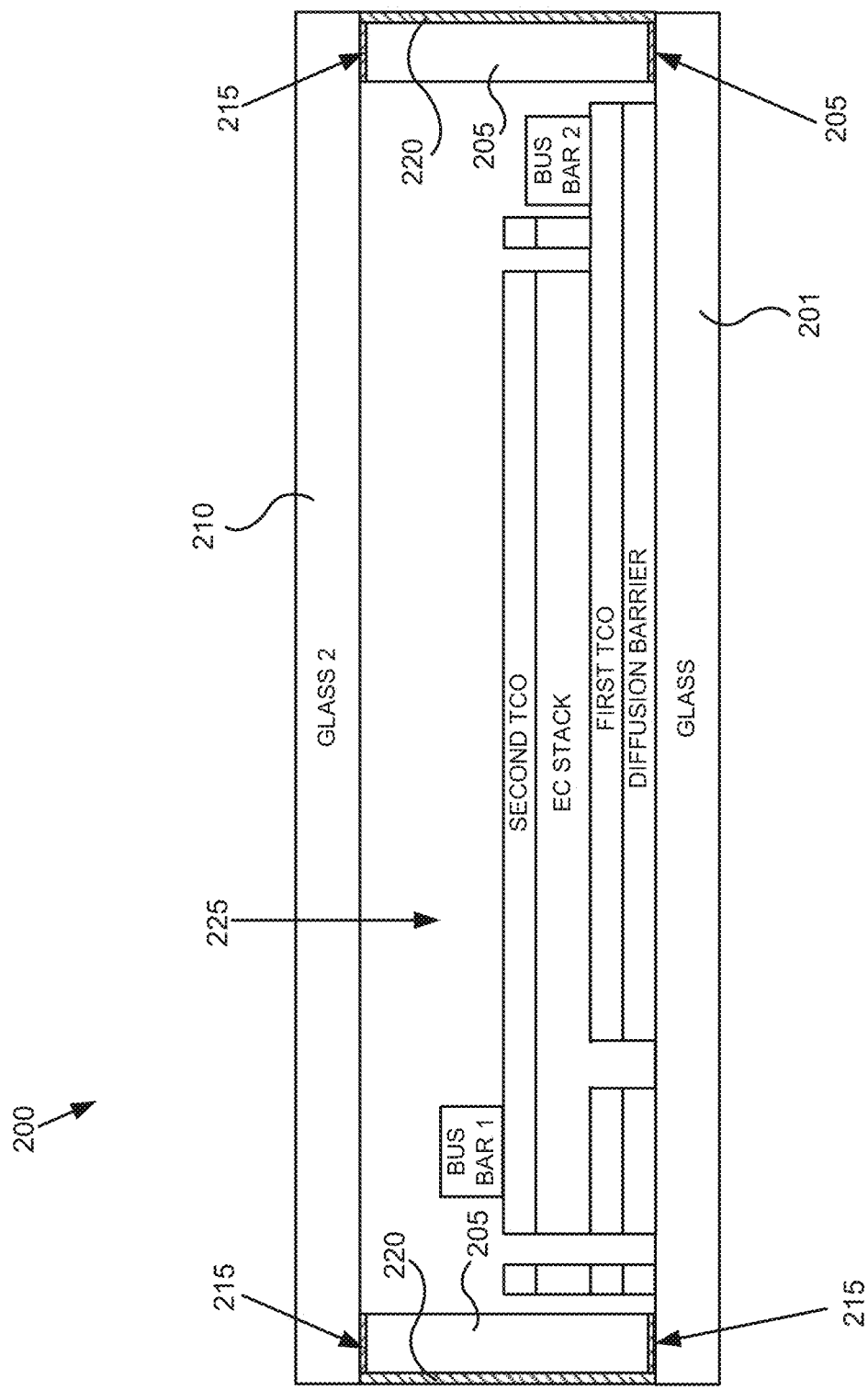
FIGS. 2A and 2B show cross-sectional schematic diagrams of the electrochromic lites as described in relation to FIGS. 1A-1C integrated into an IGU.
Figure 2B:
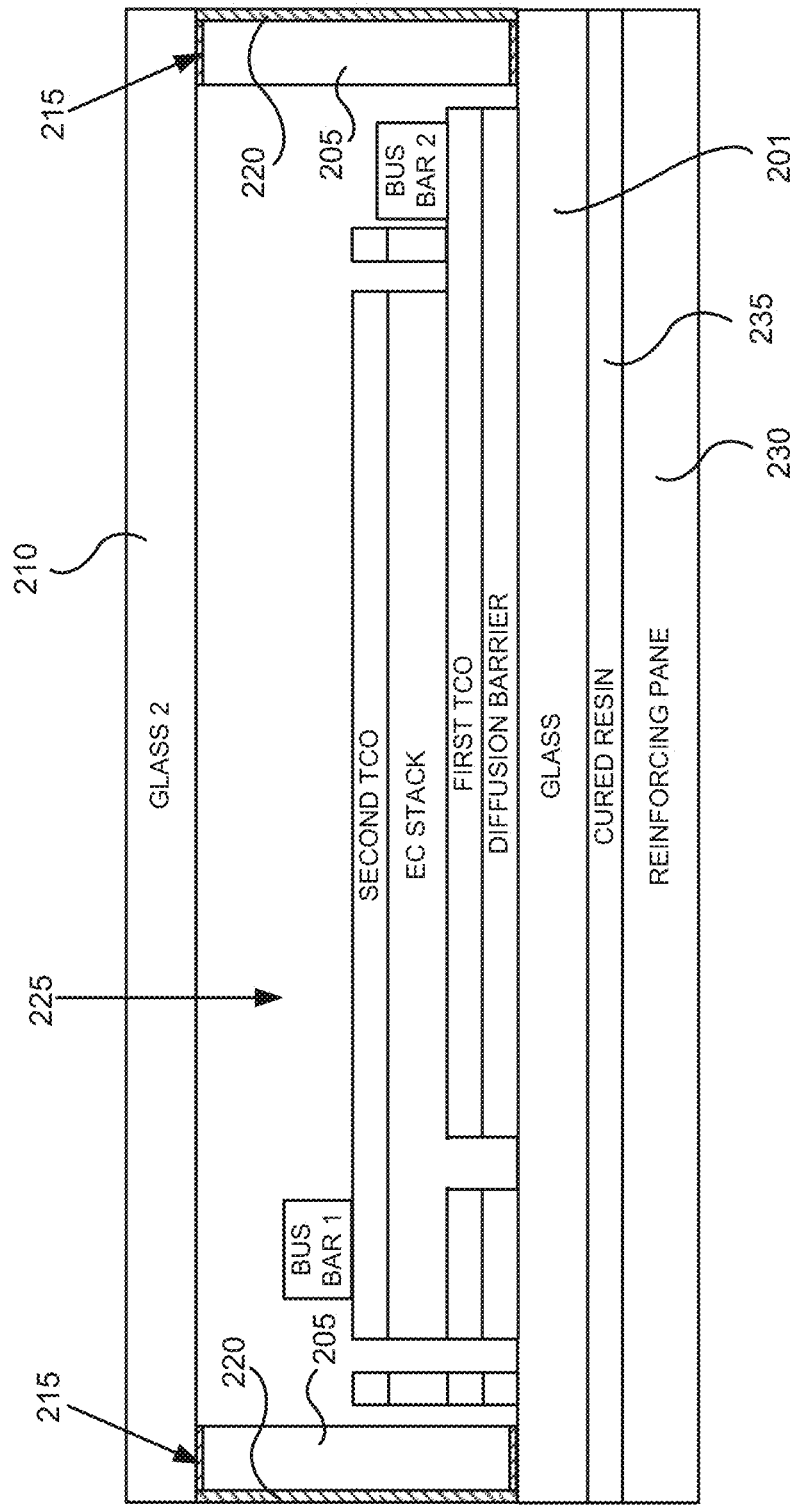

FIG. 2A shows a cross-sectional schematic diagram of the electrochromic window as described in relation to FIGS. 1A-1C integrated into an IGU 200. A spacer 205 is used to separate the electrochromic lite from a second lite 210. Second lite 210 in IGU 200 is a non-electrochromic lite, however, the embodiments disclosed herein are not so limited. For example, lite 210 can have an electrochromic device thereon and/or one or more coatings such as low-E coatings and the like. Lite 201 can also be laminated glass, such as depicted in FIG. 2B (lite 201 is laminated to reinforcing pane 230, via resin 235). Between spacer 205 and the first TCO layer of the electrochromic lite is a primary seal material 215. This primary seal material is also between spacer 205 and second glass lite 210. Around the perimeter of spacer 205 is a secondary seal 220. Bus bar wiring/leads traverse the seals for connection to a controller. Secondary seal 220 may be much thicker that depicted. These seals aid in keeping moisture out of an interior space 225, of the IGU. They also serve to prevent argon or other gas in the interior of the IGU from escaping.

Figure 3A:
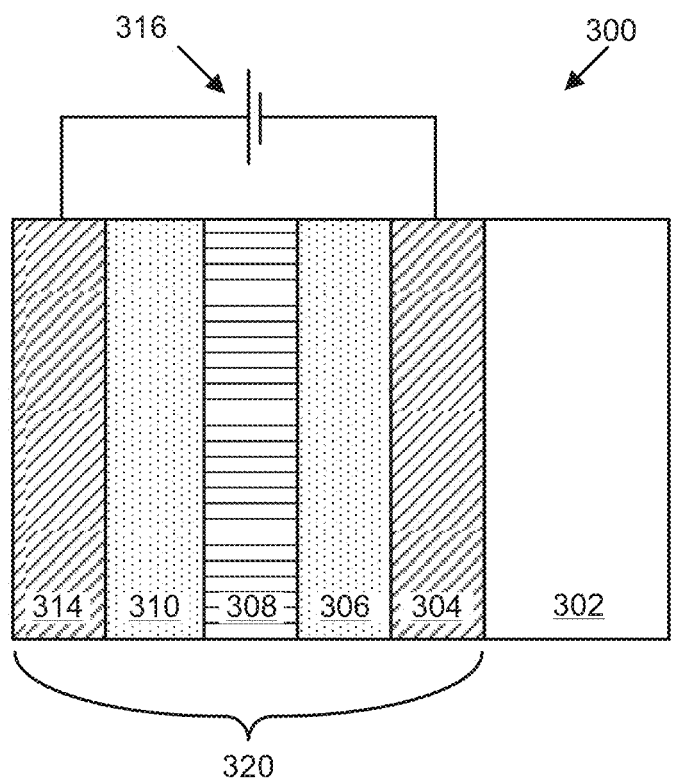
FIG. 3A depicts a schematic cross-section of an electrochromic device.

FIG. 3A schematically depicts an electrochromic device 300, in cross-section. Electrochromic device 300 includes a substrate 302, a first conductive layer (CL) 304, an electrochromic layer (EC) 306, an ion conducting layer (IC) 308, a counter electrode layer (CE) 310, and a second conductive layer (CL) 314. Layers 304, 306, 308, 310, and 314 are collectively referred to as an electrochromic stack 320. A voltage source 316 operable to apply an electric potential across electrochromic stack 320 effects the transition of the electrochromic device from, for example, a bleached state to a colored state (depicted). The order of layers can be reversed with respect to the substrate.

Electrochromic devices having distinct layers as described can be fabricated as all solid state devices and/or all inorganic devices having low defectivity. Such devices and methods of fabricating them are described in more detail in U.S. patent application Ser. No. 12/645,111, entitled "Fabrication of Low-Defectivity Electrochromic Devices," filed on Dec. 22, 2009, and naming Mark Kozlowski et al. as inventors, and in U.S. patent application Ser. No. 12/645, 159, entitled "Electrochromic Devices," filed on Dec. 22, 2009 and naming Zhongchun Wang et al. as inventors, both of which are hereby incorporated by reference in their entireties. It should be understood, however, that any one or more of the layers in the stack may contain some amount of organic material. The same can be said for liquids that may be present in one or more layers in small amounts. It should also be understood that solid state material may be deposited or otherwise formed by processes employing liquid components such as certain processes employing sol-gels or chemical vapor deposition.

Additionally, it should be understood that the reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further, the term "bleached" refers to an optically neutral state, for example, uncolored, transparent, or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In embodiments described herein, the electrochromic device reversibly cycles between a bleached state and a colored state. In some cases, when the device is in a bleached state, a potential is applied to the electrochromic stack 320 such that available ions in the stack reside primarily in the counter electrode 310. When the potential on the electrochromic stack is reversed, the ions are transported across the ion conducting layer 308 to the electrochromic material 306 and cause the material to transition to the colored state. In a similar way, the electrochromic device of embodiments described herein can be reversibly cycled between different tint levels (e.g., bleached state, darkest colored state, and intermediate levels between the bleached state and the darkest colored state).

Referring again to FIG. 3A, voltage source 316 may be configured to operate in conjunction with radiant and other environmental sensors. As described herein, voltage source 316 interfaces with a device controller (not shown in this figure). Additionally, voltage source 316 may interface with an energy management system that controls the electrochromic device according to various criteria such as the time of year, time of day, and measured environmental conditions. Such an energy management system, in conjunction with large area electrochromic devices (e.g., an electrochromic window), can dramatically lower the energy consumption of a building.

Any material having suitable optical, electrical, thermal, and mechanical properties may be used as substrate 302. Such substrates include, for example, glass, plastic, and mirror materials. Suitable glasses include either clear or tinted soda lime glass, including soda lime float glass. The glass may be tempered or untempered.

In many cases, the substrate is a glass pane sized for residential window applications. The size of such glass pane can vary widely depending on the specific needs of the residence. In other cases, the substrate is architectural glass. Architectural glass is typically used in commercial buildings, but may also be used in residential buildings, and typically, though not necessarily, separates an indoor environment from an outdoor environment. In certain embodiments, architectural glass is at least 20 inches by 20 inches, and can be much larger, for example, as large as about 80 inches by 120 inches. Architectural glass is typically at least about 2 mm thick, typically between about 3 mm and about 6 mm thick. Of course, electrochromic devices are scalable to substrates smaller or larger than architectural glass. Further, the electrochromic device may be provided on a mirror of any size and shape.

On top of substrate 302 is conductive layer 304. In certain embodiments, one or both of the conductive layers 304 and 314 is inorganic and/or solid. Conductive layers 304 and 314 may be made from a number of different materials, including conductive oxides, thin metallic coatings, conductive metal nitrides, and composite conductors. Typically, conductive layers 304 and 314 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used, as well as combinations of TCO's and metallic coatings.

The function of the conductive layers is to spread an electric potential provided by voltage source 316 over surfaces of the electrochromic stack 320 to interior regions of the stack, with relatively little ohmic potential drop. The electric potential is transferred to the conductive layers though electrical connections to the conductive layers. In some embodiments, bus bars, one in contact with conductive layer 304 and one in contact with conductive layer 314, provide the electric connection between the voltage source 316 and the conductive layers 304 and 314. The conductive layers 304 and 314 may also be connected to the voltage source 316 with other conventional means.

Overlaying conductive layer 304 is electrochromic layer 306. In some embodiments, electrochromic layer 306 is inorganic and/or solid. The electrochromic layer may contain any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. During operation, electrochromic layer 306 transfers ions to and receives ions from counter electrode layer 310 to cause optical transitions.

Generally, the colorization (or change in any optical property—e.g., absorbance, reflectance, and transmittance) of the electrochromic material is caused by reversible ion insertion into the material (e.g., intercalation) and a corresponding injection of a charge balancing electron. Typically some fraction of the ions responsible for the optical transition is irreversibly bound up in the electrochromic material. Some or all of the irreversibly bound ions are used to compensate "blind charge" in the material. In most electrochromic materials, suitable ions include lithium ions (Li+) and hydrogen ions (H+) (that is, protons). In some cases, however, other ions will be suitable. In various embodiments, lithium ions are used to produce the electrochromic phenomena. Intercalation of lithium ions into tungsten oxide ($WO_{3-y}$ ($0 < y \leq \sim 0.3$)) causes the tungsten oxide to change from transparent (bleached state) to blue (colored state).

Referring again to FIG. 3A, in electrochromic stack 320, ion conducting layer 308 is sandwiched between electrochromic layer 306 and counter electrode layer 310. In some embodiments, counter electrode layer 310 is inorganic and/or solid. The counter electrode layer may comprise one or more of a number of different materials that serve as a reservoir of ions when the electrochromic device is in the bleached state. During an electrochromic transition initiated by, for example, application of an appropriate electric potential, the counter electrode layer transfers some or all of the ions it holds to the electrochromic layer, changing the electrochromic layer to the colored state. Concurrently, in the case of NiWO, the counter electrode layer colors with the loss of ions.

In some embodiments, suitable materials for the counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue.

When charge is removed from a counter electrode 310 made of nickel tungsten oxide (that is, ions are transported from counter electrode 310 to electrochromic layer 306), the counter electrode layer will transition from a transparent state to a colored state.

In the depicted electrochromic device, between electrochromic layer 306 and counter electrode layer 310, there is the ion conducting layer 308. Ion conducting layer 308 serves as a medium through which ions are transported (in the manner of an electrolyte) when the electrochromic device transitions between the bleached state and the colored state. Preferably, ion conducting layer 308 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain embodiments, the ion conducting layer 308 is inorganic and/or solid.

Examples of suitable ion conducting layers (for electrochromic devices having a distinct IC layer) include silicates, silicon oxides, tungsten oxides, tantalum oxides, niobium oxides, and borates. These materials may be doped with different dopants, including lithium. Lithium doped silicon oxides include lithium silicon-aluminum-oxide. In some embodiments, the ion conducting layer comprises a silicate-based structure. In some embodiments, a silicon-aluminum-oxide (SiAlO) is used for the ion conducting layer 308.

Electrochromic device 300 may include one or more additional layers (not shown), such as one or more passive layers. Passive layers used to improve certain optical properties may be included in electrochromic device 300. Passive layers for providing moisture or scratch resistance may also be included in electrochromic device 300. For example, the conductive layers may be treated with anti-reflective or protective oxide or nitride layers. Other passive layers may serve to hermetically seal electrochromic device 300.

Figure 3B:
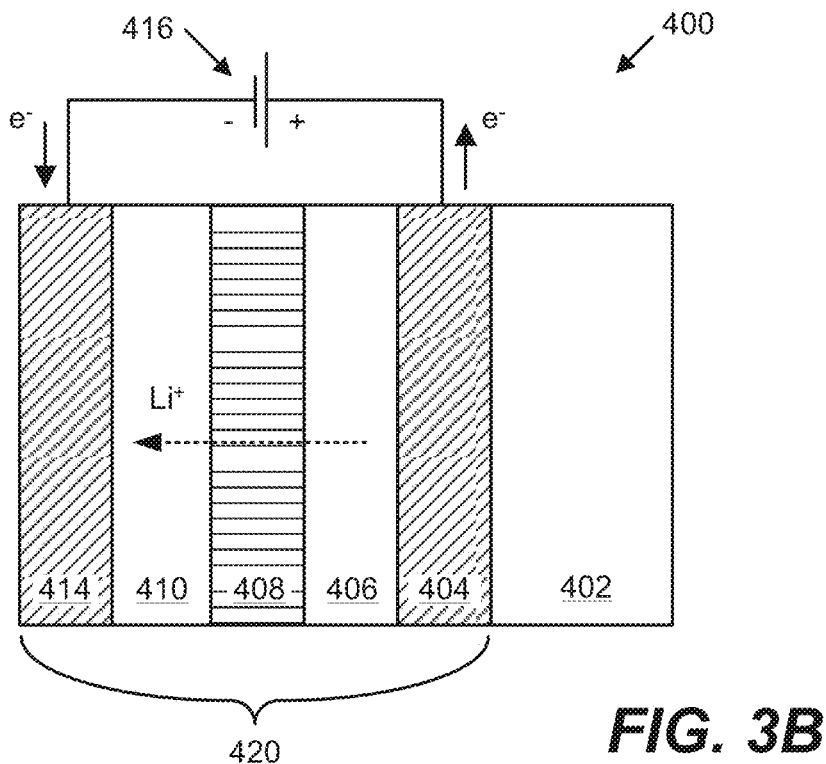
FIG. 3B depicts a schematic cross-section of an electrochromic device in a bleached state (or transitioning to a bleached state).

FIG. 3B is a schematic cross-section of an electrochromic device in a bleached state (or transitioning to a bleached state). In accordance with specific embodiments, an electrochromic device 400 includes a tungsten oxide electrochromic layer (EC) 406 and a nickel-tungsten oxide counter electrode layer (CE) 410. Electrochromic device 400 also includes a substrate 402, a conductive layer (CL) 404, an ion conducting layer (IC) 408, and conductive layer (CL) 414.

A power source 416 is configured to apply a potential and/or current to an electrochromic stack 420 through suitable connections (e.g., bus bars) to the conductive layers 404 and 414. In some embodiments, the voltage source is configured to apply a potential of a few volts in order to drive a transition of the device from one optical state to another. The polarity of the potential as shown in FIG. 3A is such that the ions (lithium ions in this example) primarily reside (as indicated by the dashed arrow) in nickel-tungsten oxide counter electrode layer 410

Figure 3C:
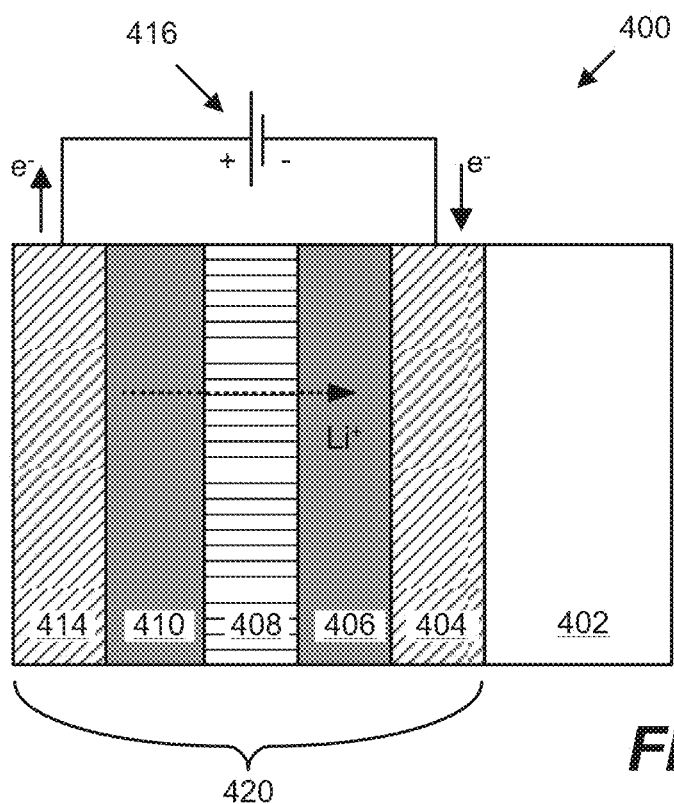
FIG. 3C depicts a schematic cross-section of the electrochromic device shown in FIG. 3B, but in a colored state (or transitioning to a colored state).

FIG. 3C is a schematic cross-section of electrochromic device 400 shown in FIG. 3B but in a colored state (or transitioning to a colored state). In FIG. 3C, the polarity of voltage source 416 is reversed, so that the electrochromic layer is made more negative to accept additional lithium ions, and thereby transition to the colored state. As indicated by the dashed arrow, lithium ions are transported across ion conducting layer 408 to tungsten oxide electrochromic layer 406. Tungsten oxide electrochromic layer 406 is shown in the colored state. Nickel-tungsten oxide counter electrode 410 is also shown in the colored state. As explained, nickel-tungsten oxide becomes progressively more opaque as it gives up (deintercalates) lithium ions. In this example, there is a synergistic effect where the transition to colored states for both layers 406 and 410 are additive toward reducing the amount of light transmitted through the stack and substrate.

As described above, an electrochromic device may include an electrochromic (EC) electrode layer and a counter electrode (CE) layer separated by an ionically conductive (IC) layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain embodiments, the counter electrode and electrochromic electrodes are formed immediately adjacent one another, sometimes in direct contact, without separately depositing an ionically conducting layer. In some embodiments, electrochromic devices having an interfacial region rather than a distinct IC layer are employed. Such devices, and methods of fabricating them, are described in U.S. Pat. No. 8,300,298 and U.S. patent application Ser. No. 12/772,075 filed on Apr. 30, 2010, and U.S. patent application Ser. Nos. 12/814,277 and 12/814,279, filed on Jun. 11, 2010—each of the three patent applications and patent is entitled "Electrochromic Devices," each names Zhongchun Wang et al. as inventors, and each is incorporated by reference herein in its entirety.

II. Window Controllers

A window controller is used to control the tint level of the electrochromic device of an electrochromic window. In some embodiments, the window controller is able to transition the electrochromic window between two tint states (levels), a bleached state and a colored state. In other embodiments, the controller can additionally transition the electrochromic window (e.g., having a single electrochromic device) to intermediate tint levels. In some disclosed embodiments, the window controller is able to transition the electrochromic window to four or more tint levels. Certain electrochromic windows allow intermediate tint levels by using two (or more) electrochromic lites in a single IGU, where each lite is a two-state lite. This is described in reference to FIGS. 2A and 2B in this section.

As noted above with respect to FIGS. 2A and 2B, in some embodiments, an electrochromic window can include an electrochromic device 400 on one lite of an IGU 200 and another electrochromic device 400 on the other lite of the IGU 200. If the window controller is able to transition each electrochromic device between two states, a bleached state and a colored state, the electrochromic window is able to attain four different states (tint levels), a colored state with both electrochromic devices being colored, a first intermediate state with one electrochromic device being colored, a second intermediate state with the other electrochromic device being colored, and a bleached state with both electrochromic devices being bleached. Embodiments of multi-pane electrochromic windows are further described in U.S. Pat. No. 8,270,059, naming Robin Friedman et al. as inventors, titled "MULTI-PANE ELECTROCHROMIC WINDOWS," which is hereby incorporated by reference in its entirety.

In some embodiments, the window controller is able to transition an electrochromic window having an electrochromic device capable of transitioning between two or more tint levels. For example, a window controller may be able to transition the electrochromic window to a bleached state, one or more intermediate levels, and a colored state. In some other embodiments, the window controller is able to transition an electrochromic window incorporating an electrochromic device between any number of tint levels between the bleached state and the colored state. Embodiments of methods and controllers for transitioning an electrochromic window to an intermediate tint level or levels are further described in U.S. Pat. No. 8,254,013, naming Disha Mehtani et al. as inventors, titled "CONTROLLING TRANSITIONS IN OPTICALLY SWITCHABLE DEVICES," which is hereby incorporated by reference in its entirety.

In some embodiments, a window controller can power one or more electrochromic devices in an electrochromic window. Typically, this function of the window controller is augmented with one or more other functions described in more detail below. Window controllers described herein are not limited to those that have the function of powering an electrochromic device to which it is associated for the purposes of control. That is, the power source for the electrochromic window may be separate from the window controller, where the controller has its own power source and directs application of power from the window power source to the window. However, it is convenient to include a power source with the window controller and to configure the controller to power the window directly, because it obviates the need for separate wiring for powering the electrochromic window.

Further, the window controllers described in this section are described as standalone controllers which may be configured to control the functions of a single window or a plurality of electrochromic windows, without integration of the window controller into a building control network or a building management system (BMS). Window controllers, however, may be integrated into a building control network or a BMS, as described further in the Building Management System section of this disclosure.

Figure 4:
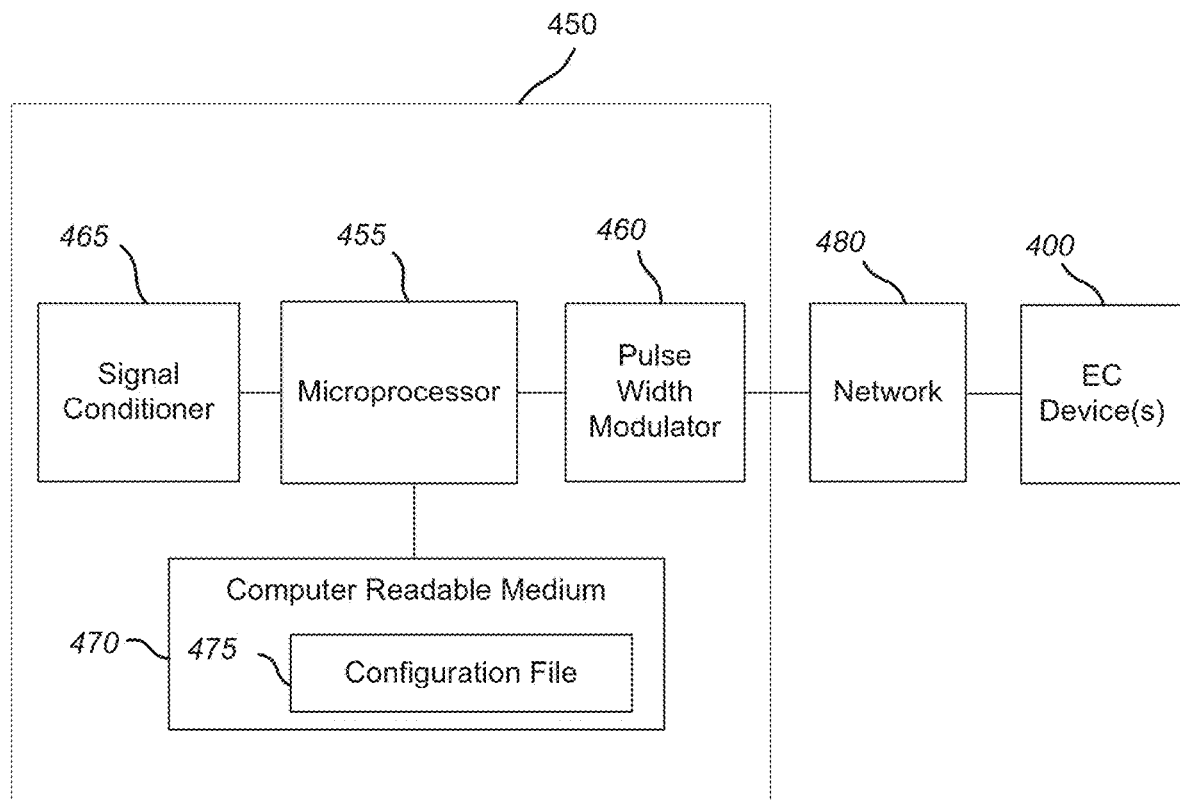
FIG. 4 depicts a simplified block diagram of components of a window controller.

FIG. 4 depicts a block diagram of some components of a window controller 450 and other components of a window controller system of disclosed embodiments. FIG. 4 is a simplified block diagram of a window controller, and more detail regarding window controllers can be found in U.S. patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent Ser. No. 13/449,235, titled "CONTROLLING TRANSITIONS IN OPTICALLY SWITCHABLE DEVICES," naming Stephen Brown et al. as inventors and filed on Apr. 17, 2012, all of which are hereby incorporated by reference in their entireties.

In FIG. 4, the illustrated components of the window controller 450 include a window controller 450 having a microprocessor 455 or other processor, a pulse width modulator 460, a signal conditioning module 465, and a computer readable medium (e.g., memory) having a configuration file 475. Window controller 450 is in electronic communication with one or more electrochromic devices 400 in an electrochromic window through network 480 (wired or wireless) to send instructions to the one or more electrochromic devices 400. In some embodiments, the window controller 450 may be a local window controller in communication through a network (wired or wireless) to a master window controller.

In disclosed embodiments, a building may have at least one room having an electrochromic window between the exterior and interior of a building. One or more sensors may be located to the exterior of the building and/or inside the room. In embodiments, the output from the one or more sensors may be input to the signal conditioning module 465 of the window controller 450. In some cases, the output from the one or more sensors may be input to a BMS, as described further in the Building Management Systems section. Although the sensors of depicted embodiments are shown as located on the outside vertical wall of the building, this is for the sake of simplicity, and the sensors may be in other locations, such as inside the room or on other surfaces to the exterior, as well. In some cases, two or more sensors may be used to measure the same input, which can provide redundancy in case one sensor fails or has an otherwise erroneous reading.

Figure 5:
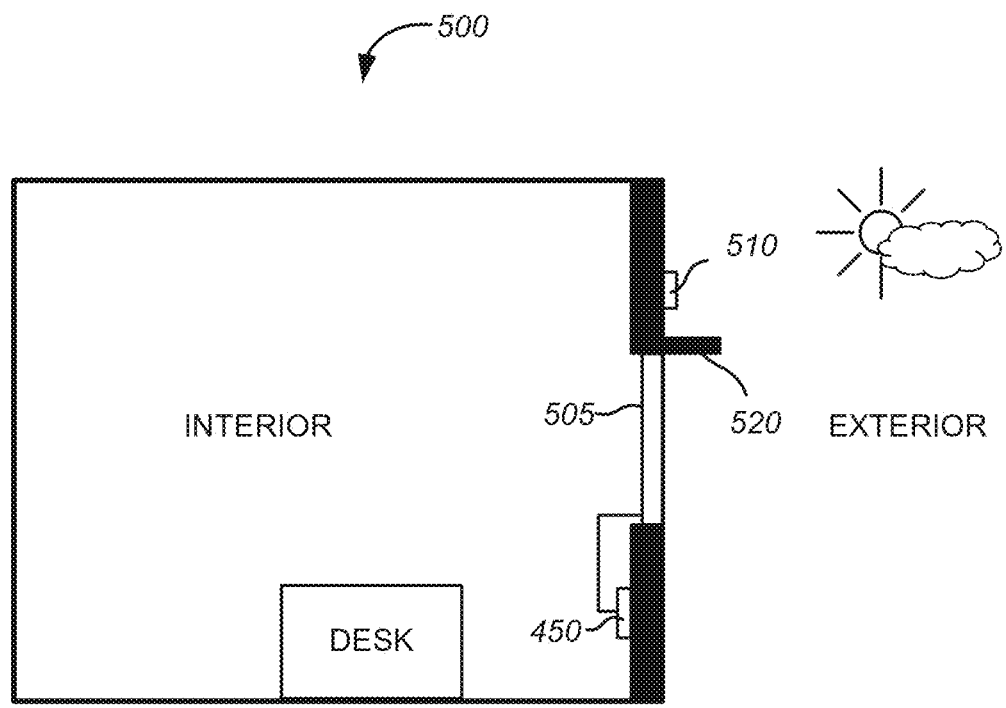
FIG. 5 depicts a schematic diagram of a room including a tintable window and at least one sensor, according to disclosed embodiments.

FIG. 5 depicts a schematic (side view) diagram of a room 500 having an electrochromic window 505 with at least one electrochromic device. The electrochromic window 505 is located between the exterior and the interior of a building, which includes the room 500. The room 500 also includes a window controller 450 connected to and configured to control the tint level of the electrochromic window 505. An exterior sensor 510 is located on a vertical surface in the exterior of the building. In other embodiments, an interior sensor may also be used to measure the ambient light in room 500. In yet other embodiments, an occupant sensor may also be used to determine when an occupant is in the room 500.

Exterior sensor 510 is a device, such as a photosensor, that is able to detect radiant light incident upon the device flowing from a light source such as the sun or from light reflected to the sensor from a surface, particles in the atmosphere, clouds, etc. The exterior sensor 510 may generate a signal in the form of electrical current that results from the photoelectric effect and the signal may be a function of the light incident on the sensor 510. In some cases, the device may detect radiant light in terms of irradiance in units of watts/$m^2$ or other similar units. In other cases, the device may detect light in the visible range of wavelengths in units of foot candles or similar units. In many cases, there is a linear relationship between these values of irradiance and visible light.

Irradiance values from sunlight can be predicted based on the time of day and time of year as the angle at which sunlight strikes the earth changes. Exterior sensor 510 can detect radiant light in real-time, which accounts for reflected and obstructed light due to buildings, changes in weather (e.g., clouds), etc. For example, on cloudy days, sunlight would be blocked by the clouds and the radiant light detected by an exterior sensor 510 would be lower than on cloudless days.

In some embodiments, there may be one or more exterior sensors 510 associated with a single electrochromic window 505. Output from the one or more exterior sensors 510 could be compared to one another to determine, for example, if one of exterior sensors 510 is shaded by an object, such as by a bird that landed on exterior sensor 510. In some cases, it may be desirable to use relatively few sensors in a building because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun. These will result in deviations from the amount of radiant light from the sun calculated to normally impinge on the building.

Exterior sensor 510 may be a type of photosensor. For example, exterior sensor 510 may be a charge coupled device (CCD), photodiode, photoresistor, or photovoltaic cell. One of ordinary skill in the art would appreciate that future developments in photosensor and other sensor technology would also work, as they measure light intensity and provide an electrical output representative of the light level.

In some embodiments, output from exterior sensor 510 may be input to the signal conditioning module 465. The input may be in the form of a voltage signal to signal conditioning module 465. Signal conditioning module 465 passes an output signal to the window controller 450. Window controller 450 determines a tint level of the electrochromic window 505, based on various information from the configuration file 475, output from the signal conditioning module 465, override values. Window controller 450 and then instructs the PWM 460, to apply a voltage and/or current to electrochromic window 505 to transition to the desired tint level.

In disclosed embodiments, window controller 450 can instruct the PWM 460, to apply a voltage and/or current to electrochromic window 505 to transition it to any one of four or more different tint levels. In disclosed embodiments, electrochromic window 505 can be transitioned to at least eight different tint levels described as: 0 (lightest), 5, 10, 15, 20, 25, 30, and 35 (darkest). The tint levels may linearly correspond to visual transmittance values and solar heat gain coefficient (SHGC) values of light transmitted through the electrochromic window 505. For example, using the above eight tint levels, the lightest tint level of 0 may correspond to an SHGC value of 0.80, the tint level of 5 may correspond to an SHGC value of 0.70, the tint level of 10 may correspond to an SHGC value of 0.60, the tint level of 15 may correspond to an SHGC value of 0.50, the tint level of 20 may correspond to an SHGC value of 0.40, the tint level of 25 may correspond to an SHGC value of 0.30, the tint level of 30 may correspond to an SHGC value of 0.20, and the tint level of 35 (darkest) may correspond to an SHGC value of 0.10.

Window controller 450 or a master controller in communication with the window controller 450 may employ any one or more predictive control logic components to determine a desired tint level based on signals from the exterior sensor 510 and/or other input. The window controller 450 can instruct the PWM 460 to apply a voltage and/or current to electrochromic window 505 to transition it to the desired tint level.

III. An example of Predictive Control Logic

Figure 6A:
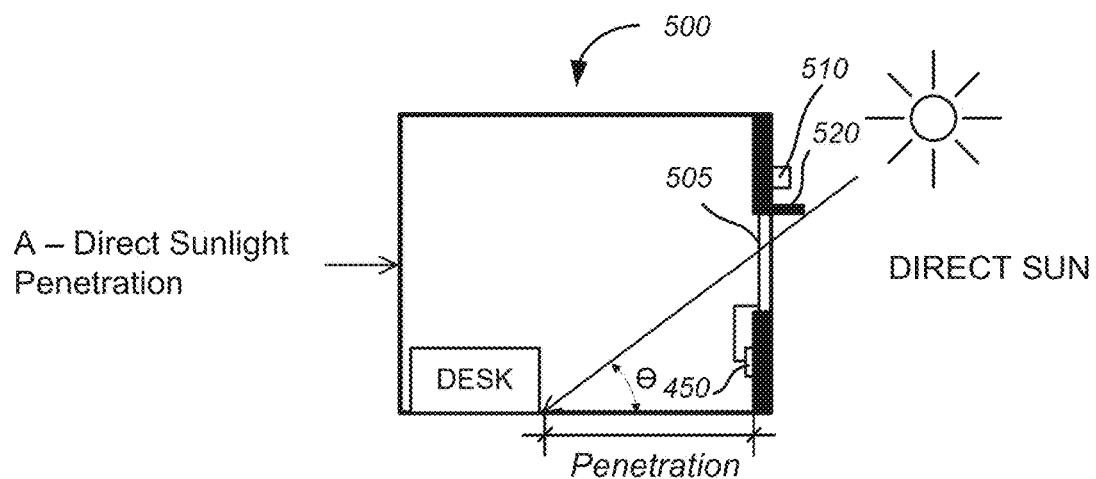
FIGS. 6A-6C include diagrams depicting information collected by each of three Modules A, B, and C of an exemplary control logic, according to disclosed embodiments.
Figure 6B:
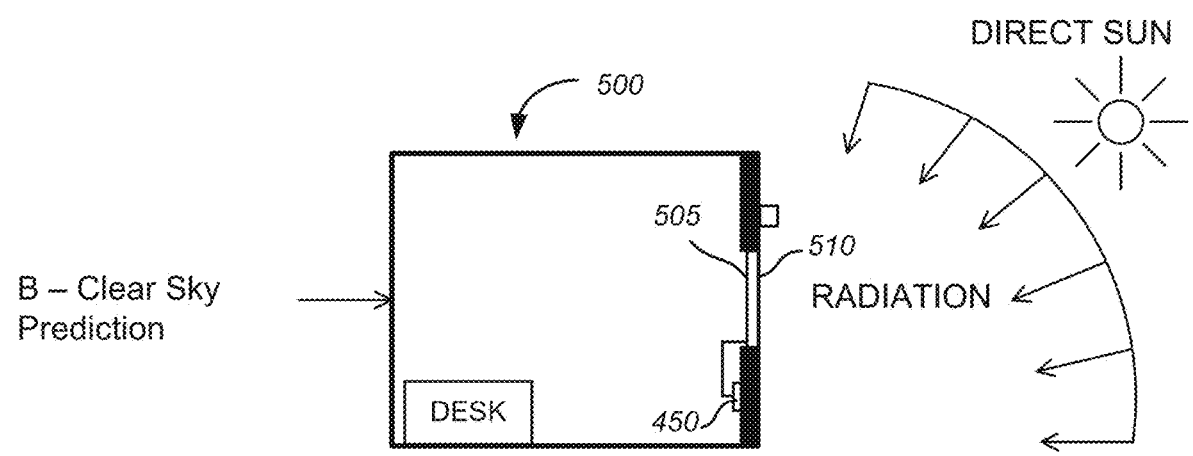
Figure 6C:
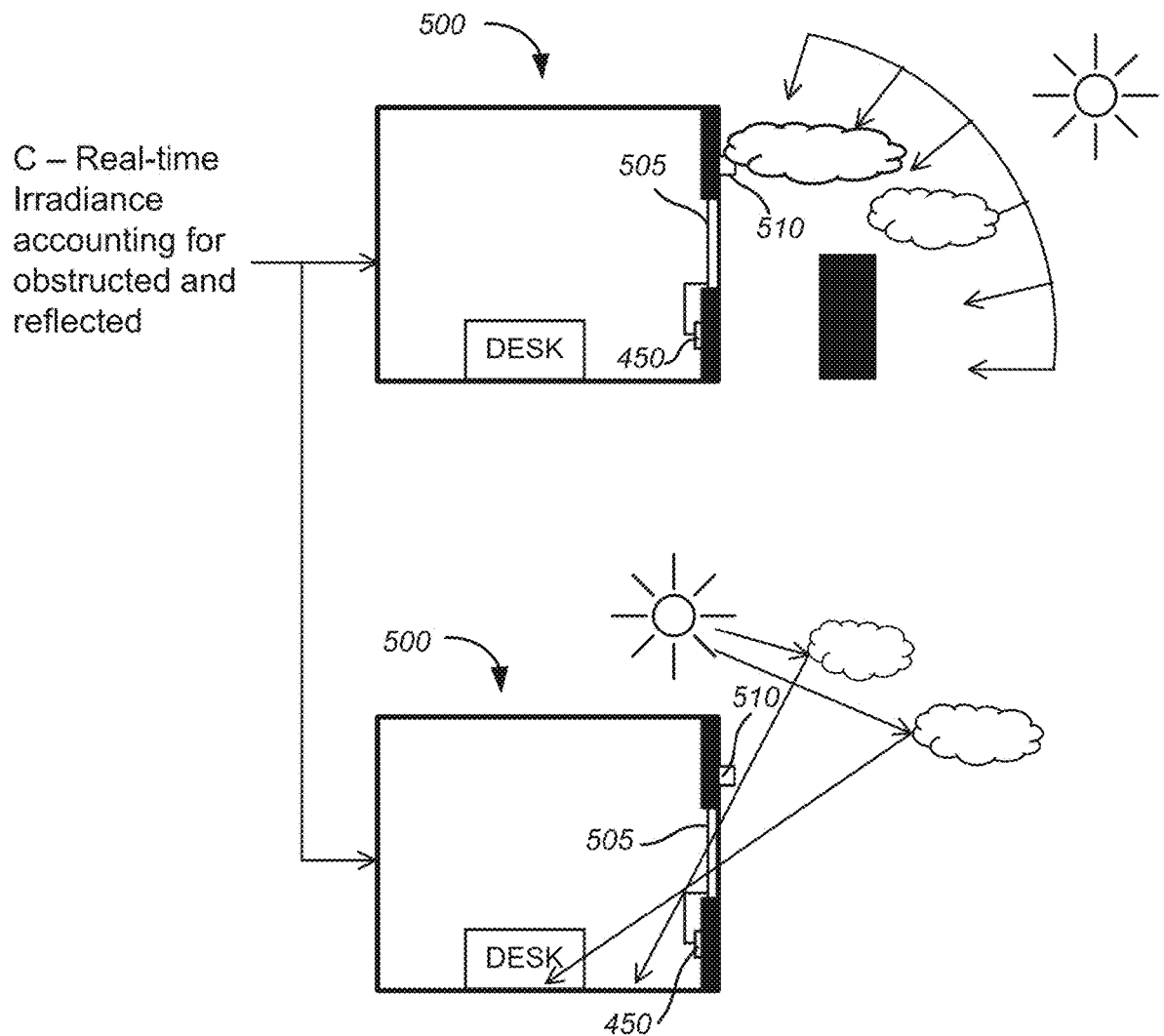

In disclosed embodiments, predictive control logic is used to implement methods of determining and controlling a desired tint level for the electrochromic window 505 or other tintable window that accounts for occupant comfort and/or energy conservation considerations. This predictive control logic may employ one or more logic modules. FIGS. 6A-6C include diagrams depicting some information collected by each of three logic modules A, B, and C of an exemplary control logic of disclosed embodiments.

FIG. 6A shows the penetration depth of direct sunlight into a room 500 through an electrochromic window 505 between the exterior and the interior of a building, which includes the room 500. Penetration depth is a measure of how far direct sunlight will penetrate into the room 500. As shown, penetration depth is measured in a horizontal direction away from the sill (bottom) of window 505. Generally, the window defines an aperture that provides an acceptance angle for direct sunlight. The penetration depth is calculated based upon the geometry of the window (e.g., window dimensions), its position and orientation in the room, any fins or other exterior shading outside of the window, and the position of the sun (e.g. angle of direct sunlight for a particular time of day and date). Exterior shading to an electrochromic window 505 may be due to any type of structure that can shade the window such as an overhang, a fin, etc. In FIG. 6A, there is an overhang 520 above the electrochromic window 505 that blocks a portion of the direct sunlight entering the room 500 thus shortening the penetration depth. The room 500 also includes a local window controller 450 connected to and configured to control the tint level of the electrochromic window 505. An exterior sensor 510 is located on a vertical surface in the exterior of the building.

Module A can be used to determine a tint level that considers occupant comfort from direct sunlight through the electrochromic window 505 onto an occupant or their activity area. The tint level is determined based on a calculated penetration depth of direct sunlight into the room and the space type (e.g., desk near window, lobby, etc.) in the room at a particular instant in time. In some cases, the tint level may also be based on providing sufficient natural lighting into the room. In many cases, the penetration depth is the value calculated at a time in the future to account for glass transition time (the time required for the window to tint, e.g. to 80%, 90% or 100% of the desired tint level). The issue addressed in Module A is that direct sunlight may penetrate so deeply into the room 500 as to show directly on an occupant working at a desk or other work surface in a room. Publicly available programs can provide calculation of the sun's position and allow for easy calculation of penetration depth.

FIG. 6A also shows a desk in the room 500 as an example of a space type associated with an activity area (i.e. desk) and location of the activity area (i.e. location of desk). Each space type is associated with different tint levels for occupant comfort. For example, if the activity is a critical activity such as work in an office being done at a desk or computer, and the desk is located near the window, the desired tint level may be higher than if the desk were further away from the window. As another example, if the activity is non-critical, such as the activity in a lobby, the desired tint level may be lower than for the same space having a desk.

FIG. 6B shows direct sunlight and radiation under clear sky conditions entering the room 500 through the electrochromic window 505. The radiation may be from sunlight scattered by molecules and particles in the atmosphere. Module B determines a tint level based on predicted values of irradiance under clear sky conditions flowing through the electrochromic window 505 under consideration. Various software, such as open source RADIANCE program, can be used to predict clear sky irradiance at a certain latitude, longitude, time of year, and time of day, and for a given window orientation.

FIG. 6C shows radiant light from the sky that is measured in real-time by an exterior sensor 510 to account for light that may be obstructed by or reflected from objects such as buildings or weather conditions (e.g., clouds) that are not accounted for in the clear sky predictions. The tint level determined by Module C is based on the real-time irradiance based on measurements taken by the exterior sensor 510.

The predictive control logic may implement one or more of the logic Modules A, B and C separately for each electrochromic window 505 in the building. Each electrochromic window 505 can have a unique set of dimensions, orientation (e.g., vertical, horizontal, tilted at an angle), position, associated space type, etc. A configuration file with this information and other information can be maintained for each electrochromic window 505. The configuration file 475 (refer to FIG. 4) may be stored in the computer readable medium 470 of the local window controller 450 of the electrochromic window 505 or in the building management system ("BMS") described later in this disclosure. The configuration file 475 can include information such as a window configuration, an occupancy lookup table, information about an associated datum glass, and/or other data used by the predictive control logic. The window configuration may include information such as the dimensions of the electrochromic window 505, the orientation of the electrochromic window 505, the position of the electrochromic window 505, etc.

A lookup table describes tint levels that provide occupant comfort for certain space types and penetration depths. That is, the tint levels in the occupancy lookup table are designed to provide comfort to occupant(s) that may be in the room 500 from direct sunlight on the occupant(s) or their workspace. An example of an occupancy lookup table is shown in FIG. 10.

The space type is a measure to determine how much tinting will be required to address occupant comfort concerns for a given penetration depth and/or provide comfortable natural lighting in the room. The space type parameter may take into consideration many factors. Among these factors is the type of work or other activity being conducted in a particular room and the location of the activity. Close work associated with detailed study requiring great attention might be at one space type, while a lounge or a conference room might have a different space type. Additionally, the position of the desk or other work surface in the room with respect to the window is a consideration in defining the space type. For example, the space type may be associated with an office of a single occupant having a desk or other workspace located near the electrochromic window 505. As another example, the space type may be a lobby.

In certain embodiments, one or more modules of the predictive control logic can determine desired tint levels while accounting for energy conservation in addition to occupant comfort. These modules may determine energy savings associated with a particular tint level by comparing the performance of the electrochromic window 505 at that tint level to a datum glass or other standard reference window. The purpose of using this reference window can be to ensure that the predictive control logic conforms to requirements of the municipal building code or other requirements for reference windows used in the locale of the building. Often municipalities define reference windows using conventional low emissivity glass to control the amount of air conditioning load in the building. As an example of how the reference window 505 fits into the predictive control logic, the logic may be designed so that the irradiance coming through a given electrochromic window 505 is never greater than the maximum irradiance coming through a reference window as specified by the respective municipality. In disclosed embodiments, predictive control logic may use the solar heat gain coefficient (SHGC) value of the electrochromic window 505 at a particular tint level and the SHGC of the reference window to determine the energy savings of using the tint level. Generally, the value of the SHGC is the fraction of incident light of all wavelengths transmitted through the window. Although a datum glass is described in many embodiments, other standard reference windows can be used. Generally the SHGC of the reference window (e.g., datum glass) is a variable that can be different for different geographical locations and window orientations, and is based on code requirements specified by the respective municipality.

Generally, buildings are designed to have a heating, ventilation, and air conditioning system ("HVAC") with the capacity to fulfill the maximum expected heating and/or air-conditioning loads required at any given instance. The calculation of required capacity may take into consideration the datum glass or reference window required in a building at the particular location where the building is being constructed. Therefore, it is important that the predictive control logic meet or exceed the functional requirements of the datum glass in order to allow building designers to confidently determine how much HVAC capacity to put into a particular building. Since the predictive control logic can be used to tint the window to provide additional energy savings over the datum glass, the predictive control logic could be useful in allowing building designers to have a lower HVAC capacity than would have been required using the datum glass specified by the codes and standards.

Particular embodiments described herein assume that energy conservation is achieved by reducing air conditioning load in a building. Therefore, many of the implementations attempt to achieve the maximum tinting possible, while accounting for occupant comfort level and perhaps lighting load in a room having with the window under consideration. However, in some climates, such as those at far northern and for southern latitudes, heating may be more of a concern than air conditioning. Therefore, the predictive control logic can be modified, specifically, road reversed in some matters, so that less tinting occurs in order to ensure that the heating load of the building is reduced.

In certain implementations, the predictive control logic has only two independent variables that can be controlled by an occupant (end user), building designer, or building operator. These are the space types for a given window and the datum glass associated with the given window. Often the datum glass is specified when the predictive control logic is implemented for a given building. The space type can vary, but is typically static. In certain implementations, the space type may be part of the configuration file maintained by the building or stored in the local window controller 450. In some cases, the configuration file may be updated to account for various changes in the building. For example, if there is a change in the space type (e.g., desk moved in an office, addition of desk, lobby changed into office area, wall moved, etc.) in the building, an updated configuration file with a modified occupancy lookup table may be stored in the computer readable medium 470. As another example, if an occupant is hitting manual override repeatedly, then the configuration file may be updated to reflect the manual override.

Figure 7:
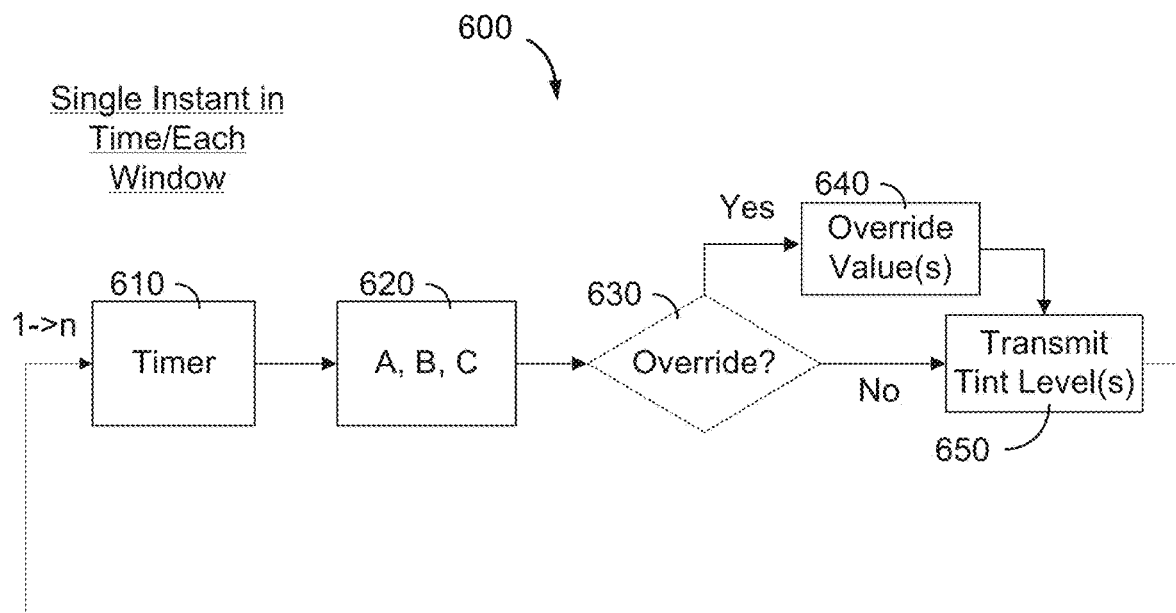
FIG. 7 is a flowchart showing some steps of predictive control logic for a method of controlling one or more electrochromic windows in a building, according to disclosed embodiments.

FIG. 7 is a flowchart showing predictive control logic for a method of controlling one or more electrochromic windows 505 in a building, according to embodiments. The predictive control logic uses one or more of the Modules A, B, and C to calculate tint levels for the window(s) and sends instructions to transition the window(s). The calculations in the control logic are run 1 to n times at intervals timed by the timer at step 610. For example, the tint level can be recalculated 1 to n times by one or more of the Modules A, B, and C and calculated for instances in time $t_i=t_1, t_2 \ldots t_n$. n is the number of recalculations performed and n can be at least 1. The logic calculations can be done at constant time intervals in some cases. In one cases, the logic calculations may be done every 2 to 5 minutes. However, tint transition for large pieces of electrochromic glass (e.g. up to 6'×10 feet) can take up to 30 minutes or more. For these large windows, calculations may be done on a less frequent basis such as every 30 minutes.

At step 620, logic Modules A, B, and C perform calculations to determine a tint level for each electrochromic window 505 at a single instant in time $t_i$. These calculations can be performed by the window controller 450. In certain embodiments, the predictive control logic predictively calculates how the window should transition in advance of the actual transition. In these cases, the calculations in Modules A, B, and C can be based on a future time around or after transition is complete. In these cases, the future time used in the calculations may be a time in the future that is sufficient to allow the transition to be completed after receiving the tint instructions. In these cases, the controller can send tint instructions in the present time in advance of the actual transition. By the completion of the transition, the window will have transitioned to a tint level that is desired for that time.

"At step 630, the predictive control logic allows for certain types of overrides that disengage the algorithm at Modules A, B, and C and define override tint levels at step 640 based on some other consideration. One type of override is a manual override. This is an override implemented by an end user who is occupying a room and determines that a particular tint level (override value) is desirable. There may be situations where the user's manual override is itself overridden. An example of an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building may override the tint level from the predictive control logic described herein to ensure that all windows have a particularly high level of tinting. Another example of an override may be if there is no occupant in the room during a example weekend in a commercial office building. In these cases, the building may disengage one or more Modules that relate to occupant comfort and all the windows may have a high level of tinting in cold weather and low level of tinting in warm weather."

At step 650, the tint levels are transmitted over a network to electrochromic device(s) in one or more electrochromic windows 505 in the building. In certain embodiments, the transmission of tint levels to all windows of a building may be implemented with efficiency in mind. For example, if the recalculation of tint level suggests that no change in tint from the current tint level is required, then there is no transmission of instructions with an updated tint level. As another example, the building may be divided into zones based on window size. The predictive control logic may recalculate tint levels for zones with smaller windows more frequently than for zones with larger windows.

In some embodiments, the logic in FIG. 7 for implementing the control methods for multiple electrochromic windows 505 in an entire building can be on a single device, for example, a single master window controller. This device can perform the calculations for each and every tintable window in the building and also provide an interface for transmitting tint levels to one or more electrochromic devices in individual electrochromic windows 505, for example, in multi-zone windows or on multiple EC lites of an insulated glass unit. Some examples of multi-zone windows can be found in PCT application No. PCT/US14/71314 titled "MULTI-ZONE EC WINDOWS," which is hereby incorporated by reference in its entirety.

Also, there may be certain adaptive components of the predictive control logic of embodiments. For example, the predictive control logic may determine how an end user (e.g. occupant) tries to override the algorithm at particular times of day and makes use of this information in a more predictive manner to determine desired tint levels. In one case, the end user may be using a wall switch to override the tint level provided by the predictive logic at a certain time each day to an override value. The predictive control logic may receive information about these instances and change the predictive control logic to change the tint level to the override value at that time of day.

Figure 8:
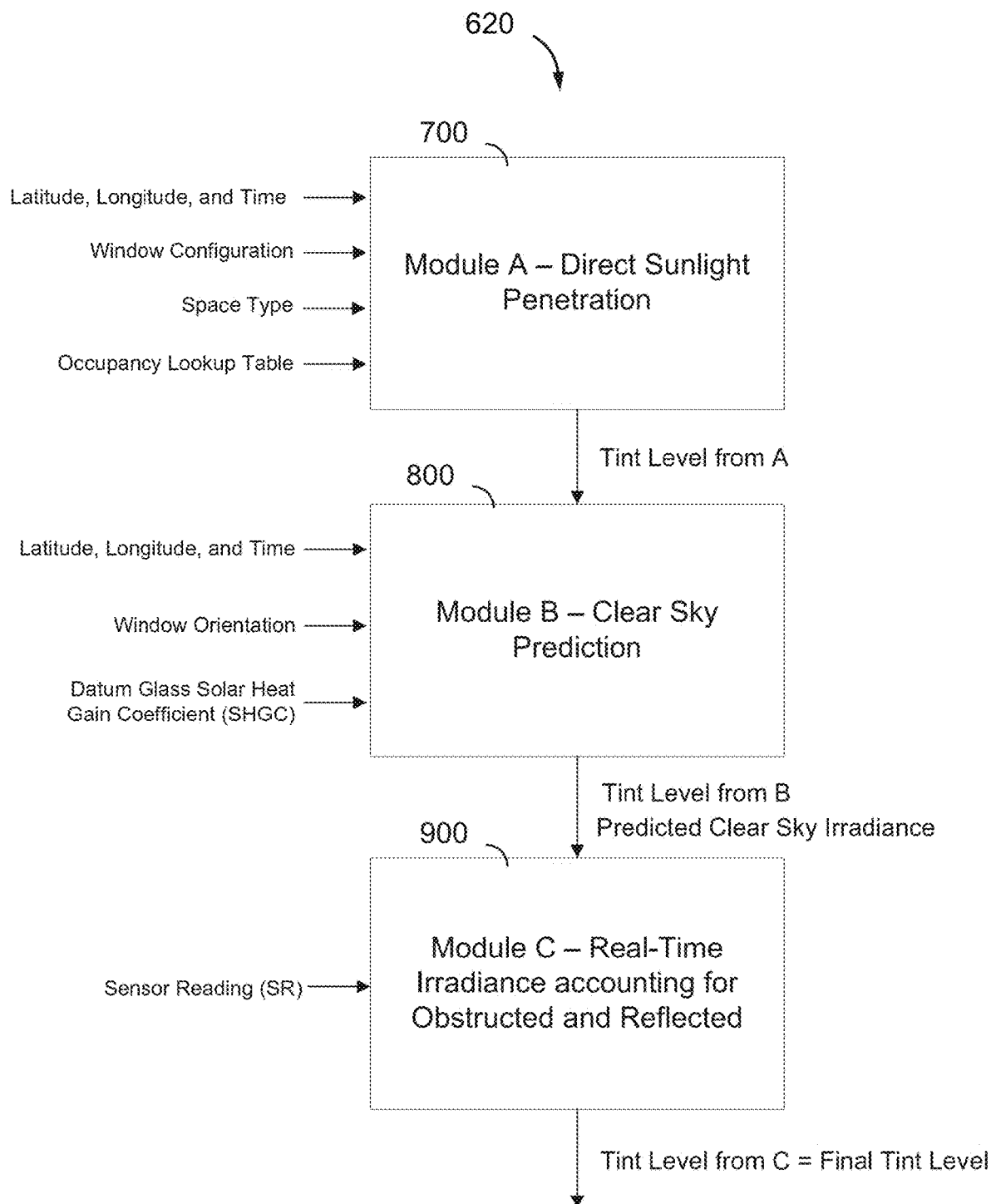
FIG. 8 is a flowchart showing a particular implementation of a portion of the control logic shown in FIG. 7.

FIG. 8 is a diagram showing a particular implementation of block 620 from FIG. 7. This diagram shows a method of performing all three Modules A, B, and C in sequence to calculate a final tint level of a particular electrochromic window 505 for a single instant in time $t_i$. The final tint level may be the maximum permissible transmissivity of the window under consideration. FIG. 8 also includes some exemplary inputs and outputs of Modules A, B, and C. The calculations in Modules A, B, and C are performed by window controller 450 in local window controller 450 in embodiments. In other embodiments, one or more of the modules can be performed by another processor. Although illustrated embodiments show all three Modules A, B, and C being used, other embodiments may use one or more of the Modules A, B, and C or may use additional modules.

At step 700, window controller 450 uses Module A to determine a tint level for occupant comfort to prevent direct glare from sunlight penetrating the room 500. Window controller 450 uses Module A to calculate the penetration depth of direct sunlight into the room 500 based on the sun's position in the sky and the window configuration from the configuration file. The position of the sun is calculated based on the latitude and longitude of the building and the time of day and date. The occupancy lookup table and space type are input from a configuration file for the particular window. Module A outputs the Tint level from A to Module B.

The goal of Module A is to ensure that direct sunlight or glare does not strike the occupant or his or her workspace. The tint level from Module A is determined to accomplish this purpose. Subsequent calculations of tint level in Modules B and C can reduce energy consumption and may require even greater tint. However, if subsequent calculations of tint level based on energy consumption suggest less tinting than required to avoid interfering with the occupant, the predictive logic prevents the calculated greater level of transmissivity from being executed to assure occupant comfort.

At step 800, the tint level calculated in Module A is input into Module B. A tint level is calculated based on predictions of irradiance under clear sky conditions (clear sky irradiance). Window controller 450 uses Module B to predict clear sky irradiance for the electrochromic window 505 based on window orientation from the configuration file and based on latitude and longitude of the building. These predictions are also based on a time of day and date. Publicly available software such as the RADIANCE program, which is an open-source program, can provide the calculations for predicting clear sky irradiance. The SHGC of the datum glass is also input into Module B from the configuration file. Window controller 450 uses Module B to determine a tint level that is darker than the tint level in A and transmits less heat than the datum glass is predicted to transmit under maximum clear sky irradiance. Maximum clear sky irradiance is the highest level of irradiance for all times predicted for clear sky conditions.

At step 900, a tint level from B and predicted clear sky irradiance are input to Module C. Real-time irradiance values are input to Module C based on measurements from an exterior sensor 510. Window controller 450 uses Module C to calculate irradiance transmitted into the room if the window were tinted to the Tint level from Module B under clear sky conditions. Window controller 450 uses Module C to find the appropriate tint level where the actual irradiance through the window with this tint level is less than or equal to the irradiance through the window with the Tint level from Module B. The tint level determined in Module C is the final tint level.

Much of the information input to the predictive control logic is determined from fixed information about the latitude and longitude, time and date. This information describes where the sun is with respect to the building, and more particularly with respect to the window for which the predictive control logic is being implemented. The position of the sun with respect to the window provides information such as the penetration depth of direct sunlight into the room assisted with the window. It also provides an indication of the maximum irradiance or solar radiant energy flux coming through the window. This calculated level of irradiance can be modified by sensor input which might indicate that there is a reduction from the maximum amount of irradiance. Again, such reduction might be caused by a cloud or other obstruction between the window and the sun.

Figure 9:
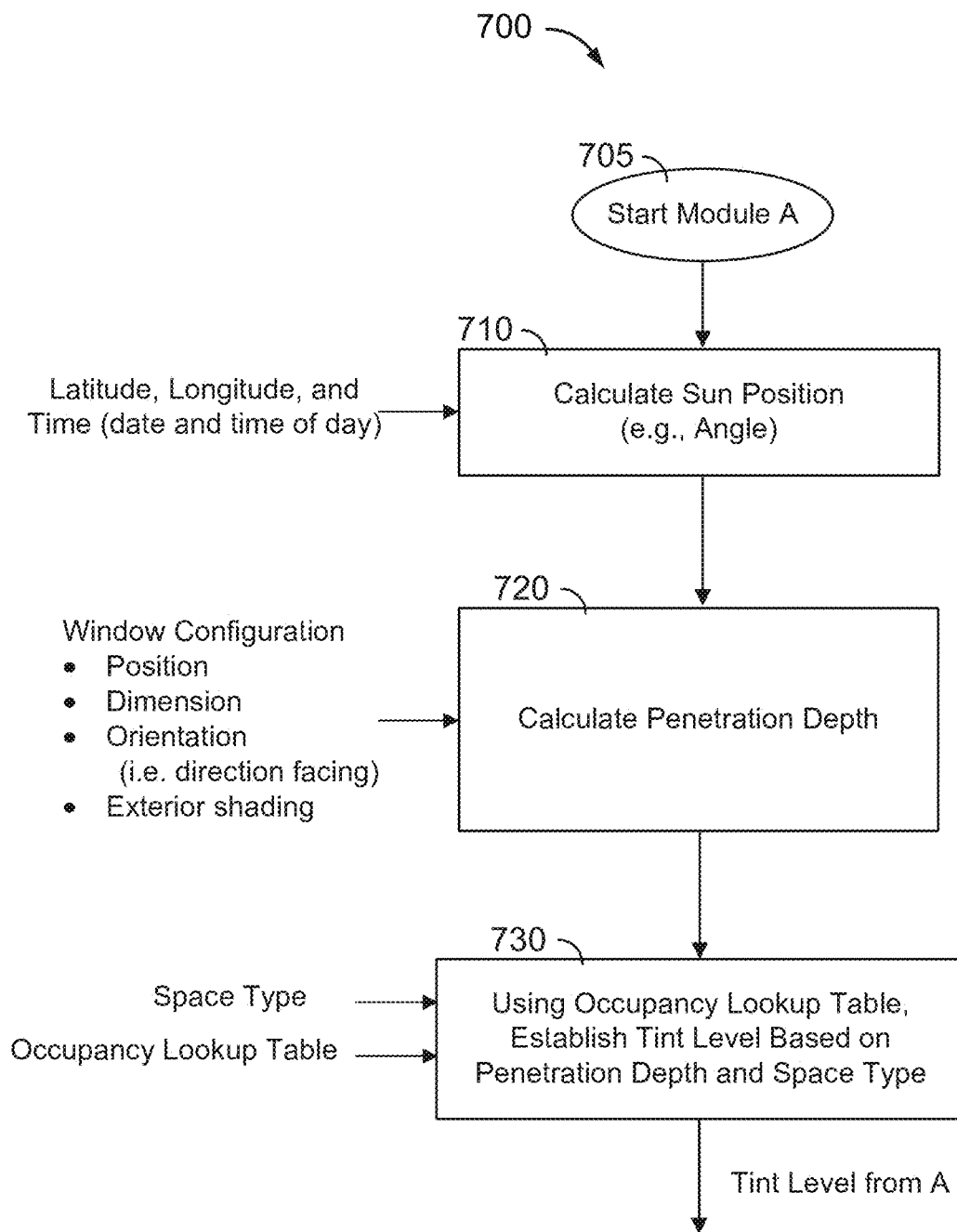
FIG. 9 is a flowchart showing details of Module A according to disclosed embodiments.

FIG. 9 is a flowchart showing details of step 700 of FIG. 8. At step 705, Module A begins. At step 710, the window controller 450 uses Module A to calculate the position of the sun for the latitude and longitude coordinates of the building and the date and time of day of a particular instant in time, $t_i$. The latitude and longitude coordinates may be input from the configuration file. The date and time of day may be based on the current time provided by the timer. The sun position is calculated at the particular instant in time, t, which may be in the future in some cases. In other embodiments, the position of the sun is calculated in another component (e.g., module) of the predictive control logic.

At step 720, window controller 450 uses Module A to calculate the penetration depth of direct sunlight into the room 500 at the particular instant in time used in step 710. Module A calculates the penetration depth based on the calculated position of the sun and window configuration information including the position of the window, dimensions of the window, orientation of the window (i.e. direction facing), and the details of any exterior shading. The window configuration information is input from the configuration file associated with the electrochromic window 505. For example, Module A can be used to calculate the penetration depth of the vertical window shown in FIG. 6A by first calculating the angle θ of the direct sunlight based on the position of the sun calculated at the particular instant in time. The penetration depth can be determined based on calculated angle θ and the location of the lintel (top of the window).

At step 730, a tint level is determined that will provide occupant comfort for the penetration depth calculated in step 720. The occupancy lookup table is used to find a desired tint level for the space type associated with the window, for the calculated penetration depth, and for the acceptance angle of the window. The space type and occupancy lookup table are provided as input from the configuration file for the particular window.

Figure 11A:
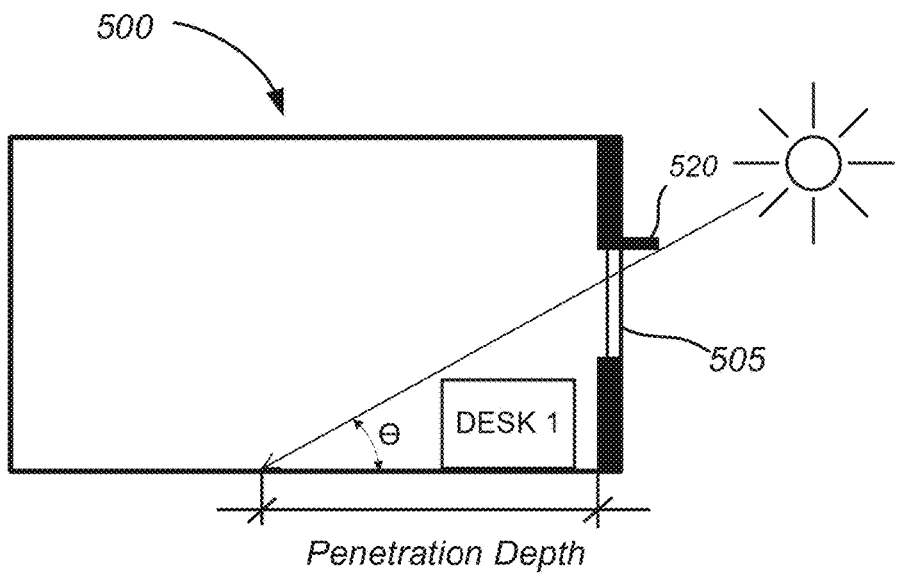
FIG. 11A depicts a schematic diagram of a room including an electrochromic window with a space type based on a Desk 1 located near the window, according to disclosed embodiments.
Figure 11B:
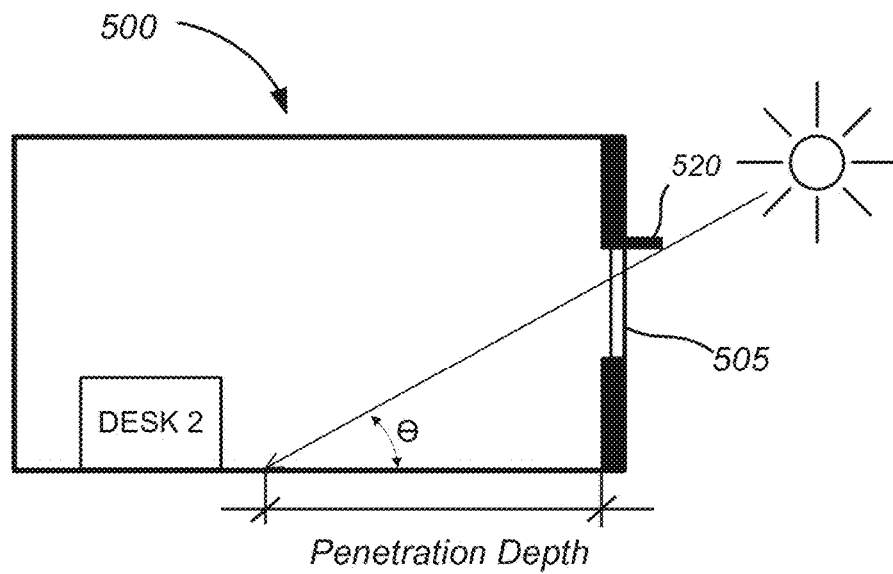
FIG. 11B depicts a schematic diagram of a room including an electrochromic window with a space type based on a Desk 2 located further away from the window than in FIG. 11A, according to disclosed embodiments.
Figure 20:
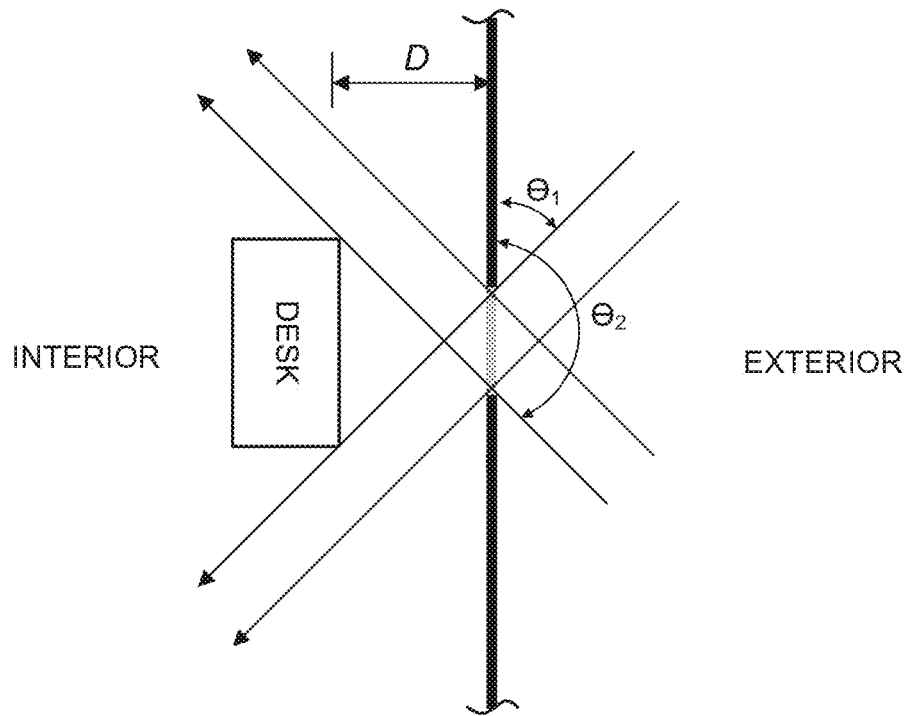
FIG. 20 is an example of an occupancy lookup table and a schematic diagram of a room with a desk and window showing the relationship between acceptance angle, sun angle, and penetration depth, according to embodiments.

An example of an occupancy lookup table is provided in FIG. 10. The values in the table are in terms of a Tint level and associated SHGC values in parenthesis. FIG. 10 shows the different tint levels (SHGC values) for different combinations of calculated penetration values and space types. The table is based on eight tint levels including 0 (lightest), 5, 10, 15, 20, 25, 30, and 35 (lightest). The lightest tint level of 0 corresponds to an SHGC value of 0.80, the tint level of 5 corresponds to an SHGC value of 0.70, the tint level of 10 corresponds to an SHGC value of 0.60, the tint level of 15 corresponds to an SHGC value of 0.50, the tint level of 20 corresponds to an SHGC value of 0.40, the tint level of 25 corresponds to an SHGC value of 0.30, the tint level of 30 corresponds to an SHGC value of 0.20, and the tint level of 35 (darkest) corresponds to an SHGC value of 0.10. The illustrated example includes three space types: Desk 1, Desk 2, and Lobby and six penetration depths. FIG. 11A shows the location of Desk 1 in the room 500. FIG. 11B shows the location of Desk 2 in the room 500. As shown in the occupancy lookup table of FIG. 10, the tint levels for Desk 1 close to the window are higher than the tint levels for Desk 2 far from window to prevent glare when the desk is closer to the window. Occupancy lookup tables with other values may be used in other embodiments. For example, one other occupancy lookup table may include only four tint levels associated with the penetration values. Another example of an occupancy table with four tint levels associated with four penetration depths is shown in FIG. 20.

Figure 12:
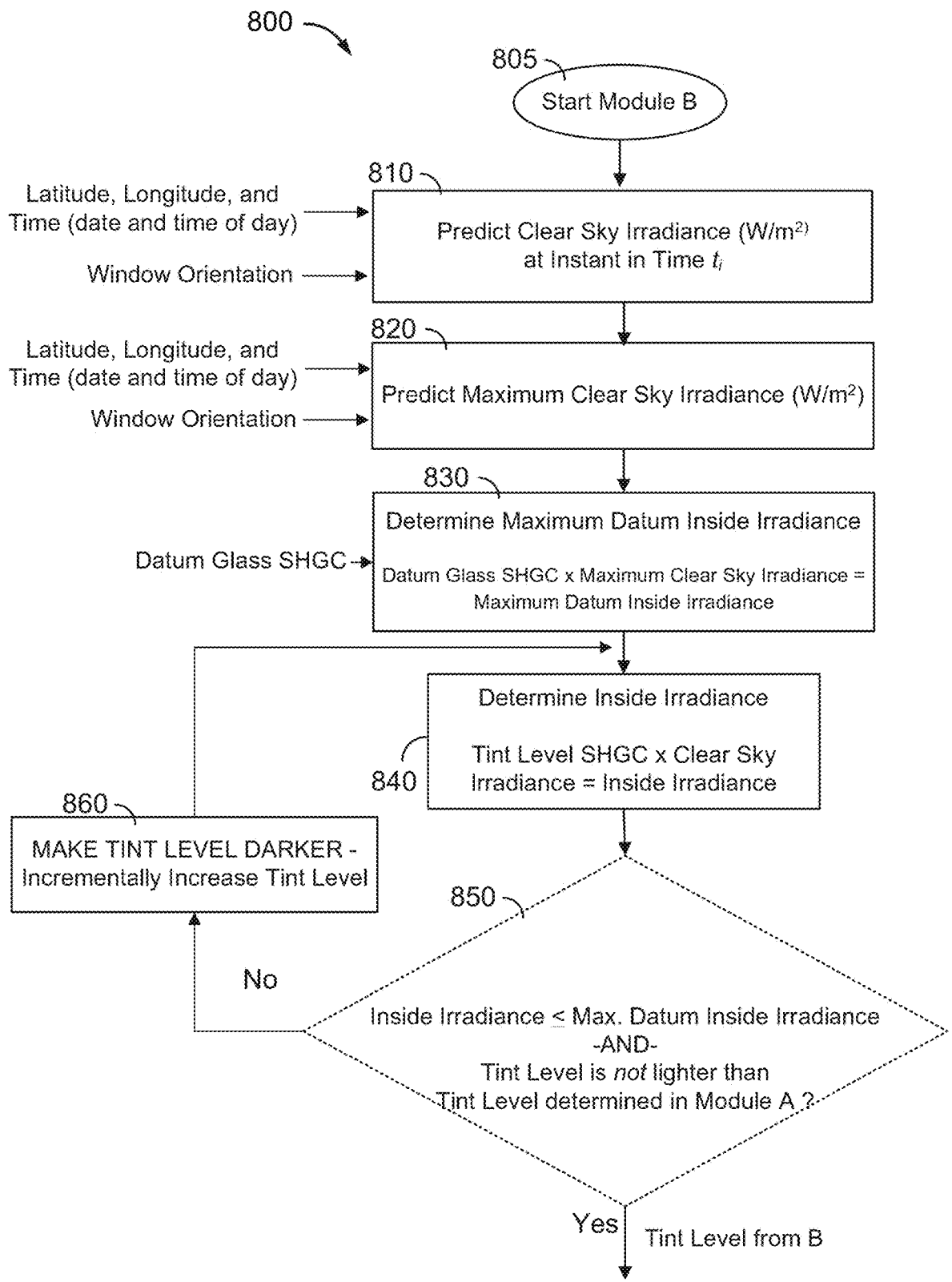
FIG. 12 is a flowchart showing details of Module B according to disclosed embodiments.

FIG. 12 is a diagram showing further detail of step 800 of FIG. 8. At step 805, Module B begins. At step 810, Module B can be used to predict the irradiance at the window under clear sky conditions at $t_i$. This clear sky irradiance at $t_i$ is predicted based on the latitude and longitude coordinates of the building and the window orientation (i.e. direction the window is facing). At step 820, the Maximum Clear Sky Irradiance incident the window at all times is predicted. These predicted values of clear sky irradiance can be calculated using open source software, such as Radiance.

At step 830, the window controller 450 uses Module B to determine the maximum amount of irradiance that would be transmitted through a datum glass into the room 500 at that time (i.e. determines Maximum Datum Inside Irradiance). The calculated Maximum Clear Sky Irradiance from step 820 and the datum glass SHGC value from the configuration file can be used to calculate the Maximum Irradiance inside the space using the equation: Maximum Datum Inside Irradiance=Datum Glass SHGC×Maximum Clear Sky Irradiance.

At step 840, window controller 450 uses Module B to determine inside irradiance into the room 500 having a window with the current tint level based on the equation. The calculated Clear Sky Irradiance from step 810 and the SHGC value associated with the current tint level can be used to calculate the value of the inside irradiance using the equation: Tint level Irradiance=Tint level SHGC×Clear Sky Irradiance.

In one embodiment, one or more the steps 705, 810 and 820 may be performed by a solar position calculator separate from Modules A and B. A solar position calculator refers to logic that determines the position of the sun at a particular future time and makes predictive determinations (e.g., predicts clear sky irradiance) based on the sun's position at that future time. The solar position calculator may perform one or more steps of the methods disclosed herein. The solar position calculator may be a portion of the predictive control logic performed by one or more of the components of the master window controller (e.g., master window controller 1402 depicted in FIG. 17). For example, the solar position calculator may be part of the predictive control logic shown in FIG. 18 implemented by the window controller 1410 (shown in FIG. 17).

At step 850, window controller 450 uses Module B to determine whether the inside irradiance based on the current tint level is less than or equal to the maximum datum inside irradiance and the tint level is darker than the tint level from A. If the determination is NO, the current tint level is incrementally increased (darkened) at step 860 and the inside irradiance is recalculated at step 840. If the determination is YES at step 850, Module B ends.

Figure 13:
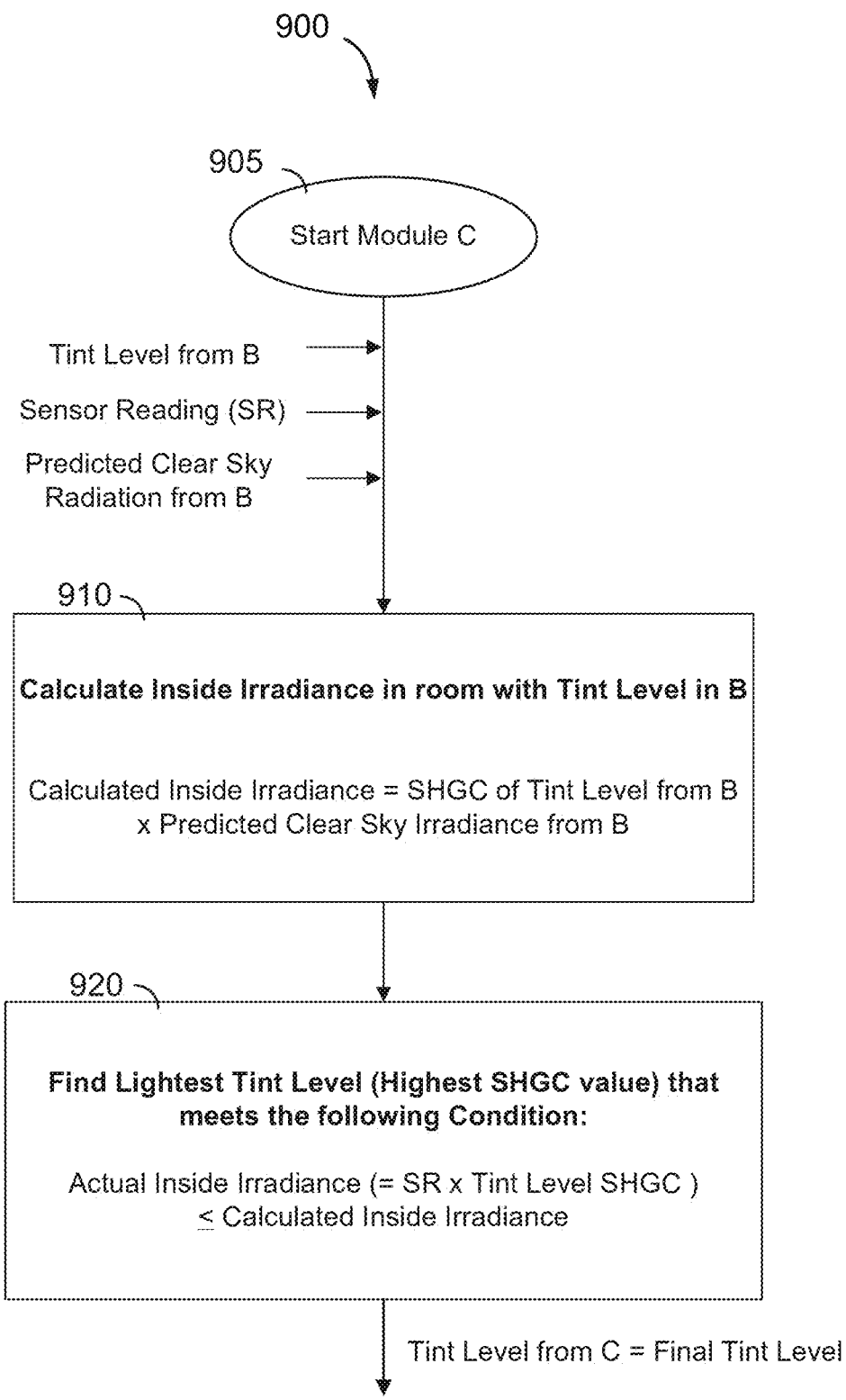
FIG. 13 is a flowchart showing details of Module C according to disclosed embodiments.

FIG. 13 is a diagram showing further detail of step 900 of FIG. 8. At step 905, Module C begins. A tint level from B and predicted clear sky irradiance at the instant in time $t_1$ is input from Module B. Real-time irradiance values are input to Module C based on measurements from an exterior sensor 510.

At step 910, window controller 450 uses Module C to calculate irradiance transmitted into the room through an electrochromic window 505 tinted to the Tint level from B under clear sky conditions. This Calculated Inside Irradiance can be determined using the equation: Calculated Inside Irradiance=SHGC of Tint Level from B×Predicted Clear Sky Irradiance from B.

At step 920, window controller 450 uses Module C to find the appropriate tint level where the actual irradiance (=SR× Tint level SHGC) through the window with this tint level is less than or equal to the irradiance through the window with the Tint level from B (i.e. Actual Inside Irradiance≤Calculated Inside Irradiance). In some cases, the module logic starts with the tint level from B and incrementally increases the tint level until the Actual Inside Irradiance≤Calculated Inside Irradiance. The tint level determined in Module C is the final tint level. This final tint level may be transmitted in tint instructions over the network to the electrochromic device(s) in the electrochromic window 505.

Figure 14:
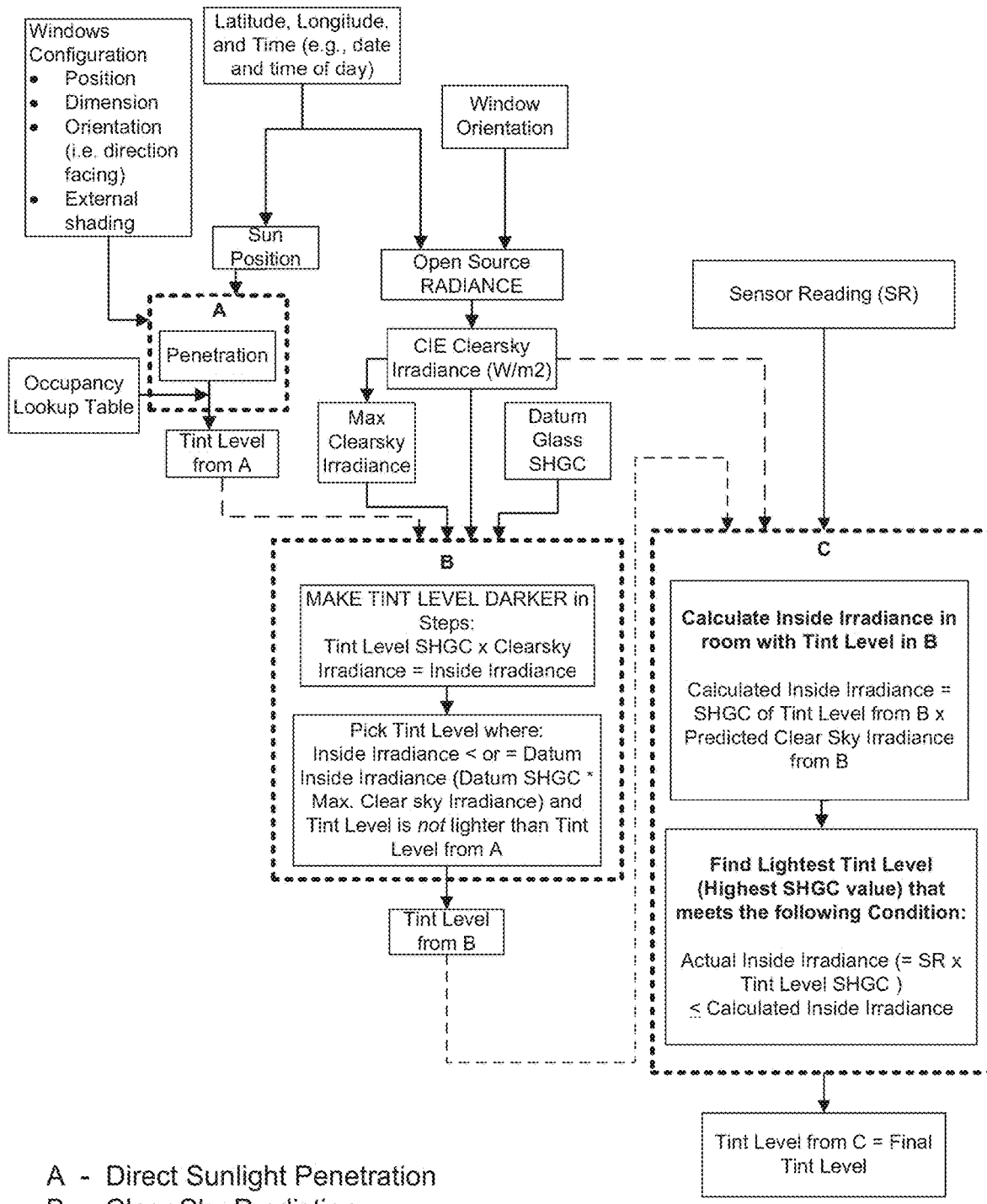
FIG. 14 is a diagram showing another implementation of a portion of the control logic shown in FIG. 7.

FIG. 14 is a diagram includes another implementation of block 620 from FIG. 7. This diagram shows a method of performing Modules A, B, and C of embodiments. In this method, the position of the sun is calculated based on the latitude and longitude coordinates of the building for a single instant in time $t_i$. The penetration depth is calculated in Module A based on the window configuration including a position of the window, dimensions of the window, orientation of the window, and information about any external shading. Module A uses a lookup table to determine the tint level from A based on the calculated penetration and the space type. The tint level from A is then input into Module B.

A program such as the open source program Radiance, is used to determine clear sky irradiance based on window orientation and latitude and longitude coordinates of the building for both a single instant in time $t_i$ and a maximum value for all times. The datum glass SHGC and calculated maximum clear sky irradiance are input into Module B. Module B increases the tint level calculated in Module A in steps and picks a tint level where the Inside radiation is less than or equal to the Datum Inside Irradiance where: Inside Irradiance=Tint level SHGC×Clear Sky Irradiance and Datum Inside Irradiance=Datum SHGC×Maximum Clear Sky Irradiance. However, when Module A calculates the maximum tint of the glass, module B doesn't change the tint to make it lighter. The tint level calculated in B is then input into Module C. The predicted clear sky irradiance is also input into Module C.

Module C calculates the inside irradiance in the room with an electrochromic window 505 having the tint level from B using the equation: Calculated Inside Irradiance=SHGC of Tint Level from B×Predicted Clear Sky Irradiance from B. Module C then finds the appropriate tint level that meets the condition where actual inside irradiance is less than or equal to the Calculated Inside Irradiance. The actual inside irradiance is determined using the equation: Actual Inside Irradiance=SR×Tint level SHGC. The tint level determined by Module C is the final tint level in tint instructions sent to the electrochromic window 505.

IV. Building Management Systems (BMSs)

The window controllers described herein also are suited for integration with a BMS. A BMS is a computer-based control system installed in a building that monitors and controls the building's mechanical and electrical equipment such as ventilation, lighting, power systems, elevators, fire systems, and security systems. A BMS consists of hardware, including interconnections by communication channels to a computer or computers, and associated software for maintaining conditions in the building according to preferences set by the occupants and/or by the building manager. For example, a BMS may be implemented using a local area network, such as Ethernet. The software can be based on, for example, internet protocols and/or open standards. One example is software from Tridium, Inc. (of Richmond, Va.). One communications protocol commonly used with a BMS is BACnet (building automation and control networks).

A BMS is most common in a large building, and typically functions at least to control the environment within the building. For example, a BMS may control temperature, carbon dioxide levels, and humidity within a building. Typically, there are many mechanical devices that are controlled by a BMS such as heaters, air conditioners, blowers, vents, and the like. To control the building environment, a BMS may turn on and off these various devices under defined conditions. A core function of a typical modern BMS is to maintain a comfortable environment for the building's occupants while minimizing heating and cooling costs/demand Thus, a modern BMS is used not only to monitor and control, but also to optimize the synergy between various systems, for example, to conserve energy and lower building operation costs.

In some embodiments, a window controller is integrated with a BMS, where the window controller is configured to control one or more electrochromic windows 505 or other tintable windows. In one embodiment, the one or more electrochromic windows include at least one all solid state and inorganic electrochromic device, but may include more than one electrochromic device, e.g. where each lite or pane of an IGU is tintable. In one embodiment, the one or more electrochromic windows include only all solid state and inorganic electrochromic devices. In one embodiment, the electrochromic windows are multistate electrochromic windows, as described in U.S. patent application Ser. No. 12/851,514, filed on Aug. 5, 2010, and entitled "Multipane Electrochromic Windows."

Figure 15:
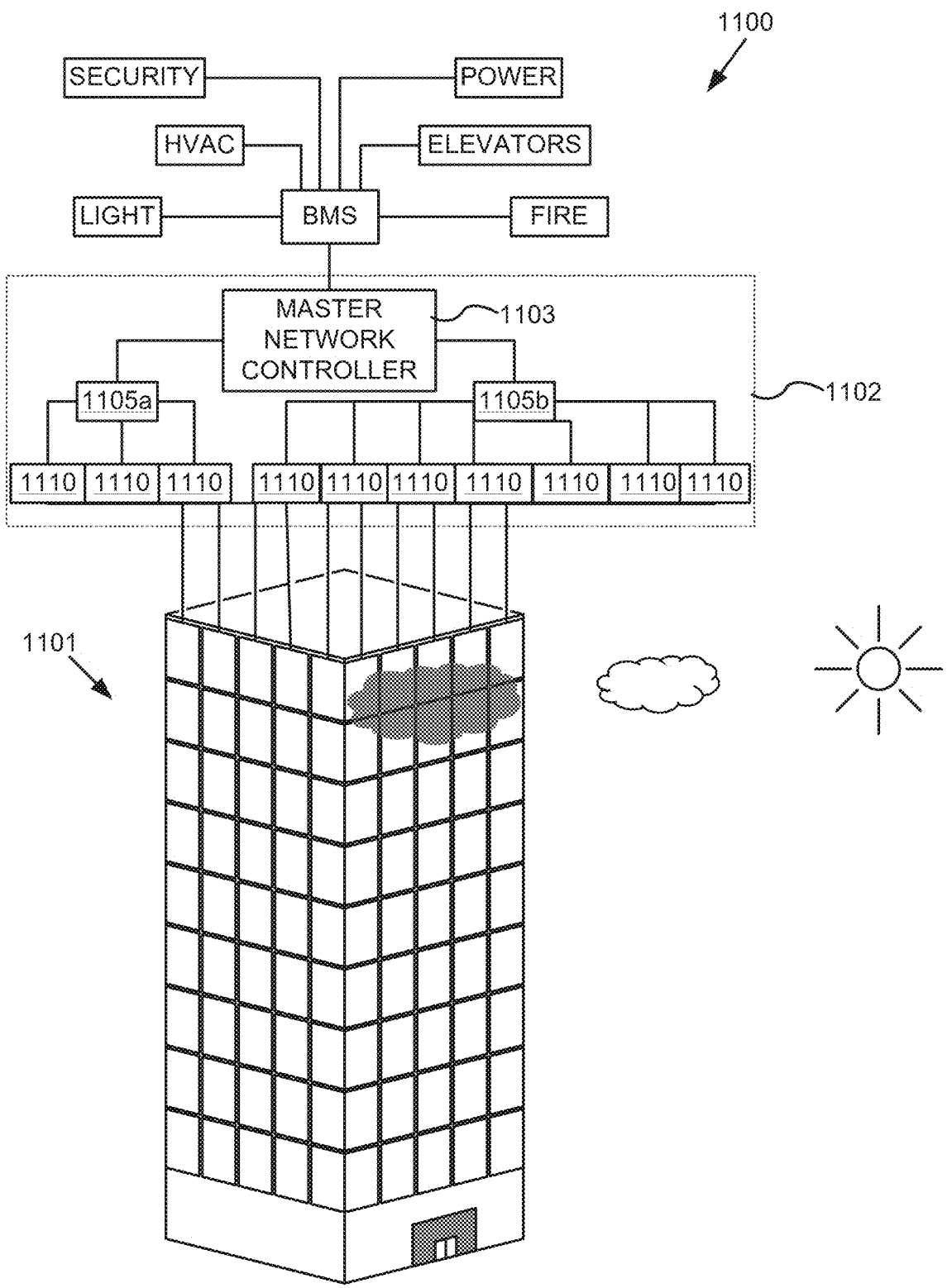
FIG. 15 depicts a schematic diagram of an embodiment of a building management system.

FIG. 15 depicts a schematic diagram of an embodiment of a BMS 1100, that manages a number of systems of a building 1101, including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and the like. Fire systems may include fire alarms and fire suppression systems including a water plumbing control. Lighting systems may include interior lighting, exterior lighting, emergency warning lights, emergency exit signs, and emergency floor egress lighting. Power systems may include the main power, backup power generators, and uninterrupted power source (UPS) grids.

Also, BMS 1100 manages a master window controller 1102. In this example, master window controller 1102 is depicted as a distributed network of window controllers including a master network controller, 1103, intermediate network controllers, 1105a and 1105b, and end or leaf controllers 1110. End or leaf controllers 1110 may be similar to window controller 450 described with respect to FIG. 4. For example, master network controller 1103 may be in proximity to the BMS 1100, and each floor of building 1101 may have one or more intermediate network controllers 1105a and 1105b, while each window of the building has its own end controller 1110. In this example, each of controllers 1110 controls a specific electrochromic window of building 1101.

Each of controllers 1110 can be in a separate location from the electrochromic window that it controls, or be integrated into the electrochromic window. For simplicity, only ten electrochromic windows of building 1101 are depicted as controlled by master window controller 1102. In a typical setting there may be a large number of electrochromic windows in a building controlled by master window controller 1102. Master window controller 1102 need not be a distributed network of window controllers. For example, a single end controller which controls the functions of a single electrochromic window also falls within the scope of the embodiments disclosed herein, as described above. Advantages and features of incorporating electrochromic window controllers as described herein with BMSs are described below in more detail and in relation to FIG. 15, where appropriate.

One aspect of the disclosed embodiments is a BMS including a multipurpose electrochromic window controller as described herein. By incorporating feedback from a electrochromic window controller, a BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of, and higher productivity from, staff, and various combinations of these, because the electrochromic windows can be automatically controlled. In some embodiments, a BMS may not be present or a BMS may be present but may not communicate with a master network controller or communicate at a high level with a master network controller. In certain embodiments, maintenance on the BMS would not interrupt control of the electrochromic windows.

Figure 16:
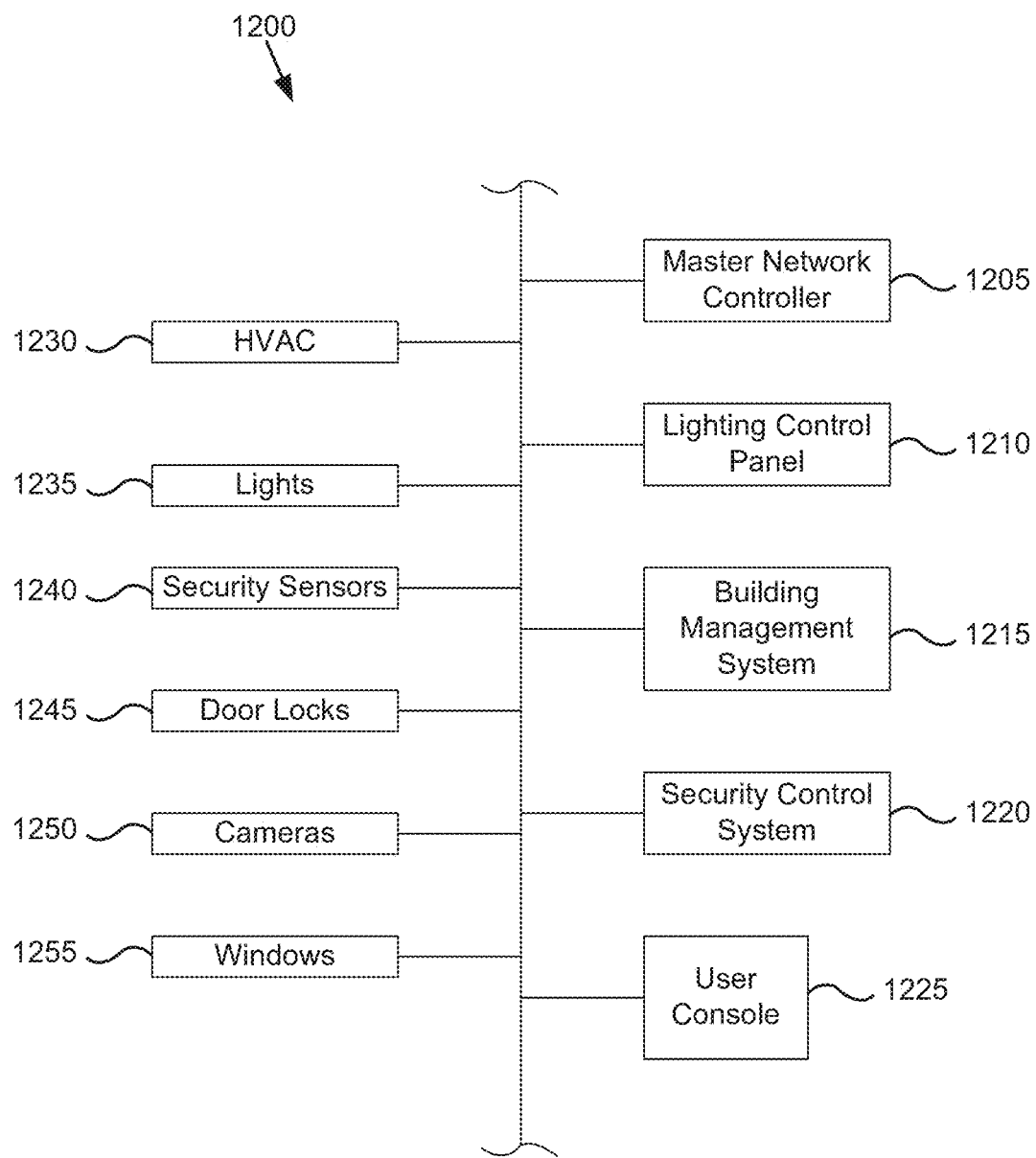
FIG. 16 depicts a block diagram of an embodiment of a building network.

FIG. 16 depicts a block diagram of an embodiment of a building network 1200 for a building. As noted above, network 1200 may employ any number of different communication protocols, including BACnet. As shown, building network 1200 includes a master network controller 1205, a lighting control panel 1210, a building management system (BMS) 1215, a security control system, 1220, and a user console, 1225. These different controllers and systems in the building may be used to receive input from and/or control a HVAC system 1230, lights 1235, security sensors 1240, door locks 1245, cameras 1250, and tintable windows 1255, of the building.

Master network controller 1205 may function in a similar manner as master network controller 1103 described with respect to FIG. 15. Lighting control panel 1210 may include circuits to control the interior lighting, the exterior lighting, the emergency warning lights, the emergency exit signs, and the emergency floor egress lighting. Lighting control panel 1210 also may include occupancy sensors in the rooms of the building. BMS 1215 may include a computer server that receives data from and issues commands to the other systems and controllers of network 1200. For example, BMS 1215 may receive data from and issue commands to each of the master network controller 1205, lighting control panel 1210, and security control system 1220. Security control system 1220 may include magnetic card access, turnstiles, solenoid driven door locks, surveillance cameras, burglar alarms, metal detectors, and the like. User console 1225 may be a computer terminal that can be used by the building manager to schedule operations of, control, monitor, optimize, and troubleshoot the different systems of the building. Software from Tridium, Inc. may generate visual representations of data from different systems for user console 1225.

Each of the different controls may control individual devices/apparatus. Master network controller 1205 controls windows 1255. Lighting control panel 1210 controls lights 1235. BMS 1215 may control HVAC 1230. Security control system 1220 controls security sensors 1240, door locks 1245, and cameras 1250. Data may be exchanged and/or shared between all of the different devices/apparatus and controllers that are part of building network 1200.

In some cases, the systems of BMS 1100 or building network 1200 may run according to daily, monthly, quarterly, or yearly schedules. For example, the lighting control system, the window control system, the HVAC, and the security system may operate on a 24 hour schedule accounting for when people are in the building during the work day. At night, the building may enter an energy savings mode, and during the day, the systems may operate in a manner that minimizes the energy consumption of the building while providing for occupant comfort. As another example, the systems may shut down or enter an energy savings mode over a holiday period.

The scheduling information may be combined with geographical information. Geographical information may include the latitude and longitude of the building. Geographical information also may include information about the direction that each side of the building faces. Using such information, different rooms on different sides of the building may be controlled in different manners. For example, for east facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

Described below is an example of a building, for example, like building 1101 in FIG. 15, including a building network or a BMS, tintable windows for the exterior windows of the building (i.e., windows separating the interior of the building from the exterior of the building), and a number of different sensors. Light from exterior windows of a building generally has an effect on the interior lighting in the building about 20 feet or about 30 feet from the windows. That is, space in a building that is more that about 20 feet or about 30 feet from an exterior window receives little light from the exterior window. Such spaces away from exterior windows in a building are lit by lighting systems of the building.

Further, the temperature within a building may be influenced by exterior light and/or the exterior temperature. For example, on a cold day and with the building being heated by a heating system, rooms closer to doors and/or windows will lose heat faster than the interior regions of the building and be cooler compared to the interior regions.

For exterior sensors, the building may include exterior sensors on the roof of the building. Alternatively, the building may include an exterior sensor associated with each exterior window (e.g., as described in relation to FIG. 5, room 500) or an exterior sensor on each side of the building. An exterior sensor on each side of the building could track the irradiance on a side of the building as the sun changes position throughout the day.

Regarding the methods described with respect to FIGS. 7, 8, 9, 12, 13, and 14, when a window controller is integrated into a building network or a BMS, outputs from exterior sensors 510 may be input to a network of BMS and provided as input to the local window controller 450. For example, in some embodiments, output signals from any two or more sensors are received. In some embodiments, only one output signal is received, and in some other embodiments, three, four, five, or more outputs are received. These output signals may be received over a building network or a BMS.

In some embodiments, the output signals received include a signal indicating energy or power consumption by a heating system, a cooling system, and/or lighting within the building. For example, the energy or power consumption of the heating system, the cooling system, and/or the lighting of the building may be monitored to provide the signal indicating energy or power consumption. Devices may be interfaced with or attached to the circuits and/or wiring of the building to enable this monitoring. Alternatively, the power systems in the building may be installed such that the power consumed by the heating system, a cooling system, and/or lighting for an individual room within the building or a group of rooms within the building can be monitored.

Tint instructions can be provided to change to tint of the tintable window to the determined level of tint. For example, referring to FIG. 15, this may include master network controller 1103 issuing commands to one or more intermediate network controllers 1105*a* and 1105*b*, which in turn issue commands to end controllers 1110 that control each window of the building. End controllers 1100 may apply voltage and/or current to the window to drive the change in tint pursuant to the instructions.

In some embodiments, a building including electrochromic windows and a BMS may be enrolled in or participate in a demand response program run by the utility or utilities providing power to the building. The program may be a program in which the energy consumption of the building is reduced when a peak load occurrence is expected. The utility may send out a warning signal prior to an expected peak load occurrence. For example, the warning may be sent on the day before, the morning of, or about one hour before the expected peak load occurrence. A peak load occurrence may be expected to occur on a hot summer day when cooling systems/air conditioners are drawing a large amount of power from the utility, for example. The warning signal may be received by the BMS of the building or by window controllers configured to control the electrochromic windows in the building. This warning signal can be an override mechanism that disengages the Modules A, B, and C as shown in FIG. 7. The BMS can then instruct the window controller(s) to transition the appropriate electrochromic device in the electrochromic windows 505 to a dark tint level aid in reducing the power draw of the cooling systems in the building at the time when the peak load is expected.

In some embodiments, tintable windows for the exterior windows of the building (i.e., windows separating the interior of the building from the exterior of the building), may be grouped into zones, with tintable windows in a zone being instructed in a similar manner. For example, groups of electrochromic windows on different floors of the building or different sides of the building may be in different zones. For example, on the first floor of the building, all of the east facing electrochromic windows may be in zone 1, all of the south facing electrochromic windows may be in zone 2, all of the west facing electrochromic windows may be in zone 3, and all of the north facing electrochromic windows may be in zone 4. As another example, all of the electrochromic windows on the first floor of the building may be in zone 1, all of the electrochromic windows on the second floor may be in zone 2, and all of the electrochromic windows on the third floor may be in zone 3. As yet another example, all of the east facing electrochromic windows may be in zone 1, all of the south facing electrochromic windows may be in zone 2, all of the west facing electrochromic windows may be in zone 3, and all of the north facing electrochromic windows may be in zone 4. As yet another example, east facing electrochromic windows on one floor could be divided into different zones. Any number of tintable windows on the same side and/or different sides and/or different floors of the building may be assigned to a zone. In embodiments where individual tintable windows have independently controllable zones, tinting zones may be created on a building façade using combinations of zones of individual windows, e.g. where individual windows may or may not have all of their zones tinted.

In some embodiments, electrochromic windows in a zone may be controlled by the same window controller. In some other embodiments, electrochromic windows in a zone may be controlled by different window controllers, but the window controllers may all receive the same output signals from sensors and use the same function or lookup table to determine the level of tint for the windows in a zone.

In some embodiments, electrochromic windows in a zone may be controlled by a window controller or controllers that receive an output signal from a transmissivity sensor. In some embodiments, the transmissivity sensor may be mounted proximate the windows in a zone. For example, the transmissivity sensor may be mounted in or on a frame containing an IGU (e.g., mounted in or on a mullion, the horizontal sash of a frame) included in the zone. In some other embodiments, electrochromic windows in a zone that includes the windows on a single side of the building may be controlled by a window controller or controllers that receive an output signal from a transmissivity sensor.

In some embodiments, a sensor (e.g., photosensor) may provide an output signal to a window controller to control the electrochromic windows 505 of a first zone (e.g., a master control zone). The window controller may also control the electrochromic windows 505 in a second zone (e.g., a slave control zone) in the same manner as the first zone. In some other embodiments, another window controller may control the electrochromic windows 505 in the second zone in the same manner as the first zone.

In some embodiments, a building manager, occupants of rooms in the second zone, or other person may manually instruct (using a tint or clear command or a command from a user console of a BMS, for example) the electrochromic windows in the second zone (i.e., the slave control zone) to enter a tint level such as a colored state (level) or a clear state. In some embodiments, when the tint level of the windows in the second zone is overridden with such a manual command, the electrochromic windows in the first zone (i.e., the master control zone) remain under control of the window controller receiving output from the transmissivity sensor. The second zone may remain in a manual command mode for a period of time and then revert back to be under control of the window controller receiving output from the transmissivity sensor. For example, the second zone may stay in a manual mode for one hour after receiving an override command, and then may revert back to be under control of the window controller receiving output from the transmissivity sensor.

In some embodiments, a building manager, occupants of rooms in the first zone, or other person may manually instruct (using a tint command or a command from a user console of a BMS, for example) the windows in the first zone (i.e., the master control zone) to enter a tint level such as a colored state or a clear state. In some embodiments, when the tint level of the windows in the first zone is overridden with such a manual command, the electrochromic windows in the second zone (i.e., the slave control zone) remain under control of the window controller receiving outputs from the exterior sensor. The first zone may remain in a manual command mode for a period of time and then revert back to be under control of window controller receiving output from the transmissivity sensor. For example, the first zone may stay in a manual mode for one hour after receiving an override command, and then may revert back to be under control of the window controller receiving output from the transmissivity sensor. In some other embodiments, the electrochromic windows in the second zone may remain in the tint level that they are in when the manual override for the first zone is received. The first zone may remain in a manual command mode for a period of time and then both the first zone and the second zone may revert back to be under control of the window controller receiving output from the transmissivity sensor.

Any of the methods described herein of control of a tintable window, regardless of whether the window controller is a standalone window controller or is interfaced with a building network, may be used control the tint of a tintable window.

V. Wireless or Wired Communication

In some embodiments, window controllers described herein include components for wired or wireless communication between the window controller, sensors, and separate communication nodes. Wireless or wired communications may be accomplished with a communication interface that interfaces directly with the window controller. Such interface could be native to the microprocessor or provided via additional circuitry enabling these functions.

A separate communication node for wireless communications can be, for example, another wireless window controller, an end, intermediate, or master window controller, a remote control device, or a BMS. Wireless communication is used in the window controller for at least one of the following operations: programming and/or operating the EC electrochromic window 505, collecting data from the EC window 505 from the various sensors and protocols described herein, and using the electrochromic window 505 as a relay point for wireless communication. Data collected from electrochromic windows 505 also may include count data such as number of times an EC device has been activated, efficiency of the EC device over time, and the like. These wireless communication features is described in more detail below.

In one embodiment, wireless communication is used to operate the associated electrochromic windows 505, for example, via an infrared (IR), and/or radio frequency (RF) signal. In certain embodiments, the controller will include a wireless protocol chip, such as Bluetooth, EnOcean, WiFi, Zigbee, and the like. Window controllers may also have wireless communication via a network. Input to the window controller can be manually input by an end user at a wall switch, either directly or via wireless communication, or the input can be from a BMS of a building of which the electrochromic window is a component.

In one embodiment, when the window controller is part of a distributed network of controllers, wireless communication is used to transfer data to and from each of a plurality of electrochromic windows via the distributed network of controllers, each having wireless communication components. For example, referring again to FIG. 15, master network controller 1103, communicates wirelessly with each of intermediate network controllers 1105a and 1105b, which in turn communicate wirelessly with end controllers 1110, each associated with an electrochromic window. Master network controller 1103 may also communicate wirelessly with the BMS 1100. In one embodiment, at least one level of communication in the window controller is performed wirelessly.

In some embodiments, more than one mode of wireless communication is used in the window controller distributed network. For example, a master window controller may communicate wirelessly to intermediate controllers via WiFi or Zigbee, while the intermediate controllers communicate with end controllers via Bluetooth, Zigbee, EnOcean, or other protocol. In another example, window controllers have redundant wireless communication systems for flexibility in end user choices for wireless communication.

Wireless communication between, for example, master and/or intermediate window controllers and end window controllers offers the advantage of obviating the installation of hard communication lines. This is also true for wireless communication between window controllers and BMS. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

VI. Example of System for Controlling Functions of Tintable Windows

Figure 17:
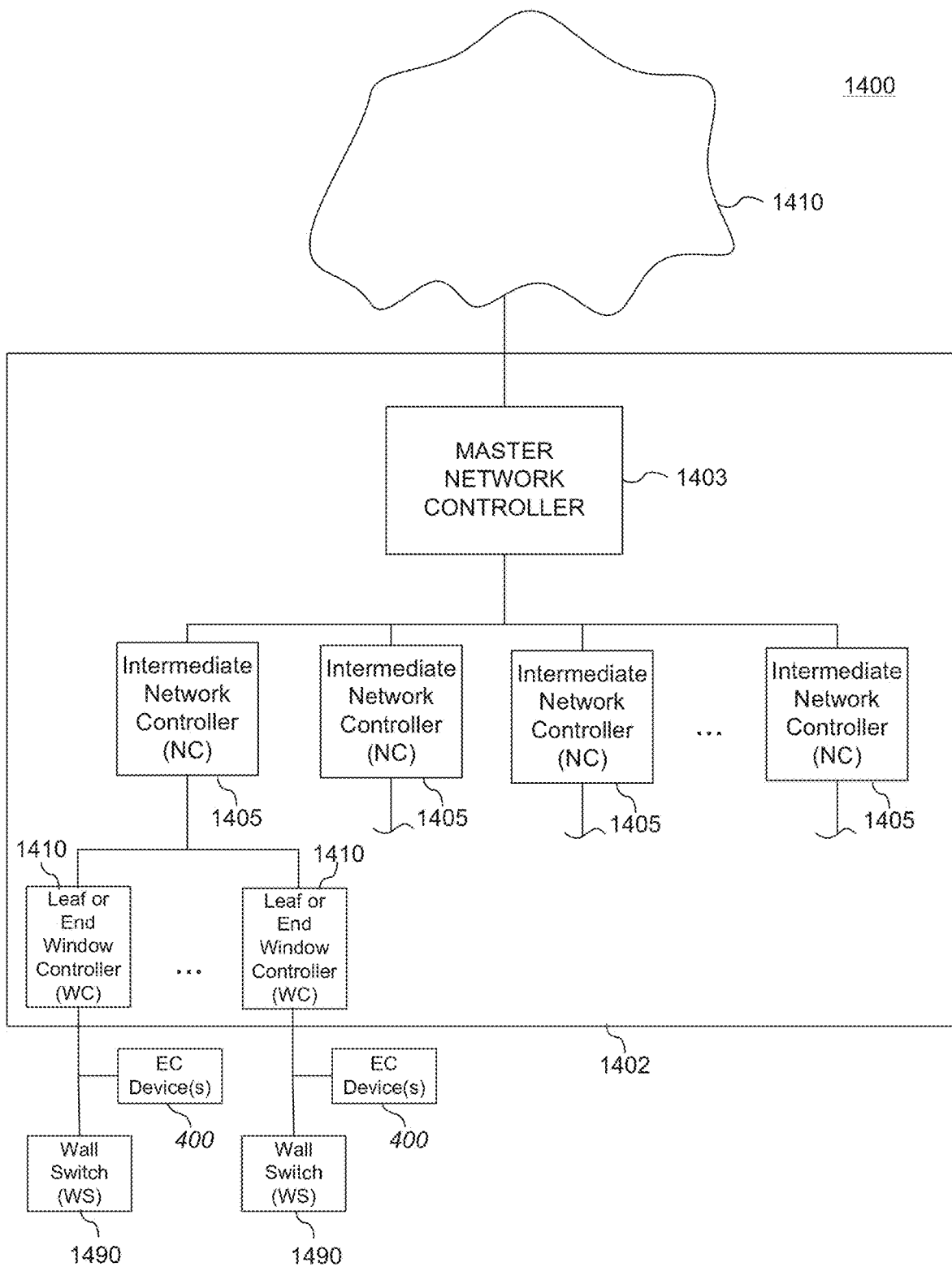
FIG. 17 is a block diagram of components of a system for controlling functions of one or more tintable windows of a building.

FIG. 17 is a block diagram of components of a system 1400 for controlling functions (e.g., transitioning to different tint levels) of one or more tintable windows of a building (e.g., building 1101 shown in FIG. 15), according to embodiments. System 1400 may be one of the systems managed by a BMS (e.g., BMS 1100 shown in FIG. 15) or may operate independently of a BMS.

System 1400 includes a master window controller 1402 that can send control signals to the tintable windows to control its functions. System 1400 also includes a network 1410 in electronic communication with master window controller 1402. The predictive control logic, other control logic and instructions for controlling functions of the tintable window(s), and/or sensor data may be communicated to the master window controller 1402 through the network 1410. Network 1410 can be a wired or wireless network (e.g. cloud network). In one embodiment, network 1410 may be in communication with a BMS to allow the BMS to send instructions for controlling the tintable window(s) through network 1410 to the tintable window(s) in a building.

System 1400 also includes EC devices 400 of the tintable windows (not shown) and wall switches 1490, which are both in electronic communication with master window controller 1402. In this illustrated example, master window controller 1402 can send control signals to EC device(s) 400 to control the tint level of the tintable windows having the EC device(s) 400. Each wall switch 1490 is also in communication with EC device(s) 400 and master window controller 1402. An end user (e.g., occupant of a room having the tintable window) can use the wall switch 1490 to control the tint level and other functions of the tintable window having the EC device(s) 400.

In FIG. 17, master window controller 1402 is depicted as a distributed network of window controllers including a master network controller 1403, a plurality of intermediate network controllers 1405 in communication with the master network controller 1403, and multiple pluralities of end or leaf window controllers 1410. Each plurality of end or leaf window controllers 1410 is in communication with a single intermediate network controller 1405. Although master window controller 1402 is illustrated as a distributed network of window controllers, master window controller 1402 could also be a single window controller controlling the functions of a single tintable window in other embodiments. The components of the system 1400 in FIG. 17 may be similar in some respects to components described with respect to FIG. 15. For example, master network controller 1403 may be similar to master network controller 1103 and intermediate network controllers 1405 may be similar to intermediate network controllers 1105. Each of the window controllers in the distributed network of FIG. 17 may include a processor (e.g., microprocessor) and a computer readable medium in electrical communication with the processor.

In FIG. 17, each leaf or end window controller 1410 is in communication with EC device(s) 400 of a single tintable window to control the tint level of that tintable window in the building. In the case of an IGU, the leaf or end window controller 1410 may be in communication with EC devices 400 on multiple lites of the IGU control the tint level of the IGU. In other embodiments, each leaf or end window controller 1410 may be in communication with a plurality of tintable windows. The leaf or end window controller 1410 may be integrated into the tintable window or may be separate from the tintable window that it controls. Leaf and end window controllers 1410 in FIG. 17 may be similar to the end or leaf controllers 1110 in FIG. 15 and/or may also be similar to window controller 450 described with respect to FIG. 4.

Each wall switch 1490 can be operated by an end user (e.g., occupant of the room) to control the tint level and other functions of the tintable window in communication with the wall switch 1490. The end user can operate the wall switch 1490 to communicate control signals to the EC devices 400 in the associated tintable window. These signals from the wall switch 1490 may override signals from master window controller 1402 in some cases. In other cases (e.g., high demand cases), control signals from the master window controller 1402 may override the control signals from wall switch 1490. Each wall switch 1490 is also in communication with the leaf or end window controller 1410 to send information about the control signals (e.g. time, date, tint level requested, etc.) sent from wall switch 1490 back to master window controller 1402. In some cases, wall switches 1490 may be manually operated. In other cases, wall switches 1490 may be wirelessly controlled by the end user using a remote device (e.g., cell phone, tablet, etc.) sending wireless communications with the control signals, for example, using infrared (IR), and/or radio frequency (RF) signals. In some cases, wall switches 1490 may include a wireless protocol chip, such as Bluetooth, EnOcean, WiFi, Zigbee, and the like. Although wall switches 1490 depicted in FIG. 17 are located on the wall(s), other embodiments of system 1400 may have switches located elsewhere in the room.

VII. Another Example of Predictive Control Logic

Figure 18:
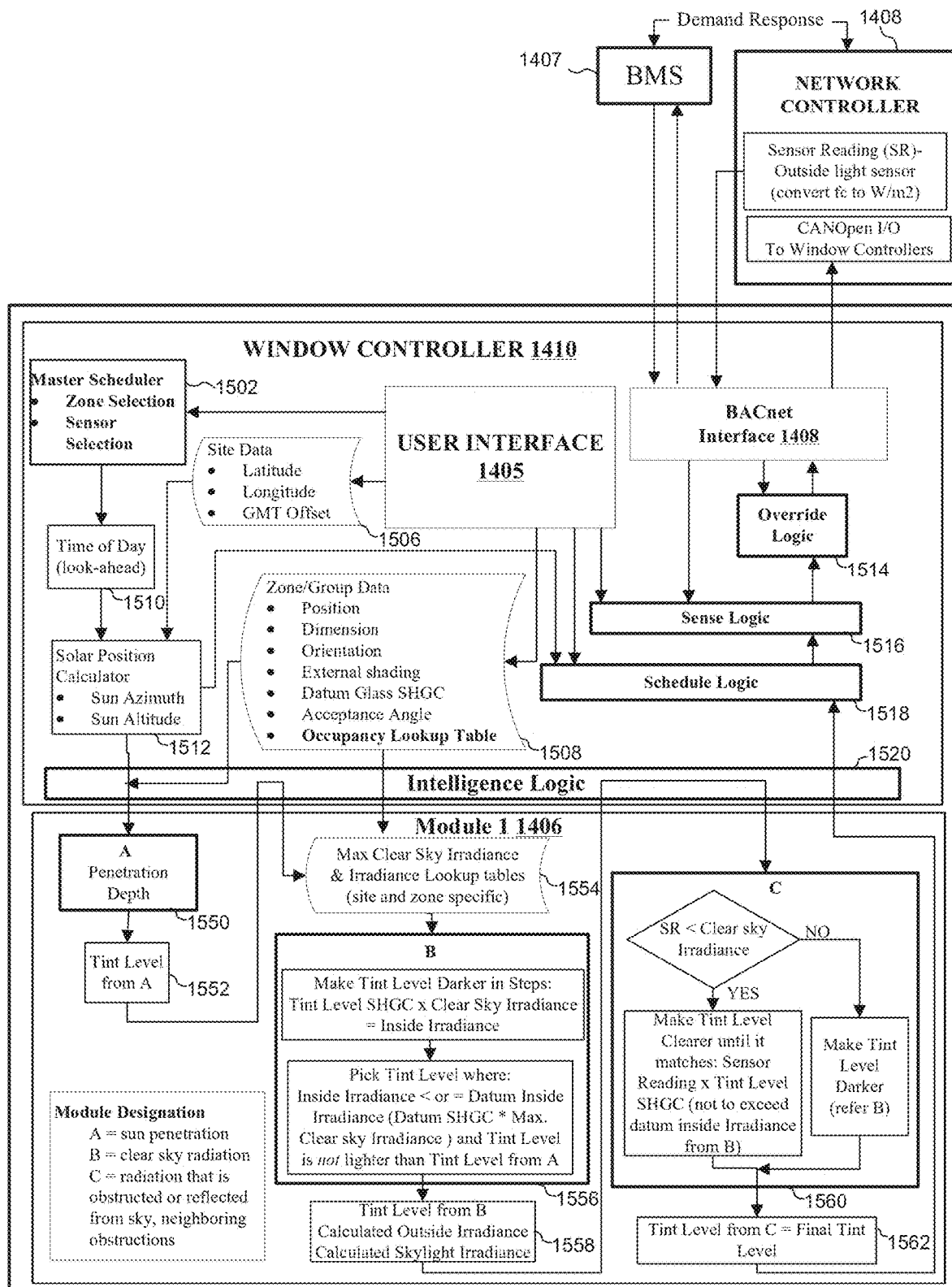
FIG. 18 is a block diagram depicting predictive control logic for a method of controlling the transitioning of tint levels of one or more tintable windows (e.g., electrochromic windows) in a building.

FIG. 18 is a block diagram depicting predictive control logic for a method of controlling the tint level of one or more tintable windows (e.g., electrochromic windows) in different zones of a building, according to embodiments. This logic makes predictive determinations at a time in the future that accounts for the transition time of the EC devices 400 in the tintable windows. This predictive control logic can be employed by components of system 1400 described with respect to FIG. 17 or by components of systems of other disclosed embodiments. In the illustrated example, a portion of the predictive control logic is performed by window controller 1410, another portion is performed by network controller 1408, and the logic in Module 1 1406 is performed by a separate component from the window controller 1410 and network controller 1408. Alternatively, Module 1 1406 may be separate logic that may or may not be loaded onto the window controller 1410.

In FIG. 18, the portions of the predictive control logic employed by window controller 1410 and Module 1 1406 are managed by BMS 1407. BMS 1407 may be similar to BMS 1100 described with respect to FIG. 15. BMS 1407 is in electronic communication with window controller 1410 through a BACnet Interface 1408. In other embodiments, other communications protocol may be used. Although not shown in FIG. 18, Module 1 1406 is also in communication with BMS 1407 through BACnet Interface 1408. In other embodiments, the predictive control logic depicted in FIG. 18 may operate independently of a BMS.

Network controller 1408 receives sensor readings from one or more sensors (e.g., an outside light sensor) and may also convert the sensor reading into $W/m^2$. The network controller 1408 is in electronic communication with the window controller 1410 via either CANbus or CANOpen protocol. The network controller 1408 communicates the converted sensor readings to the window controller 1410. Network controller 1408 may be similar to either the intermediate network controller 1405 or the master network controller 1403 of FIG. 17.

In FIG. 18, the portion of the predictive control logic employed by window controller 1410 includes a master scheduler 1502. The master scheduler 1502 includes logic that allows a user (e.g., building administrator) to prepare a schedule that can use different types of control programs at different times of day and/or dates. Each of the control programs includes logic for determining a tint level based on or more independent variables. One type of control program is simply a pure state. A pure state refers to particular level of tint (e.g., transmissivity=40%) that is fixed during a certain time period, regardless of other conditions. For example, the building manager may specify that the windows are clear after 3 PM every day. As another example, building manager may specify a pure state for the time period between the hours of 8 PM to 6 AM every day. At other times of day, a different type of control program may be employed, for example, one employing a much greater level of sophistication. One type of control program offering a high level of sophistication. For example, a highly sophisticated control program of this type includes predictive control logic described in reference to FIG. 18 and may include the implementation of one or more of the logic Modules A, B, and C of Module 1 1406. As another example, another highly sophisticated control program of this type includes predictive control logic described in reference to FIG. 18 and may include the implementation of one or more of the logic Modules A, B, and C of Module 1 1406 and Module D described later in this Section VII. As another example, another highly sophisticated control program of this type is the predictive control logic described in reference to FIG. 7 and includes full multi-module implementation of logic Modules A, B, and C described in reference to FIGS. 8, 9, and 12. In this example, the predictive control logic uses sensor feedback in Module C and solar information in Modules A and B. Another example of a highly sophisticated control program is the predictive control logic described in reference to FIG. 7 with partial logic module implementation of one or two of the logic Modules A, B, and C described in reference to FIGS. 8, 9, and 12. Another type of control program is a threshold control program that relies on feedback from one or more sensors (e.g., photosensors) and adjusts the tint level accordingly without regard to solar position. One of the technical advantages of using master scheduler 1502 is that the user can select and schedule the control program (method) being used to determine the tint level.

Master scheduler 1502 runs the control programs in the schedule according to time in terms of the date and time of day based on a 24-hour day. Master scheduler 1502 may determine the date in terms of a calendar date and/or the day of the week based on a 7-day week with five weekdays (Monday through Friday) and two weekend days (Saturday and Sunday). Master scheduler 1502 may also determine whether certain days are holidays. Master scheduler 1502 may automatically adjust the time of day for daylight savings time based on the location of the tintable windows, which is determined by site data 1506.

In one embodiment, master scheduler 1502 may use a separate holiday schedule. The user may have determined which control program(s) to use during the holiday schedule. The user may determine which days will be included in the holiday schedule. Master scheduler 1502 may copy the basic schedule set up by the user and allow the user to set up their modifications for the holidays in the holiday schedule.

When preparing the schedule employed by master scheduler 1502, the user may select the zone or zones (Zone Selection) of the building where the selected program(s) will be employed. Each zone includes one or more tintable windows. In some cases, a zone may be an area associated with a space type (e.g., offices having a desk at a particular position, conference rooms, etc.) or may be associated with multiple space types. For example, the user may select Zone 1 having offices to: 1) Monday through Friday: heat up at 8 am in morning to 70 degrees and turn on air conditioning to at 3 pm in afternoon to keep temperature in offices to 80 degrees, and then turn off all air conditioning, and heat at 5 pm during weekdays, and 2) (Saturday and Sunday) turn off heat and air conditioning. As another example, the user may set Zone 2 having a conference room to run the predictive control logic of FIG. 18 including full-module implementation of Module 1 using all of the logic Module A, B, and C. In another example, the user may select a Zone 1 having conference rooms to run Module 1 from 8 AM to 3 PM and a threshold program or pure state after 3 PM. In other cases, a zone may be the entire building or may be one or more windows in a building.

When preparing the schedule with programs that may use sensor input, the user may also be able to select the sensor or sensors used in the programs. For example, the user may select a sensor located on the roof or a sensor located near or at the tintable window. As another example, the user may select an ID value of a particular sensor.

The portion of the predictive control logic employed by window controller 1410 also includes a user interface 1504 in electronic communication with master scheduler 1502. User interface 1504 is also in communication with site data 1506, zone/group data 1508, and sense logic 1516. The user may input their schedule information to prepare the schedule (generate a new schedule or modify an existing schedule) using user interface 1504. User interface 1504 may include an input device such as, for example, a keypad, touchpad, keyboard, etc. User interface 1504 may also include a display to output information about the schedule and provide selectable options for setting up the schedule. User interface 1504 is in electronic communication with a processor (e.g., microprocessor), which is in electronic communication with a computer readable medium (CRM). Both the processor and CRM are components of the window controller 1410. The logic in master scheduler 1502 and other components of the predictive control logic may be stored on the computer readable medium of window controller 1410.

The user may enter their site data 1506 and zone/group data 1508 using user interface 1504. Site data 1506 includes the latitude, longitude, and GMT Offset for the location of the building. Zone/group data includes the position, dimension (e.g., window width, window height, sill width, etc.), orientation (e.g., window tilt), external shading (e.g., overhang depth, overhang location above window, left/right fin to side dimension, left/right fin depth, etc.), datum glass SHGC, and occupancy lookup table for the one or more tintable windows in each zone of the building. In FIG. 18, site data 1506 and zone/group data 1508 is static information (i.e. information that is not changed by components of the predictive control logic). In other embodiments, this data may be generated on the fly. Site data 1506 and zone/group data 1508 may be stored on a computer readable medium of the window controller 1410.

When preparing (or modifying) the schedule, the user selects the control program that master scheduler 1502 will run at different time periods in each of the zones of a building. In some cases, the user may be able to select from multiple control programs. In one such case, the user may prepare a schedule by selecting a control program from a list of all control programs (e.g., menu) displayed on user interface 1405. In other cases, the user may have limited options available to them from a list of all control programs. For example, the user may have only paid for the use of two control programs. In this example, the user would only be able to select one of the two control programs paid for by the user.

Figure 19:
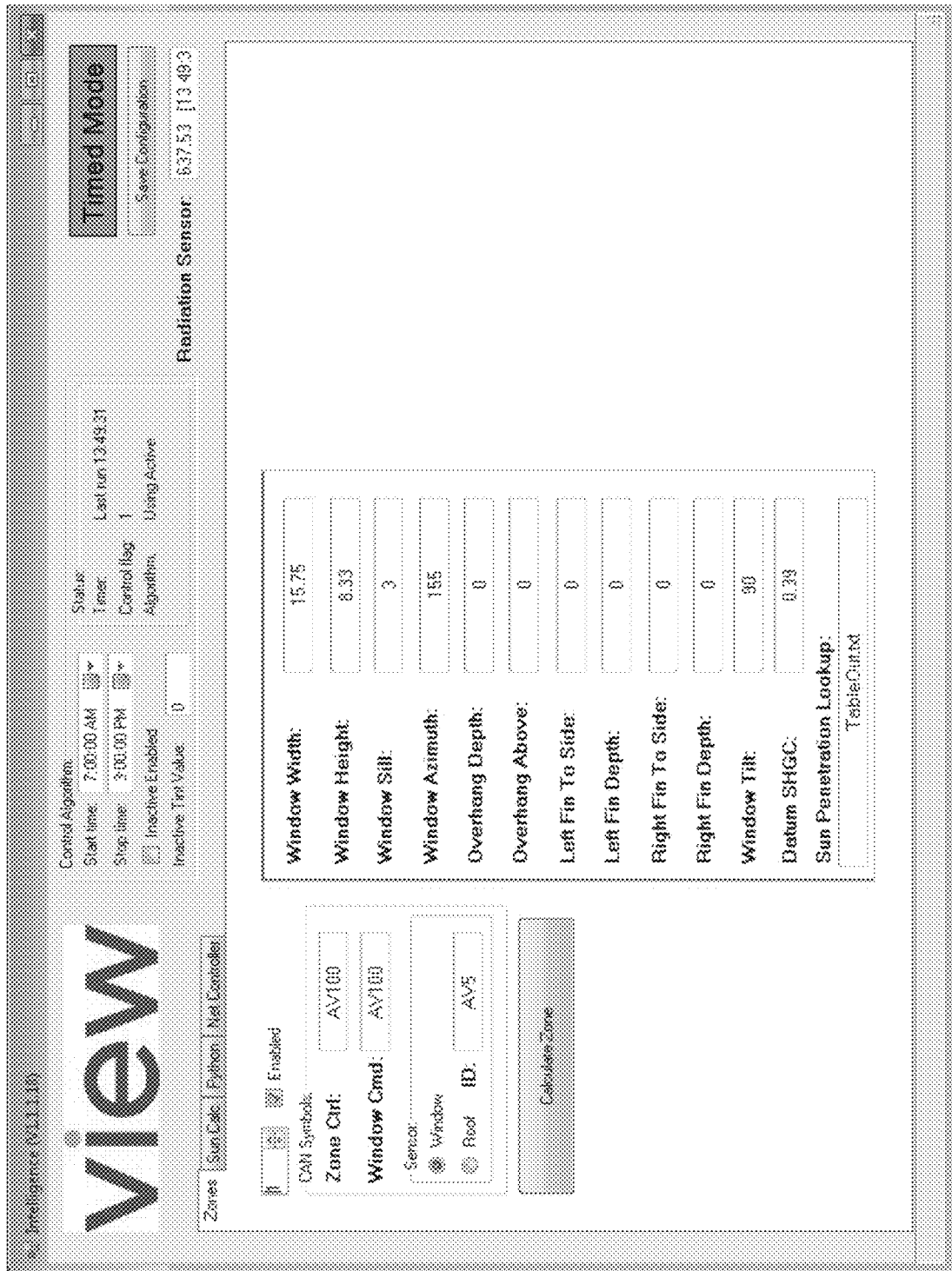
FIG. 19 is screenshot of a user interface used to enter schedule information to generate a schedule employed by a window controller, according to embodiments.

An example of a user interface 1405 is shown in FIG. 19. In this illustrated example, the user interface 1405 is in the form of a table for entering schedule information used to generate or change a schedule employed by the master scheduler 1502. For example, the user can enter the time period into the table by entering start and stop times. The user can also select a sensor used by a program. The user can also enter Site data 1506 and Zone/Group Data 1508. The user can also select an occupancy lookup table to be used by selecting "Sun Penetration Lookup."

Returning to FIG. 18, the portion of the predictive control logic employed by window controller 1410 also includes time of day (look ahead) logic 1510. Time of day (look ahead) logic 1510 determines a time in the future used by predictive control logic to make its predictive determinations. This time in the future accounts for time needed to transition the tint level of the EC devices 400 in the tintable windows. By using a time that accounts for transition time, the predictive control logic can predict a tint level appropriate for the future time at which time the EC devices 400 will have had the time to transition to the tint level after receiving the control signal. Time of day portion 1510 may estimate the transition time of EC device(s) in a representative window based on information about the representative window (e.g., window dimension, etc.) from the Zone/Group Data. Time of day logic 1510 may then determine the future time based on the transition time and the current time. For example, the future time may be equal to or greater than the current time added to the transition time.

The Zone/Group Data includes information about the representative window of each zone. In one case, the representative window may be one of the windows in the zone. In another case, the representative window may be a window having average properties (e.g., average dimensions) based on averaging all the properties from all the windows in that zone.

The predictive control logic employed by window controller 1410 also includes a solar position calculator 1512. Solar position calculator 1512 includes logic that determines the position of the sun, Sun azimuth and Sun altitude, at an instance in time. In FIG. 18, solar position calculator 1512 makes its determinations based on a future instance in time received from time of day logic 1510. Solar position calculator 1512 is in communication with time of day portion 1510 and site data 1506 to receive the future time, latitude and longitude coordinates of the building, and other information that may be needed to make its calculation(s), such as the solar position calculation. Solar position calculator 1512 may also perform one or more determinations based on the calculated solar position. In one embodiment, solar position calculator 1512 may calculate clear sky irradiance or make other determinations from Modules A, B, and C of Module 1 1406.

The control logic employed by window controller 1410 also includes schedule logic 1518, which is in communication with the sense logic 1516, the user interface 1405, the solar position calculator 1512, and Module 1 1406. The schedule logic 1518 includes logic that determines whether to use the tint level passing through the intelligence logic 1520 from Module 1 1406 or use another tint level based on other considerations. For example, as sunrise and sunset times change throughout the year, the user may not want to reprogram the schedule to account for these changes. The schedule logic 1518 may use the sunrise and sunset times from the solar position calculator 1512 to set an appropriate tint level before sunrise and after sunset without requiring the user to reprogram the schedule for these changing times. For example, the schedule logic 1508 may determine that according to the sunrise time received from the solar position calculator 1512 the sun has not risen and that a pre-sunrise tint level should be used instead of the tint level passed from Module 1 1406. The tint level determined by the schedule logic 1518 is passed to sense logic 1516.

Sense logic 1516 is in communication with override logic 1514, schedule logic 1518, and user interface 1405. Sense logic 1516 includes logic that determines whether to use the tint level passed from schedule logic 1516 or use another tint level based on the sensor data received through the BACnet interface 1408 from one or more sensors. Using the example in the paragraph above, if schedule logic 1518 determines that it the sun has not risen and passed a pre-sunrise tint level and the sensor data shows that the sun has actually risen, then sense logic 1516 would use the tint level passed from Module 1 1406 through schedule logic 1518. The tint level determined by sense logic 1516 is passed to override logic 1514.

BMS 1407 and network controller 1408 are also in electronic communication with a demand response (e.g., utility company) to receive signals communicating the need for a high demand (or peak load) override. In response to receiving these signals from the demand response, BMS 1407 and/or network controller 1408 may send instructions through BACnet Interface 1408 to override logic 1514 that will process the override information from the demand response. Override logic 1514 is in communication with BMS 1407 and network controller 1408 through the BACnet Interface 1408, and also in communication with sense logic 1516.

Override logic 1514 allows for certain types of overrides to disengage predictive control logic and use an override tint level based on another consideration. Some examples of types of overrides that may disengage predictive control logic include a high demand (or peak load) override, manual override, vacant room override, etc. A high demand (or peak load) override defines a tint level from the demand response. For a manual override, an end user may enter the override value at a wall switch 1490 (shown in FIG. 17) either manually or through a remote device. A vacant room override defines an override value based on a vacant room (i.e. no occupant in the room). In this case, the sense logic 1516 may receive sensor data from a sensor (e.g., motion sensor) indicating that the room is vacant and sense logic 1516 may determine an override value and relay the override value to override logic 1514. The override logic 1514 can receive an override value and determine whether to use the override value or use another value, such as another override value received from a source having higher priority (i.e., demand response). In some cases, the override logic 1514 may operate by steps similar to the override steps 630, 640, and 650 described with respect to FIG. 7.

The control logic employed by window controller 1410 also includes intelligence logic 1520 that can shut off one or more of Modules A 1550, B 1558 and C 1560. In one case, the intelligence logic 1520 may be used to shut off one or more Modules where the user has not paid for those Modules. Intelligence logic 1520 may prevent the use of certain more sophisticated features such as the penetration calculation made in Module A. In such cases, a basic logic is used that "short-circuits" the solar calculator information and uses it to calculate tint levels, possibly with the assistance of one or more sensors. This tint level from the basic logic is communicated to schedule logic 1518.

Intelligence logic 1520 can shut off one or more of the Modules (Module A 1550, Module B 1558 and Module C 1560) by diverting certain communications between the window controller 1410 and Module 1 1406. For example, the communication between the solar position calculator 1512 and Module A 1550 goes through intelligence logic 1520 and can be diverted to schedule logic 1518 by intelligence logic 1520 to shut off Module A 1550, Module B 1558 and Module C 1560. As another example, the communication of tint level from Module A at 1552 to the Clear Sky Irradiance calculations at 1554 goes through intelligence logic 1520 and can be diverted instead to schedule logic 1518 to shut off Module B 1558 and Module C 1560. In yet another example, the communication of tint level from Module B at 1558 to Module C 1560 goes through intelligence logic 1520 and can be diverted to schedule logic 1518 to shut off Module C 1560.

Module 1 1406 includes logic that determines and returns a tint level to the schedule logic 1518 of window controller 1410. The logic predicts a tint level that would be appropriate for the future time provided by the time of day portion 1510. The tint level is determined for a representative tintable window associated with each of the zones in the schedule.

In FIG. 18, Module 1 1406 includes Module A 1550, Module B 1558 and Module C 1560, which may have some steps that are similar in some respects to the steps performed in Modules A, B, and C as described with respect to FIGS. 8, 9, 12 and 13. In another embodiment, Module 1 1406 may be comprised of Modules A, B, and C as described with respect to FIGS. 8, 9, 12 and 13. In yet another embodiment, Module 1 1406 may be comprised of Modules A, B, and C described with respect to FIG. 14.

In FIG. 18, Module A 1550 determines the penetration depth through the representative tintable window. The penetration depth predicted by Module A 1550 is at the future time. Module A 1550 calculates the penetration depth based on the determined position of the sun (i.e. Sun azimuth and Sun altitude) received from the solar position calculator 1512 and based on the position of the representative tintable window, acceptance angle, dimensions of the window, orientation of the window (i.e. direction facing), and the details of any exterior shading retrieved from the zone/group data 1508.

Module A 1550 then determines the tint level that will provide occupant comfort for the calculated penetration depth. Module A 1550 uses the occupancy lookup table retrieved from the zone/group data 1508 to determine the desired tint level for the space type associated with the representative tintable window, for the calculated penetration depth, and for the acceptance angle of the window. Module A 1550 outputs a tint level at step 1552.

The maximum clear sky irradiance incident the representative tintable window is predicted for all times in the logic 1554. The clear sky irradiance at the future time is also predicted based on the latitude and longitude coordinates of the building and the representative window orientation (i.e. direction the window is facing) from the site data 1506 and the zone/group data 1508. These clear sky irradiance calculations can be performed by the sun position calculator 1512 in other embodiments.

Module B 1556 then calculates new tint levels by incrementally increasing the tint level. At each of these incremental steps, the Inside Irradiance in the room based on the new tint level is determined using the equation: Inside Irradiance=Tint level SHGC×Clear Sky Irradiance. Module B selects the tint level where Inside Irradiance is less than or equal to Datum Inside Irradiance (Datum SHGC×Max. Clear sky Irradiance) and the tint level is not lighter than Tint Level from A. Module B 1556 outputs the selected tint level from B. From the Tint level from B, logic 1558 calculates the outside irradiance and the calculated skylight irradiance.

Module C 1560 makes a determination of whether a sensor reading of irradiance is less than the clear sky irradiance. If the determination result is YES, then the tint level being calculated is made incrementally lighter (clearer) until the value matches or is less than a tint level calculated as Sensor Reading×Tint Level SHGC, but not to exceed datum inside Irradiance from B. If the determination result is NO, then the tint level being calculated is made darker in incremental steps as done in Module B 1556. Module C outputs the tint level. Logic 1562 determines that the tint level from Module C is the final tint level and returns this final tint level (Tint level from Module C) to the schedule logic 1518 of the window controller 1410.

In one aspect, Module 1 1406 may also include a fourth Module D that can predict the effects of the surrounding environment on the intensity and direction of sunlight through the tintable windows in the zone. For example, a neighboring building or other structure may shade the building and block some light from passing through the windows. As another example, reflective surfaces (e.g., surfaces having snow, water, etc.) from a neighboring building or other surfaces in the environment surrounding the building may reflect light into the tintable windows. This reflected light can increase the intensity of light into the tintable windows and cause glare in the occupant space. Depending on the values of the intensity and direction of sunlight predicted by Module D, Module D may modify the tint level determined from Modules A, B, and C or may modify certain determinations from Modules A, B, and C such as, for example, the penetration depth calculation or the acceptance angle of the representative window in the Zone/Group data.

In some cases, a site study may be conducted to determine the environment surrounding the building and/or one or more sensors may be used to determine the effects of the surrounding environment. Information from the site study may be static information based on predicting the reflectance and shading (surrounding) effects for a time period (e.g., a year), or may be dynamic information that can be updated on a periodic basis or other timed basis. In one case, Module D may use the site study to modify the standard acceptance angle and associated $\theta_1$ and $\theta_2$ (shown in FIG. 20) of the representative window of each zone retrieved from the Zone/group data. Module D may communicate this modified information regarding the representative windows other modules of the predictive control logic. The one or more sensors employed by Module D to determine the effects of the surrounding environment may be the same sensors used by other modules (e.g., by Module C) or may be different sensors. These sensors may be specifically designed to determine the effects of the surrounding environment for Module D.

To operate the predictive control logic shown in FIG. 18, the user first prepares a schedule with details of the times and dates, zones, sensors, and programs used. Alternatively, a default schedule may be provided. Once the schedule is in place (stored), at certain time intervals (every 1 minute, 5 minutes, 10 minutes, etc.) the time of day portion 1510 determines a future time of day based on the current time and the transition time of the EC device(s) 400 in the representative window or each zone in the schedule. Using the zone/group data 1508 and site data 1506, the solar position calculator 1512 determines the solar position at the future (look ahead) time for each representative window of each zone in the schedule. Based on the schedule prepared by the user, the intelligence logic 1520 is used to determine which program to employ for each zone in the schedule. For each zone, the scheduled program is employed and predicts an appropriate tint level for that future time. If there is an override in place, an override value will be used. If there is no override in place, then the tint level determined by the program will be used. For each zone, the window controller 1410 will send control signals with the zone-specific tint level determined by the scheduled program to the associated EC device(s) 400 to transition the tint level of the tintable window(s) in that zone by the future time.

VIII. Example of Occupancy Lookup Table

FIG. 20 is an illustration including an example of an occupancy lookup table. The tint level in the table is in terms of $T_{vis}$ (visible transmission). The table includes different tint levels ($T_{vis}$ values) for different combinations of calculated penetration depth values (2 feet, 4 feet, 8 feet, and 15 feet) for a particular space type and when the sun angle $\theta_{Sun}$ is between the acceptance angle of the window between $\theta_1=30$ degrees and $\theta_2=120$ degrees. The table is based on four tint levels including 4% (lightest), 20%, 40%, and 63%. FIG. 20 also shows a diagram of a desk near a window and the acceptance angle of the window to sunlight having an angle $\theta_{Sun}$ between the angle of $\theta_1$ and $\theta_2$. This diagram shows the relationship between the sun angle $\theta_{Sun}$ and the location of the desk. When the angle of the sun $\theta_{Sun}$ is between the angle of acceptance between $\theta_1$ and $\theta_2$, then the sunlight could strike the surface of the desk. If the sun angle $\theta_{Sun}$ is between the acceptance angle between $\theta_1$ and $\theta_2$ (If $\theta_1<\theta_{Sun}<\theta2$) and the penetration depth meets the criteria to tint the window, then that tint level determined by the occupancy lookup table is sent to the window controller, which sends control signals to the EC devices in the window to transition the window to the determined tint level. These two angles $\theta_1$ and $\theta_2$ can be calculated or measured for each window, and stored in the zone/group data 1508 with the other window parameters for that zone.

Figure 21A:
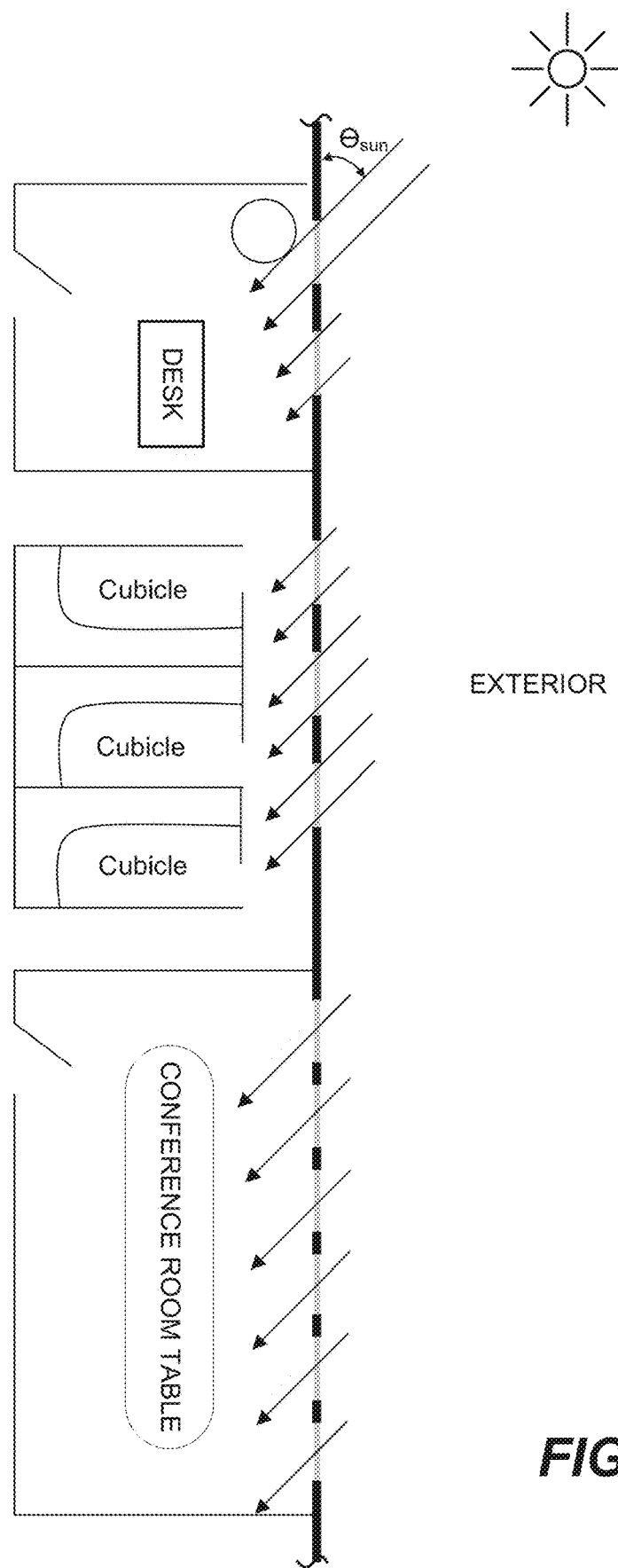
FIGS. 21A, 21B, and 21C are schematic drawings of the plan view of a portion of building having three different space types, according to an embodiment.
Figure 21B:
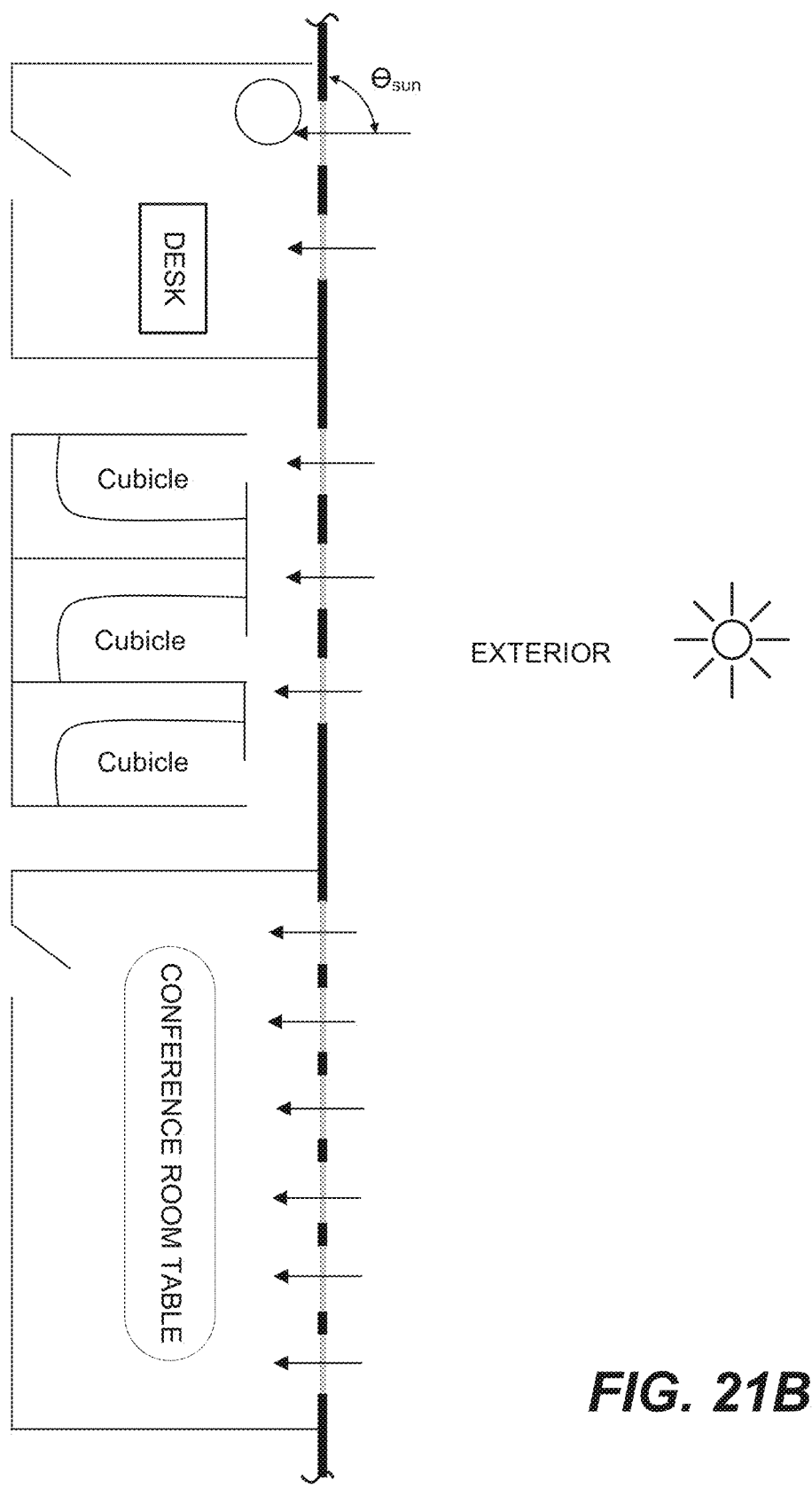
Figure 21C:
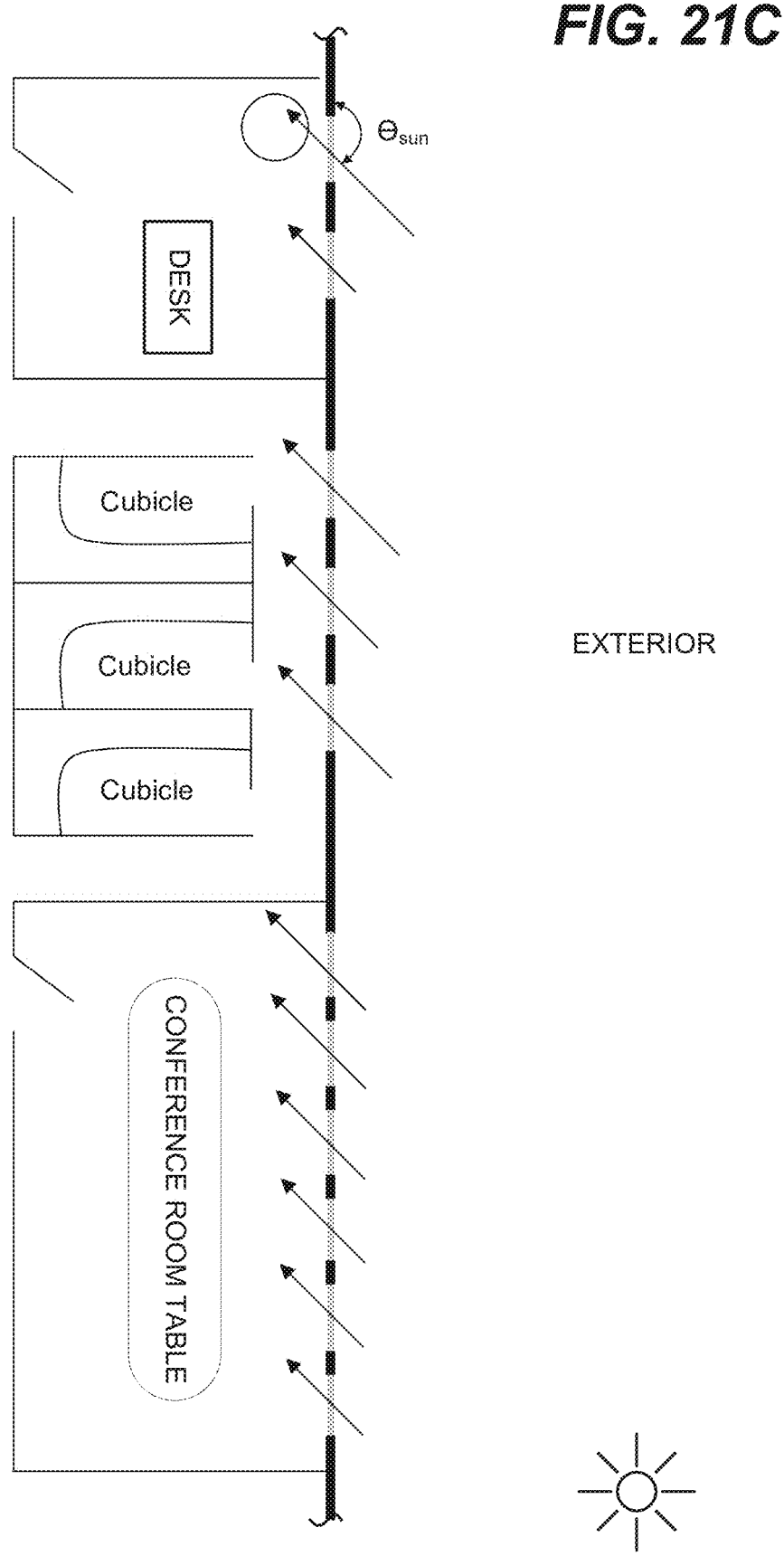

FIGS. 21A, 21B, and 21C are plan views of a portion of a building 2100, according to embodiments. Building 2100 may be similar in some respects to the building 1101 in FIG. 15 and the rooms in building 2100 may be similar in some respects to the room 500 described in FIGS. 5, 6A, 6B, and 6C. The portion of building 2100 includes three different space types including: a desk in an office, a group of cubicles, and a conference room in the building 2100. FIGS. 21A, 21B, and 21C show the sun at different angles $\theta_{Sun}$. These figures also illustrate the different acceptance angles of the different types of windows in building 2100. For example, the conference room with the largest window will have the largest acceptance angle allowing the most light into the room. In this example, the $T_{vis}$ values in an associated occupancy lookup table may be relatively low (low transmissivity) for the conference room. If however, a similar window having the same acceptance angle was instead in a solarium, then the $T_{vis}$ values in an associated occupancy lookup table may be higher values (higher transmissivity) to allow for more sunlight to enter the room.

IX. Subsystems

Figure 22:
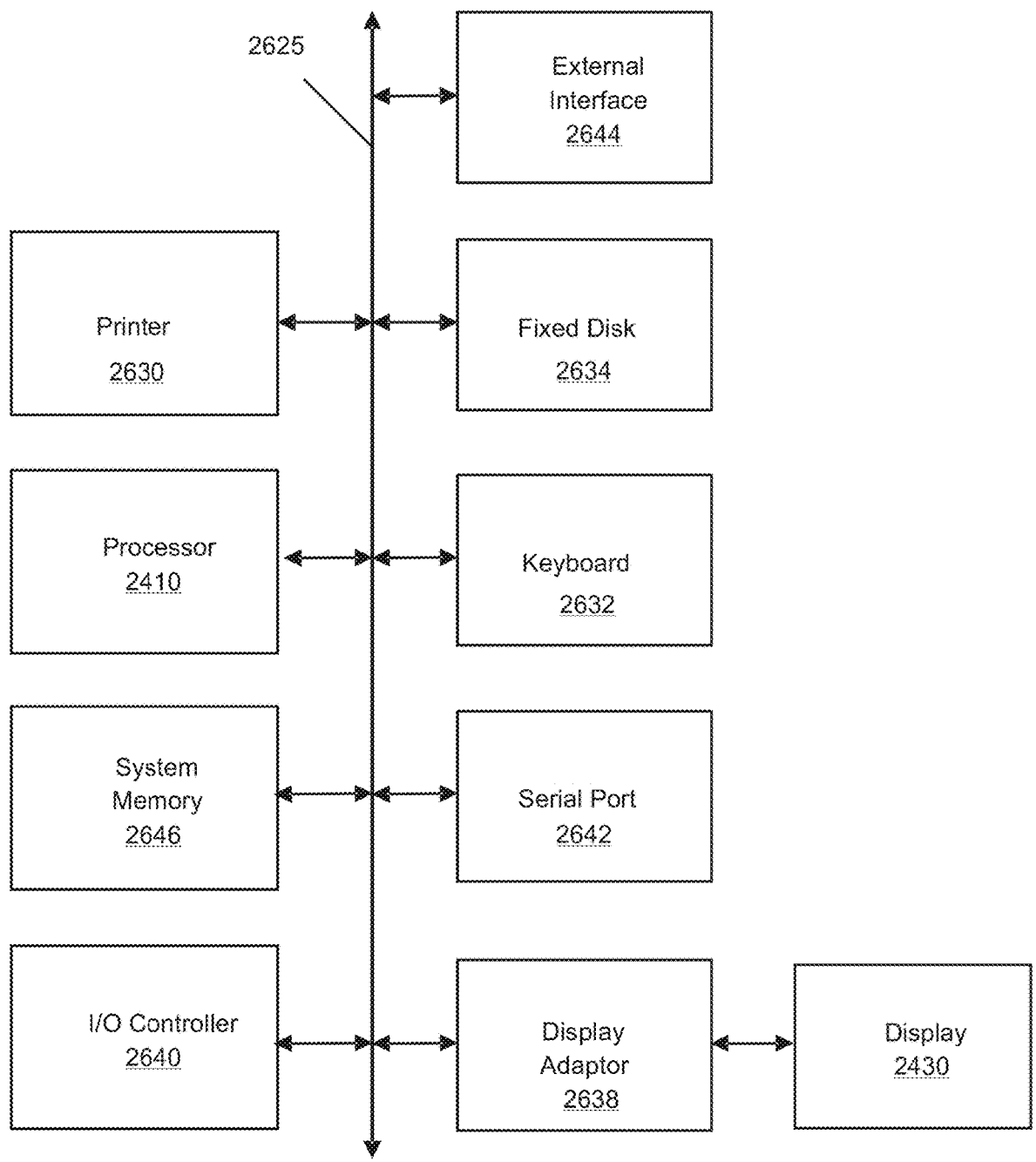
FIG. 22 is a block diagram of subsystems that may be present in window controllers used to control the tint level or more tintable windows, according to embodiments.

FIG. 22 is a block diagram of subsystems that may be present in window controllers used to control the tint level or more tintable windows, according to embodiments. For example, window controllers depicted in FIG. 17 may have a processor (e.g., microprocessor) and a computer readable medium in electronic communication with the processor.

The various components described in the Figures of other Sections may operate using one or more of the subsystems in this Section to facilitate the functions described herein. Any of the components in the Figures may use any suitable number of subsystems to facilitate the functions described herein. Examples of such subsystems and/or components are shown in a FIG. 22. The subsystems shown in FIG. 22 are interconnected via a system bus 2625. Additional subsystems such as a printer 2630, keyboard 2632, fixed disk 2634 (or other memory comprising computer readable media), display 2430, which is coupled to display adapter 2638, and others are shown. Peripherals and input/output (I/O) devices, which couple to I/O controller 2640, can be connected to the computer system by any number of means known in the art, such as serial port 2642. For example, serial port 2642 or external interface 2644 can be used to connect the computer apparatus to a wide area network such as the Internet, a mouse input device, or a scanner. The interconnection via system bus allows the processor 2410 to communicate with each subsystem and to control the execution of instructions from system memory 2646 or the fixed disk 2634, as well as the exchange of information between subsystems. The system memory 2646 and/or the fixed disk 2634 may embody a computer readable medium. Any of these elements may be present in the previously described features.

In some embodiments, an output device such as the printer 2630 or display 2430 of one or more systems can output various forms of data. For example, the system 1400 may output schedule information on a display to a user.

X. Filter(s) for Making Tinting Decisions Based on Rapidly Changing Conditions

In some systems, once a decision is made to tint a tintable window to a particular end state, the window is committed to complete that transition until reaching the end state. Such systems cannot adjust the final tint state during transition, and can only wait until transition is complete. If an unsuitable end tint state is selected by these systems, the window is committed to this unsuitable tint level during the transition cycle and additionally any time that it takes to transition the window to a more appropriate tint level. Since tint/clear times take 5 to 30 minutes, for example, an unsuitable selection could tie up a window in an inappropriate tint level for a substantial period of time which could make conditions uncomfortable for the occupant.

Rapidly changing conditions (e.g., weather change such as intermittent clouds on a sunny day, a fog bank moving in or out, fog burning off to sunshine, etc.) combined with long transition times can cause some control methods to "bounce" between end tint states. In addition, such control methods can decide on an end tint state based on a condition that changes immediately after the method commits to the transition, in which case the window is locked into an unsuitable tint level until the transition is complete. For example, consider a mostly sunny day with dappled clouds. A control method may react to a drop in illumination values when a cloud passes by and when the values rebound, glare conditions could exist. Even though the cloud passes by quickly, the window is committed to transitioning to the inappropriately low end tint state for at least the duration of the transition cycle. During this time, solar radiation enters the room which could also make it uncomfortably warm for the occupant.

Figure 23:
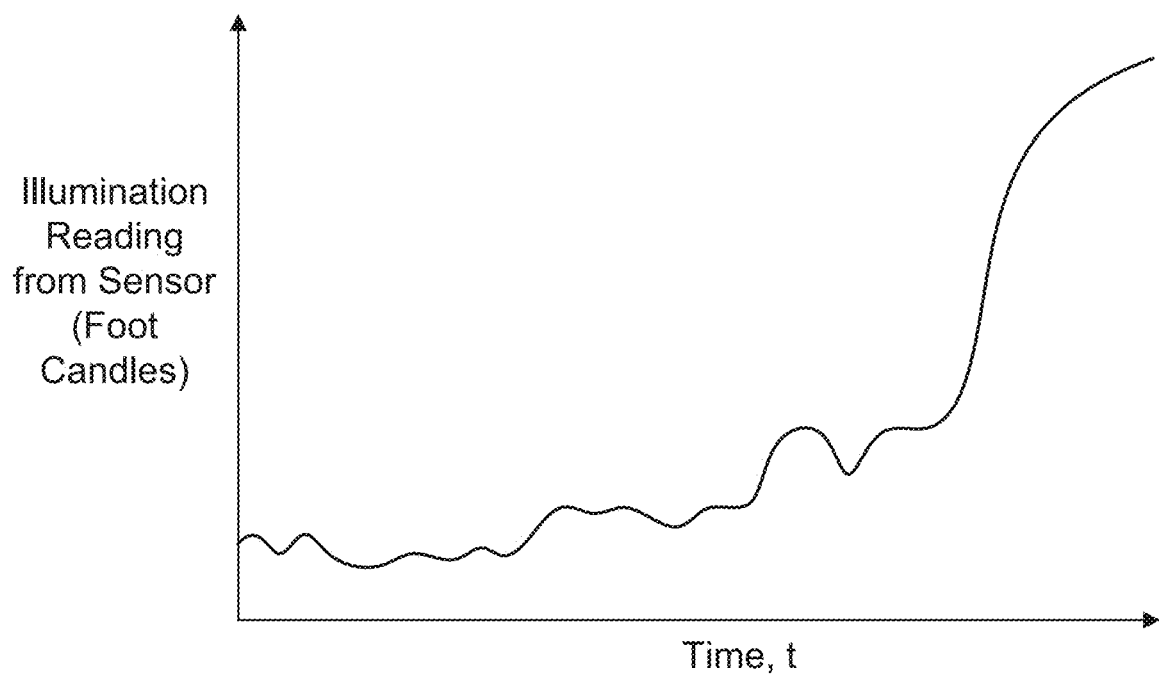
FIG. 23 is a graph of sensor illumination readings taken on a day that begins with fog that rapidly burns off to sunshine later in the day.

An example of a rapidly changing weather condition is a foggy morning that breaks into sunshine. FIG. 23 is a graph of sensor illumination readings taken on a day that begins with fog that rapidly burns off to sunshine later in the day. Certain control systems would determine a low tint level at the beginning of the day based on the low illumination readings during the morning fog. This low tint level would be inappropriately low for the period of time when the weather quickly transitions to clear sky after the fog burns off. In this example, a more appropriate higher tint level for the clear sky may not be determined for a substantial period of time (e.g., 35-45 minutes after the fog burns off). Another example of a rapidly changing condition is the onset of a reflection from an object such as, for example, a parked car or an adjacent building's window.

Certain embodiments described herein include window control methods that use multiple filters to make tinting decisions that address rapidly changing conditions. In certain cases, these filters can be used to determine a more appropriate end tint state during a current transition cycle to adjust the tint level of the window to a level appropriate for current conditions. One type of filter is a box car filter (sometimes called a sliding window filter), which employs multiple sensor readings of illumination values sampled over time. A box car value is a calculated central tendency (e.g., mean, average, or median) of a number, n, of contiguous sensor samples (readings of illumination values measured over time). Typically, the sensor samples are measurements of external radiation (e.g., by a sensor located on the outside of a building). In some cases, a single sensor can be used to take sensor samples for multiple windows such as windows in a particular zone of a building. Sensors generally take readings on a periodic basis at a uniform frequency based on a sampling rate. For example, a sensor may take samples at a sampling rate in the range of about one sample every 30 seconds to one sample every twenty minutes. In one embodiment, a sensor takes samples at a rate of one sample every minute. In some cases, one or more timers may also be used by the control method to maintain the tint at a current setting determined using a box car value.

In certain aspects, control methods use a short term box car and one or more long term box cars (filters) to make tinting decisions. A short box car (e.g., box car that employs sample values taken over 10 minutes, 20 minutes, 5 minutes, etc.) is based on a smaller number of sensor samples (e.g., n=1, 2, 3, . . . 10, etc.) relative to the larger number of sensor samples (e.g., n=10, 20, 30, 40, etc.) in a long box car (e.g., box car that employs sample values taken over 1 hour, 2 hours, etc.). A box car (illumination) value may be based on a mean, average, median or other representative value of the sample values in the box car. In one case, a short box car value is a median value of sensor samples and a long box car value is an average value of sensor samples. Since a short box car value is based on a smaller number of sensor samples, short box car values more closely follow the current sensor readings than long box car values. Thus, short box car values respond to rapidly changing conditions more quickly and to a greater degree than the long box car values. Although both the calculated short and long box car values lag behind the sensor readings, short box car values will lag behind to a lesser extent than the long box car values.

In many cases, short box car values react more quickly than long box car values to current conditions. Based on this, a long box car filter can be used to smooth the response of the window controller to frequent short duration weather fluctuations, while a short box car does not smooth as well but responds more quickly to rapid and significant weather changes. In the case of a passing cloud condition, a control algorithm using only a long box car value will not react quickly to the current passing cloud condition. In this case, the long box car value should be used in tinting decisions to determine an appropriate high tint level. In the case of a fog burning off condition, it may be more appropriate to use a short term box car value in tinting decisions. In this case, the short term box car reacts more quickly to a new sunny condition after the fog burns off. By using the short term box car value to make tinting decisions, the tintable window quickly adjusts to the sunny condition and keeps the occupant comfortable as the fog rapidly burns off.

In certain aspects, control methods evaluate the difference between the short and long term box car values to determine which box car value to use in tinting decisions. For example, when the difference (short term box car value minus long term box car value) is positive and exceeds a first (positive) threshold (e.g., 20 W/m$^2$), the value of the short term box car may be used to calculate a tint level (state). A positive value typically corresponds to a transition to brightening (i.e. increasing radiant intensity outside the window). In some implementations, a first timer is set when the positive threshold is exceeded, in which case a currently calculated tint level is maintained for a prescribed amount of time of the first timer. Using the first timer will favor glare control by holding the window in a more tinted state and preventing too many transitions that may annoy an occupant. On the other hand, when the difference between the short car and long car values is less than the first positive threshold or is negative, the long term box value is used to calculate the next tint state. And if the difference is negative and more negative than a second negative threshold, then a second timer may be set. In certain cases, the positive threshold values are in the range of about 1 Watts/m$^2$ to 200 Watts/m$^2$ and the negative threshold values are in the range of about −200 Watts/m$^2$ to −1 Watts/m$^2$. The calculated tint value based on the long box car is maintained during a prescribed amount of the time of the second timer. Once the control method determines which box car value to use, the method will make tinting decisions based on whether the box car value is above an upper limit, below a lower limit, or between the upper and lower limits. If above the upper limit, Modules A and B (or just B in some cases) are used to determine tint level change. If above the lower limit and below the upper limit, Modules A, B, and C (or just B and C in some cases) are used to determine tint change. If below the lower limit, a defined tint level is applied (e.g., nominally clear). In certain cases, the lower limit may be in the range of 5 Watts/m$^2$ to 200 Watts/m$^2$ and the upper limit may be in the range of 50 Watts/m$^2$ to 400 Watts/m$^2$.

Figure 24A:
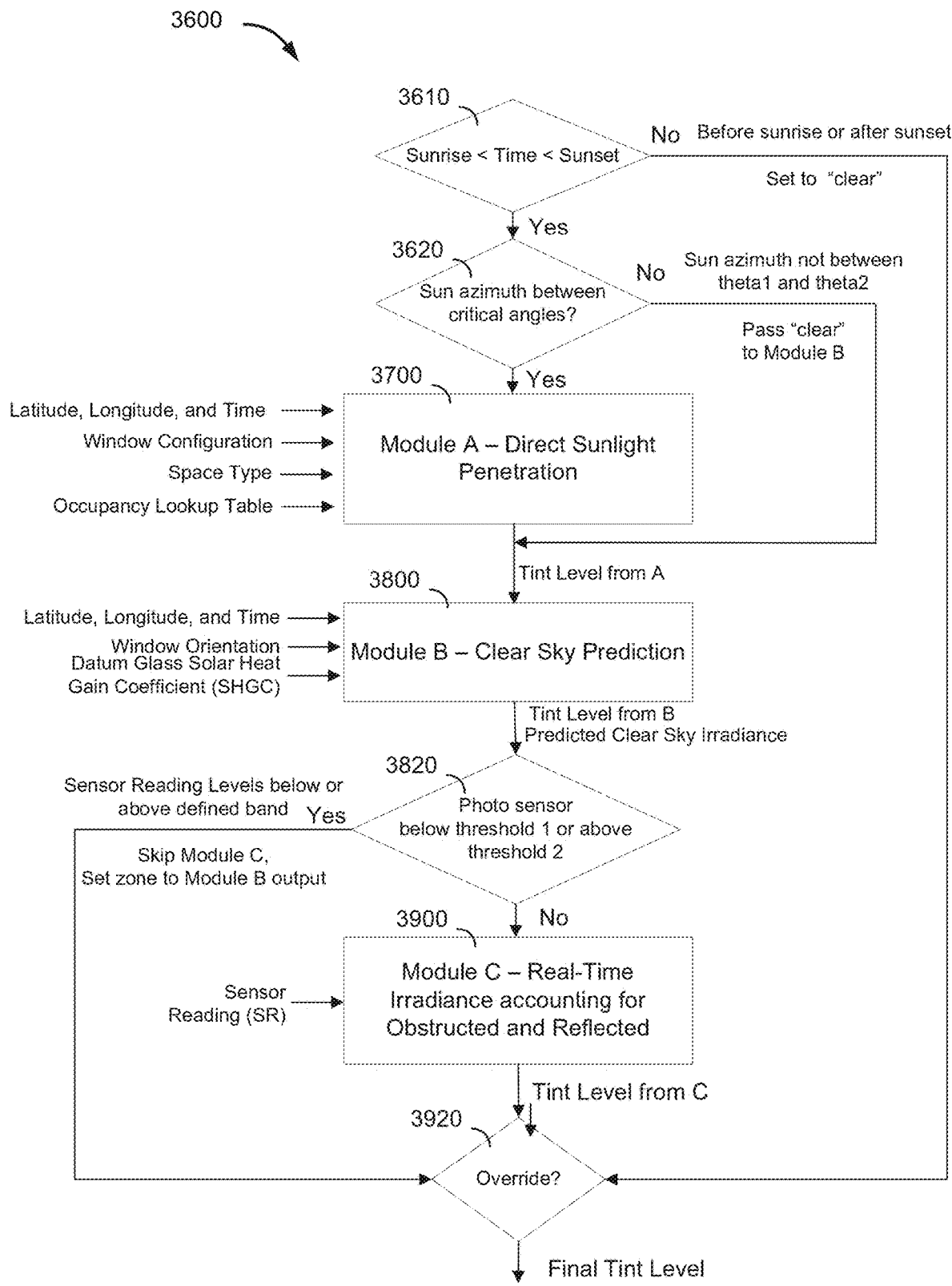
FIG. 24A is a flowchart showing a particular implementation of a portion of the control logic shown in FIG. 7.

FIG. 24A is a flowchart 3600 showing a particular implementation of the control logic shown in FIG. 7. At step 3610, the control method determines whether the current time is between sunrise and sunset. If it is either before sunrise or after sunset at step 3610, the control method clears the tint in the tintable window and proceeds to step 3920 to determine whether there is an override. If it is determined to be between sunrise and sunset at step 3610, the control method determines whether the sun azimuth is between critical angles (step 3620). Although certain control methods are described with respect to a single tintable window, it would be understood that these control methods can be used to control one or more tintable windows or a zone of one or more tintable windows.

Figure 25A:
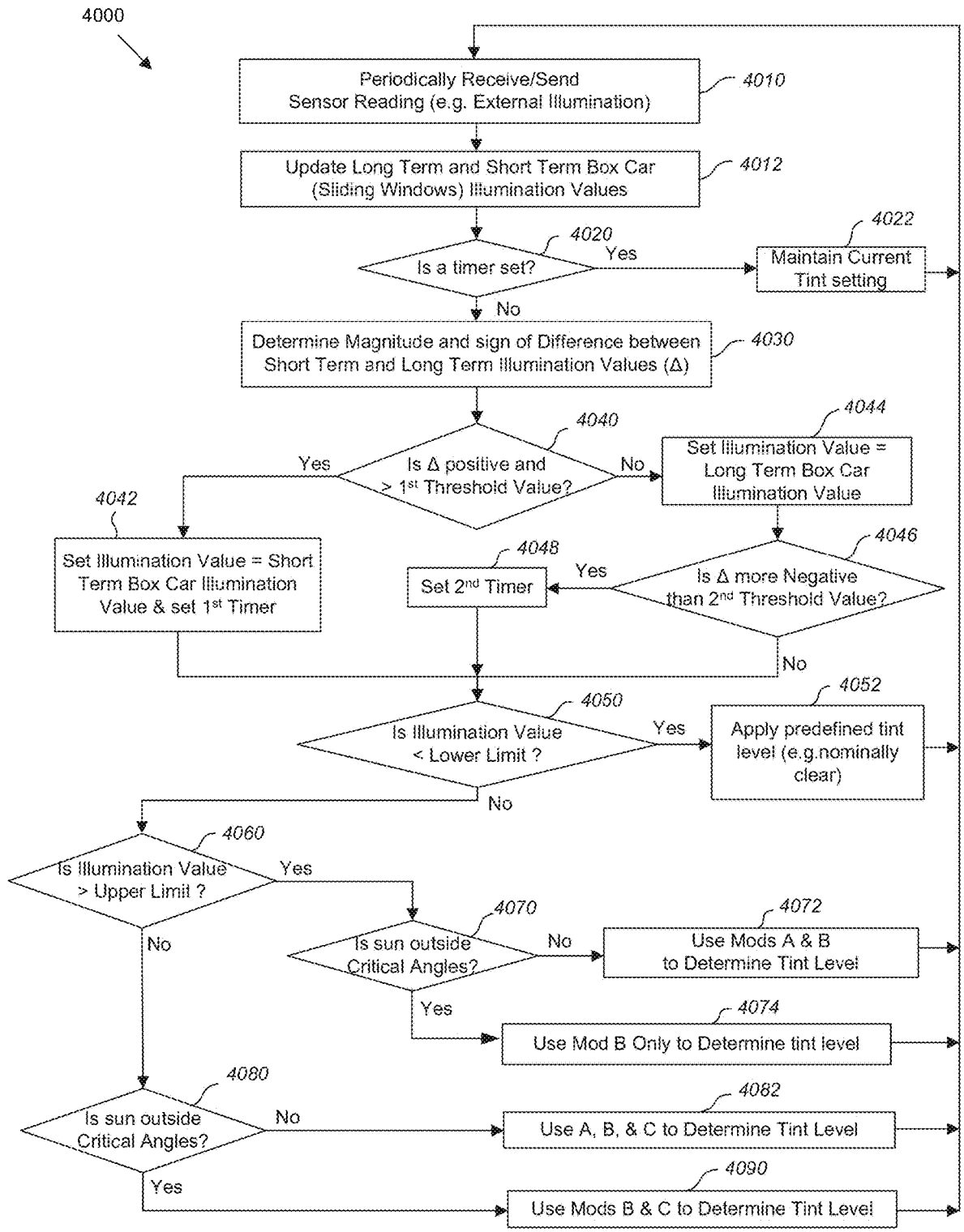
FIG. 25A is a flowchart of a control method that uses box car values to make tinting decisions, according to embodiments.
Figure 25B:
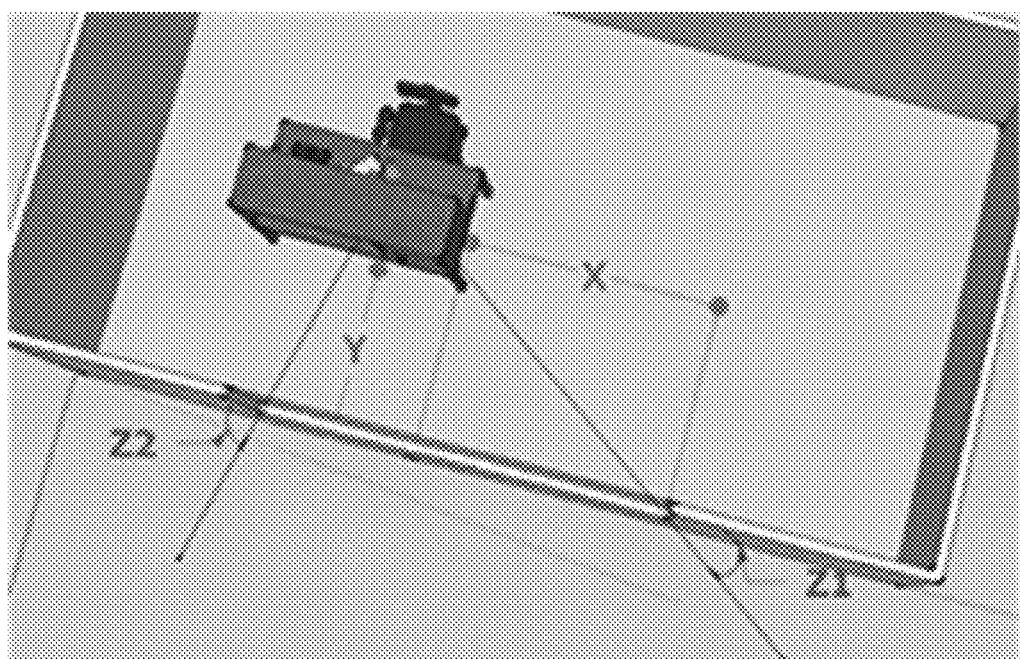
FIG. 25B depicts a room having a desk and the critical angle of the room within which the sun is shining onto an occupant sitting at the desk

FIG. 25B depicts a room having a desk and critical angles of Sun shining through the tintable window in the room. If the sun's azimuth is within the critical angles, then the sun's glare is shining on an occupancy region defined by an occupant sitting at the desk. In FIG. 25B, the sun's azimuth is shown outside the illustrated critical angles.

Returning to the flowchart in FIG. 24A, if it is determined at step 3620 that the sun azimuth is outside the critical angles, Module A is not used and Module B is used at step 3800. If it is determined that the sun azimuth is between the critical angles, Module A is used at step 3700 and then Module B is used at step 3800. At step 3820, the control method determines whether the sensor value is below a threshold 1 or above a threshold 2. If the sensor value is below threshold 1 or above threshold 2, Module C (step 3900) is not used. If the sensor value is above threshold 1 and below threshold 2, Module C is used. In either case, the control method proceeds to step 3920 to determine whether there is an override in place.

Figure 24B:
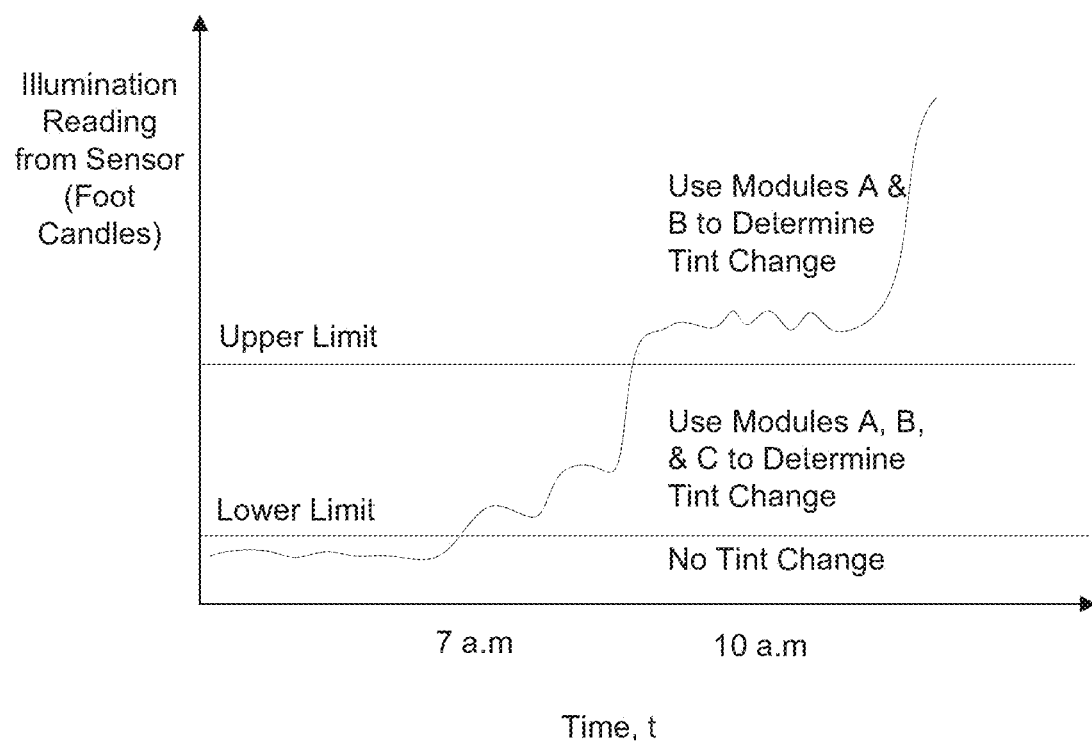
FIG. 24B is a graph of illumination readings during a day that is cloudy early in the day and then sunny later in the day and the corresponding upper and lower limits.

FIG. 24B is a graph of illumination readings from a sensor taken during a day that is cloudy (e.g., foggy) early in the day and sunny (clear sky) later in the day. As shown, the values of the illumination readings are below a lower limit before 7 a.m., rise above the lower limit and then above the upper limit, and then as the clouds burn off after 10 a.m. the illumination readings become much higher later in the day. While the sensor reads illumination levels below a lower limit (e.g., 10 Watts/m$^2$) before 7 a.m., the amount of radiation through the tintable window is not significant enough to affect occupant comfort. In this case, a re-evaluation of tint level does not need to be made and a defined tint level (e.g., maximum window transmissivity) is applied. While the sensor reads between the lower and upper limit (e.g., 100 Watts/m$^2$) after 7 a.m. and before 10 a.m., modules A, B, and C will be used to calculate an end tint state. While the sensor reads above the upper limit (e.g., 100 Watts/m2) after 10 a.m., modules A and B will be used to calculate an end tint state.

FIG. 25A is a flowchart 4000 of a control method that uses short and long box car values to make tinting decisions, according to some embodiments. Although the flowchart is shown using one short term box car value and one long term box car value, other embodiments may include one or more box car values such as, for example, a second long term box car value. The illustrated control method periodically receives sensor readings of illumination values and updates the long term and short term box car values. If a timer is set, then current tint level will be maintained at the current tint setting. The method evaluates the difference between the short and long term box car values to determine which box car value to use as an illumination value in tinting decisions. If the difference between the values is greater than a threshold value, then the short term box car value is used and a first timer is set during which the current tint setting will be maintained. If the difference between the values is lower than the threshold value, the long term box car value is used and a different timer may be set (depending on the magnitude of the difference). Using the previously determined box car value as the illumination value, the method determines whether the illumination value is below a lower limit and if so, a pre-defined tint level is applied (e.g., nominally clear). If the illumination value is above an upper limit, the method determines whether the sun is outside the critical angles.

FIG. 25B depicts a room having a desk and the critical angles of the room within which glare from the sun is shining in an occupancy region defined by an occupant sitting at the desk. In the illustration, the sun is outside the critical angles. If the method determines that the sun is outside the critical angles, only Module B is used to determine tint level. If within the critical angles, Modules A and B are used to determine tint level. If the illumination value is above the lower limit and below the upper limit, the method determines whether the sun is outside the critical angles. If outside the critical angles, Modules B and C are used to determine tint level. If within the critical angles, Modules A, B, and C are used to determine tint level.

More specifically with reference back to FIG. 25A, sensor readings of illumination values (e.g., external radiation readings) are sent by the sensor and received by the processor at step 4010. Generally, the sensor takes samples on a periodic basis at a uniform rate (e.g., one sample taken every minute). At step 4012, the long term and short term box car illumination values are updated with the received sensor readings. In other words, the oldest readings in the box car filters are replaced with the newest readings and new box car illumination values are calculated, usually as central tendencies of readings in the box cars.

At step 4020, it is determined whether a timer is set. If a timer is set, then the current tint setting is maintained at step 4022 and the process returns to step 4010. In other words, the process does not calculate a new tint level. If a timer is not set, the magnitude and sign of the difference between the short term and long term box car illumination values (Δ) is determined at step 4030. That is, 4=Short Term Box Car value−Long term Box Car value.

At step 4040, it is determined whether 4 is positive and greater than a first positive threshold value. If 4 is positive and greater than a first threshold value, then the illumination value for the system is set to short term box car illumination value and a first timer is set at step 4042 and the method proceeds to step 4050. If 4 is positive but not greater than the first positive threshold value, then the illumination value for the system is set to the long term box car illumination value at step 4044. At step 4046, it is determined whether 4 is more negative than a second negative threshold value. If 4 is more negative than the second negative threshold value, then a second timer is set at 4048, and the method proceeds to step 4050. If not, the method directly proceeds to step 4050.

At step 4050, it is determined whether the set illumination value for the system is less than a lower limit. If the set illumination value for the system is less than the lower limit, a predefined tint level (e.g., nominally clear) is applied at step 4052 and the process returns to step 4010. If the set illumination value for the system is greater than a lower limit, it is determined whether the set illumination value for the system is greater than an upper limit at step 4060. If it is determined that the set illumination value for the system is greater than an upper limit, then it is determined whether the sun azimuth is outside the critical angles at 4070. If the sun is not outside the critical angles, Modules A and B are used to determine a final tint level applied to the tintable window and the process returns to step 4010. If the sun is outside the critical angles, only Module B is used to determine the final tint state at step 4074 and the process returns to step 4010. If it is determined that the set illumination value for the system is not greater than an upper limit at step 4060, then it is determined whether the sun is outside the critical angles at 4080. If the sun is not outside the critical angles, Modules A, B, and C are used to determine a final tint level at step 4082 applied to the tintable window and the process returns to step 4010. If the sun is outside the critical angles, only Modules B and C are used to determine the final tint level at step 4090 applied to the tintable window and the process returns to step 4010.

Figure 26A:
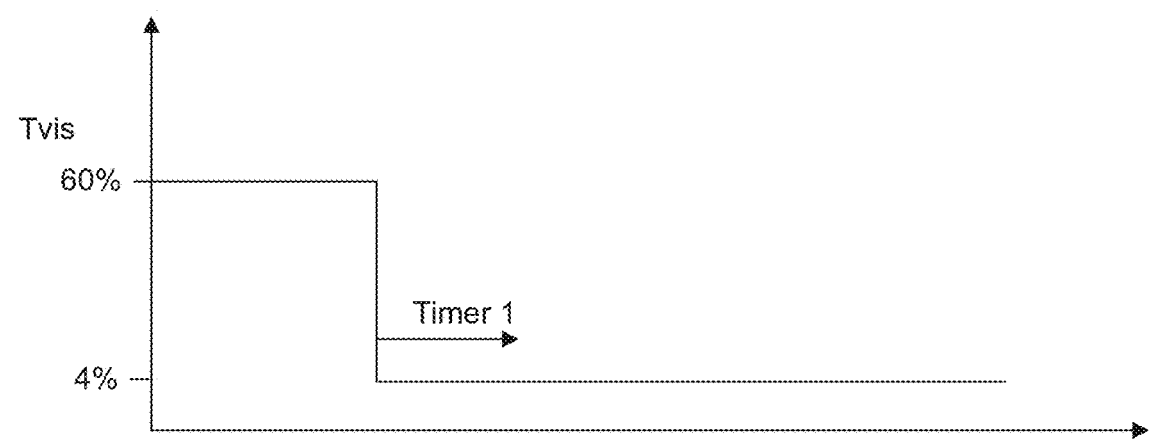
FIG. 26A depicts two graphs associated with sensor readings during a regular day and the associated determined tint states determined of a control method using box car filters, according to embodiments.
Figure 26A:
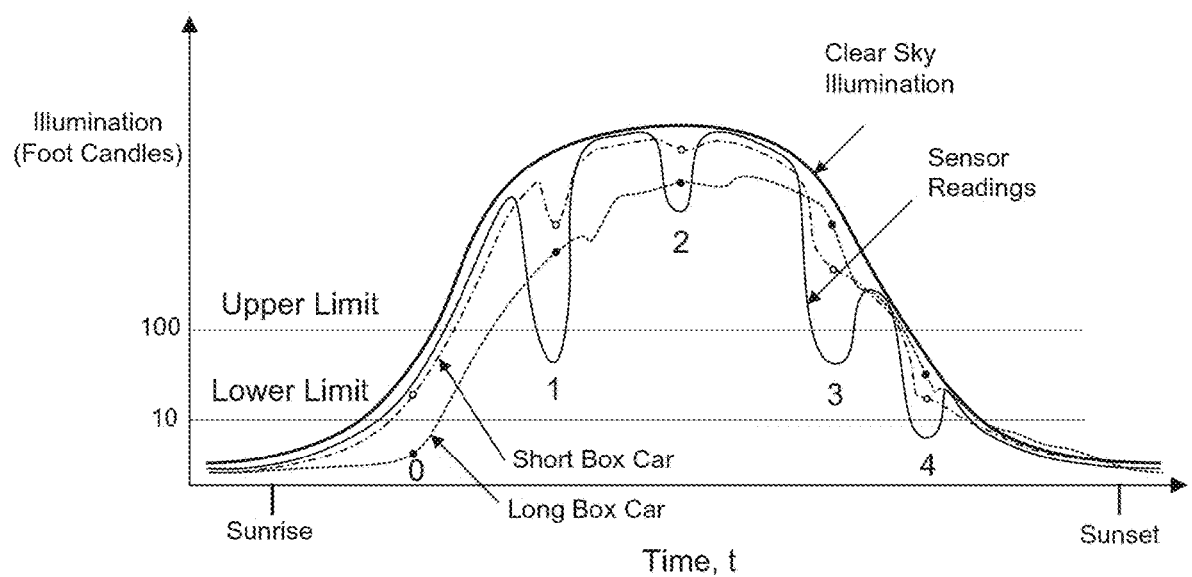

FIG. 26A depicts two graphs associated with sensor readings during a regular day and the associated tint states determined by the control method described with reference to FIG. 25A. The bottom graph includes a bell-shaped curve of clear sky illumination values over time, t, for reference purposes. This particular bell-shaped curve would be an example of values measured at a south facing window (i.e. because the bell is roughly centered in the dawn to dusk time scale) with critical angles of 90 (East) to 270 (West). The bottom graph also includes a curve of sensor readings taken over time, t during a day when the weather periodically deviates from clear sky. The sensor readings are typically measurements of external radiation. The bottom graph also includes curves of updated short box car values and long box car values calculated at time, t. These values are usually calculated as central tendencies of the samples in the box cars updated at time, t. The curve of sensor readings also shows drops in illumination at the passing of four clouds 1, 2, 3, and 4, and then returning to sunshine after each of the clouds pass. The short box car curve follows the sensor reading curve and reacts quickly to the drops in illumination from the four clouds. The long box car values lag behind the sensor reading drops in illumination and do not react to the same extent as the short box car values to these drops in illumination from the clouds. The top graph shows the tint state transmission ($T_{vis}$) through the tintable window determined by the control method at time, t. Until just before event 0, the positive difference between the short term box car value and the long term box car value is less than a first (positive) threshold value (e.g., 20 Watts/m$^2$), and the illumination value is set to the updated long box car value. Since the illumination value is below the lower limit, a defined tint level (nominally clear state) associated with a $T_{vis}$ of 60% is applied. As shown, the control method applies $T_{vis}$ of 60% until the positive difference between the short term box car value and the long term box car value is greater than a first positive threshold value (e.g., 20 Watts/m$^2$), and then the illumination value is set to the short box car value (event 0). At this time, Timer 1 is set and the tint state calculated at event 0 is maintained until Timer 1 expires just after cloud 1 passes. Since the illumination value (based on the short box car value) is greater than the lower limit and less than the high limit and the sun is within the critical angles, Modules A, B, and C are used to determine a tint level at event 0 corresponding to $T_{vis}$ of 20%. Thereafter, the value of the short term box car passes the upper level, triggering a calculation based on Modules A and B only. However, no change in tint level occurs since Timer 1 is set. Just after the time Cloud 1 passes, Timer 1 expires. From this time until just before cloud 3, the positive difference between the short term box car value and the long term box car value is greater than the first positive threshold value and the illumination value is set to the updated short term box car value. During this time, the illumination values (based on the updated short term box car values) remain above the upper limit and the sun remains within the critical angles, and so Modules A and B are again used to determine a tint level and they calculate a tint level corresponding to $T_{vis}$ of 4%. At Cloud 3, the long box car value is greater than the short box car value and the difference is now negative and so the illumination value is set to the long box car value. Since the difference is less negative than the second negative threshold value, no timer is set. Since the illumination value is greater than the upper limit and the sun is outside the critical angles, Modules A and B are again used to determine tint level to determine a tint level corresponding to $T_{vis}$ of 4%. At Cloud 4, the long box car value is again greater than the short box car value, and the difference is less negative than the negative threshold value. At this time, the illumination value is set to the updated long box car value, but no timer is set. Since the illumination value is greater than the low limit and less than the high limit and the sun is within the critical angles, Modules A, B, and C are used to determine a tint level and they calculate a tint level corresponding to a $T_{vis}$ of 4%.

Figure 26B:
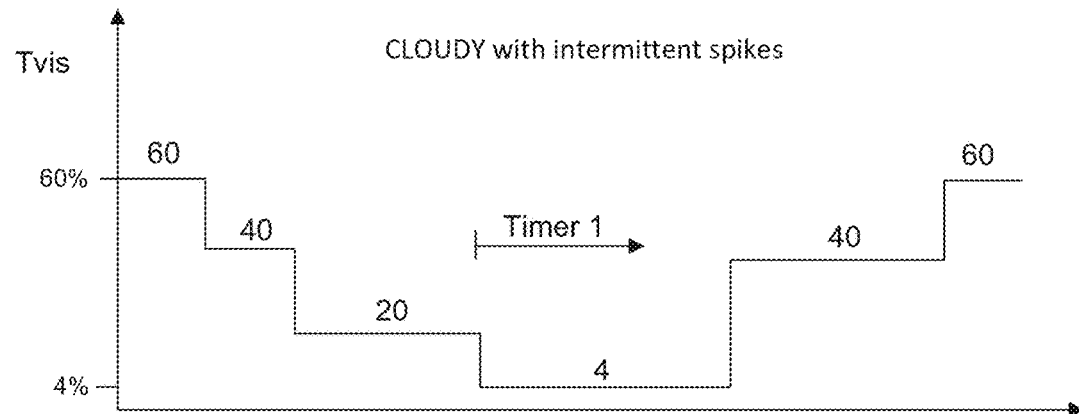
FIG. 26B depicts two graphs associated with sensor readings during a cloud day with intermittent spikes and the associated determined tint states determined of a control method using box car filters, according to embodiments.
Figure 26B:
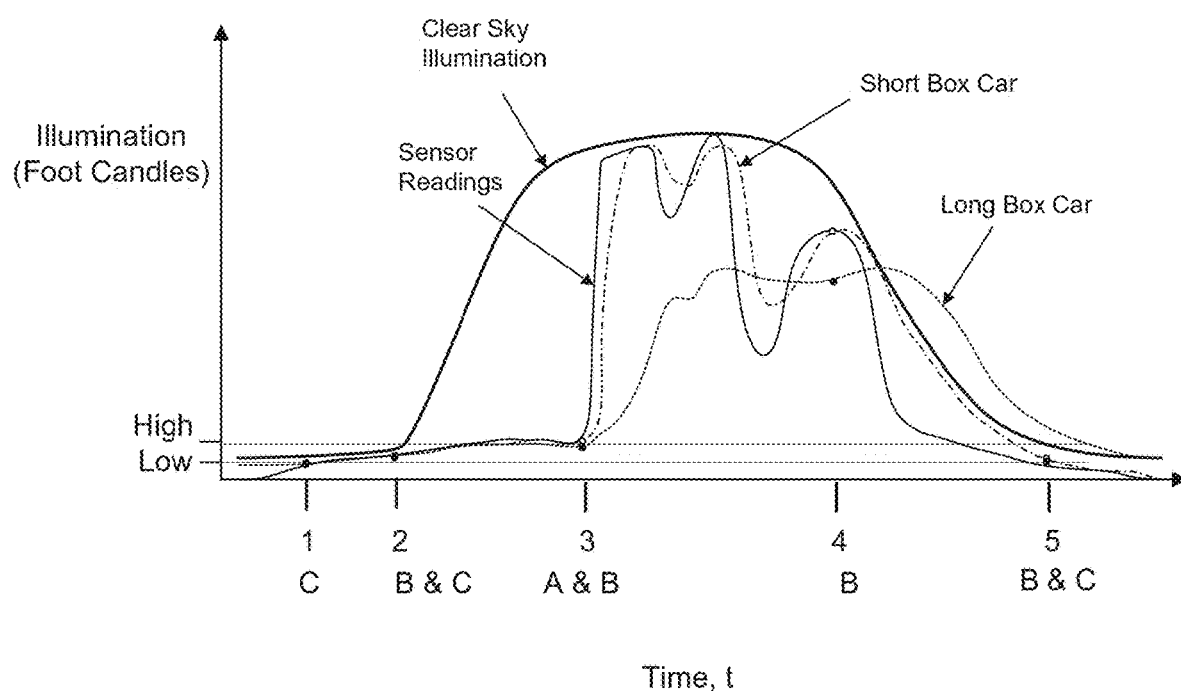

FIG. 26B depicts two graphs associated with sensor readings during a cloudy day with intermittent spikes and the associated tint states determined by the control method described with reference to FIG. 25A. The bottom graph shows sensor readings at time, t, over the cloudy day. The bottom graph also includes a bell-shaped curve of clear sky illumination values over time, t, for reference purposes. The bottom graph also includes curves of updated short box car values and long box car values calculated at time, t. The curve of sensor readings shows that conditions are cloudy in the morning until point 3 when it becomes sunny for a short period with two drops before becoming cloudy again at point 4. The top graph shows the tint state transmission $T_{vis}$ through the tintable window calculated by the control method at time, t. Before point 1, the positive difference between the short term box car value and the long term box car value is less than the first positive threshold value, and the illumination value is set to the long box car value. Since the illumination value is below the lower limit, a predefined tint level (e.g. nominally clear) associated with a $T_{vis}$ of 60% is applied. At point 1, the difference between the short term and long term box car values is positive and less than a first positive threshold value, and the illumination value is set to the updated long box car value. In this case, the illumination value is between the lower and upper limit and it is early in the day so that the sun is outside the critical angles so that Module A does not need to be used to determine glare into the room. In this case, only Modules B and C are used and they calculate the tint level at $T_{vis}$ of 40% to darken the window. At point 2, the difference between the short term and long box car values is positive and less than the first positive threshold value, and the illumination value is set to the updated long box car value. At this point, it is still early in the day and the sun is outside the critical angles. The illumination value is higher than it was at point 1, but still between the upper and lower limit, and Modules B and C determine a tint level at $T_{vis}$ of 20% to darken the window further. At point 3, the difference between the short term and long term box car values is positive and greater than a threshold value, and so the illumination value is set to the updated short box car value and Timer 1 is set. Since the illumination value is above the upper limit and the sun is within the critical angles, Modules A and B are used to determine increase the tint to a tint level corresponding to $T_{vis}$ of 4%. During the timer's length, the tint state will be maintained. Just before point 4, Timer 1 expires. At point 4, the positive difference between the short term and long term box car values is greater than a first positive threshold value, and the illumination value is set to the updated short box car value. The illumination value is above the upper limit and the sun is outside the critical angles at this time of day so that only Module B is used to determine a tint level corresponding to $T_{vis}$ of 40%. At point 5, the positive difference between the short term and long term box car values is less than the first threshold value, and the illumination value is set to the updated long box car value. No timer is set. At this point late in the day, the illumination value is below the lower limit and the sun is outside the crucial angles so that Modules B and C are used to determine a tint level corresponding to $T_{vis}$ of 60%.

Figure 27A:
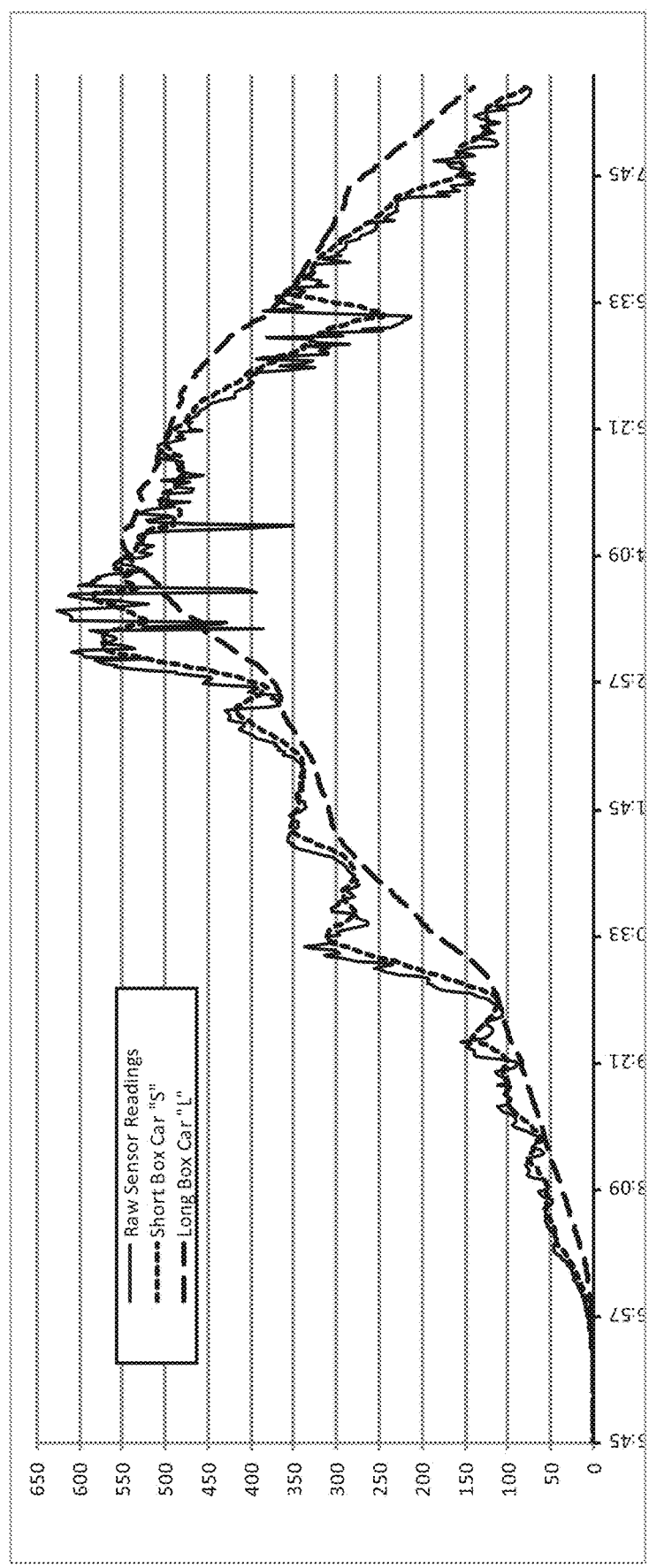
FIG. 27A is a plot of illumination values including sensor readings, short box car values, and long box car values determined during time, t, during a day.
Figure 27B:
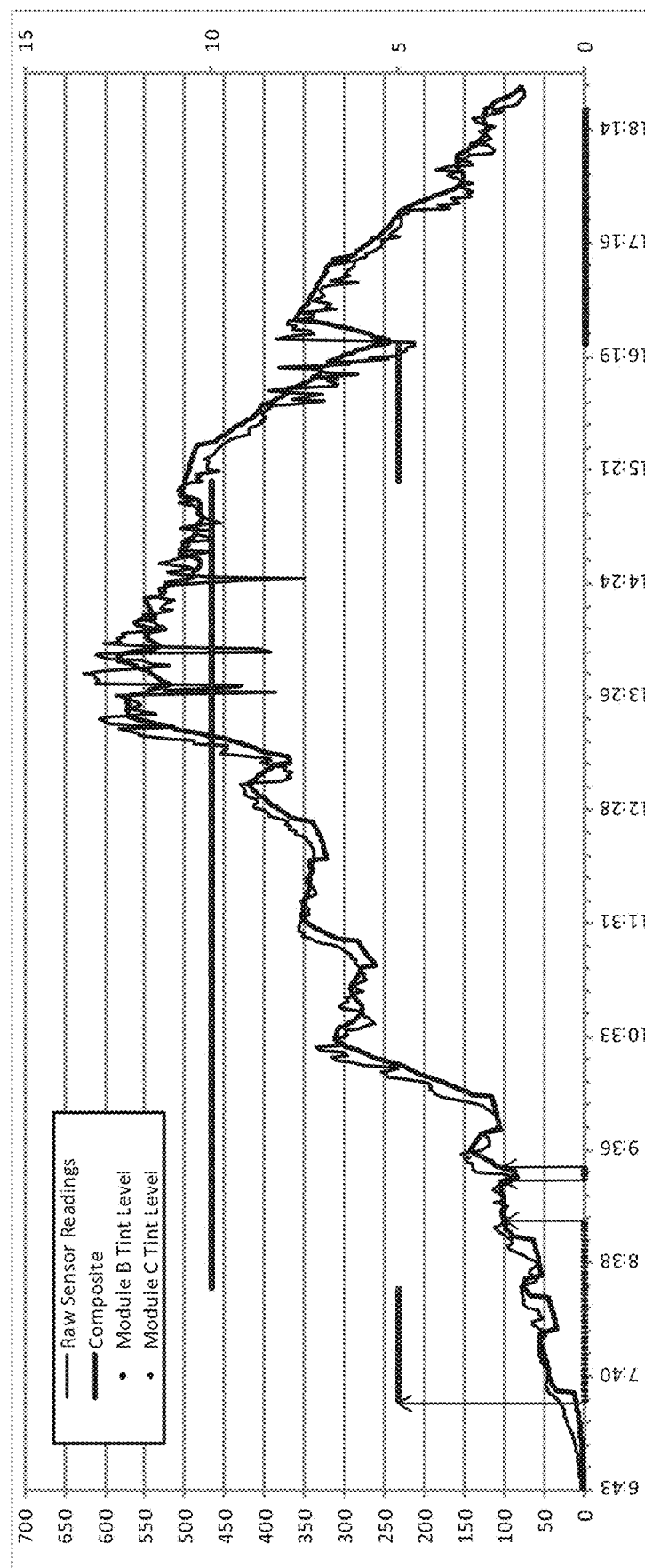
FIG. 27B is a plot of the sensor readings of FIG. 27A and associated tint level determined by Module B, and tint level determined by Module C during a day.

FIG. 27A is a plot of illumination values including sensor readings, short box car values, and long box car values determined at time, t, during a day. FIG. 27B is a plot of the sensor readings of FIG. 27A and associated tint level determined by Module B, and tint level determined by Module C during a day.

Figure 28A:
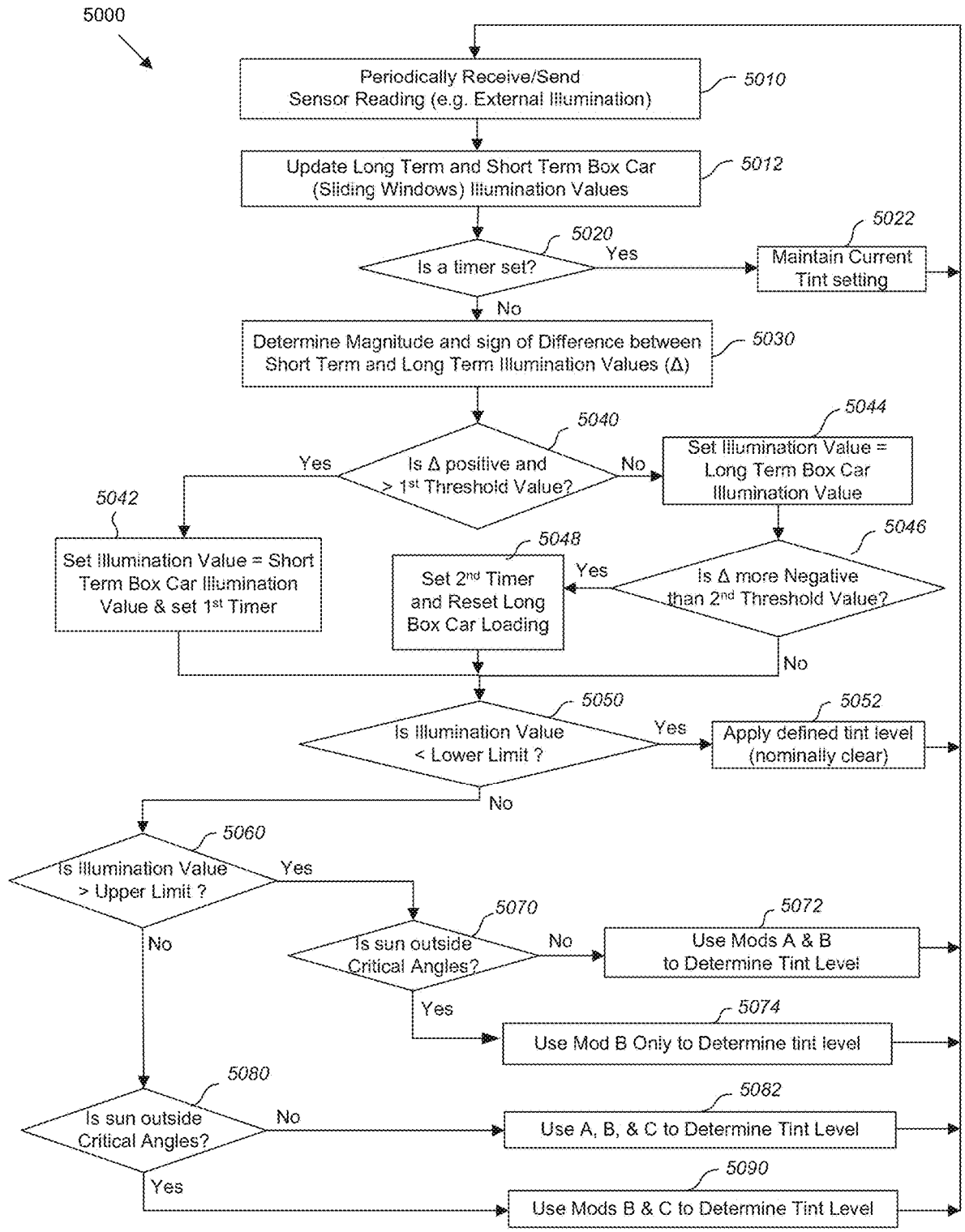
FIG. 28A is a flowchart of a control method that uses box car values to make tinting decisions, according to embodiments.
Figure 28B:
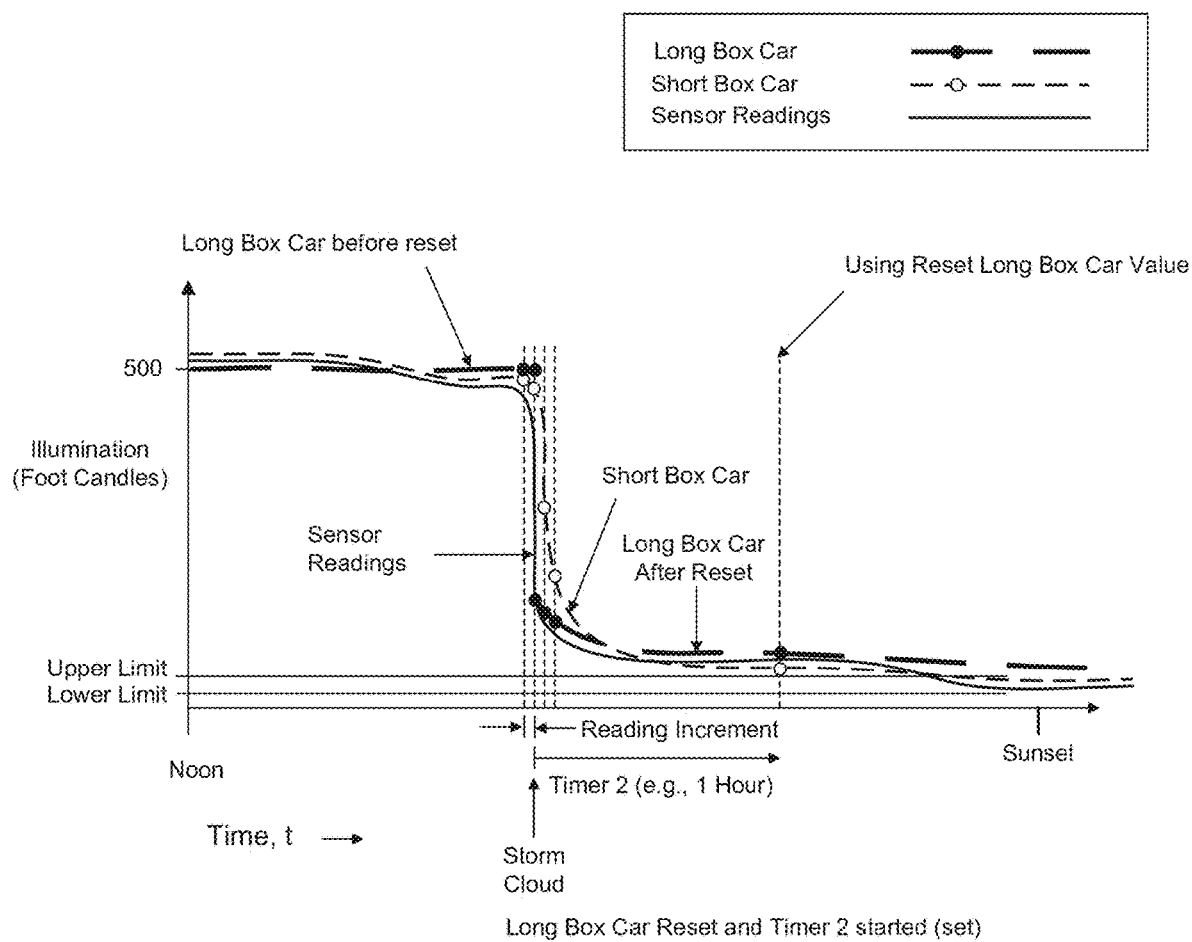
FIG. 28B is a plot of illumination values including sensor readings, short box car values, and long box car values determined during time, t, during a day.
Figure 29A:
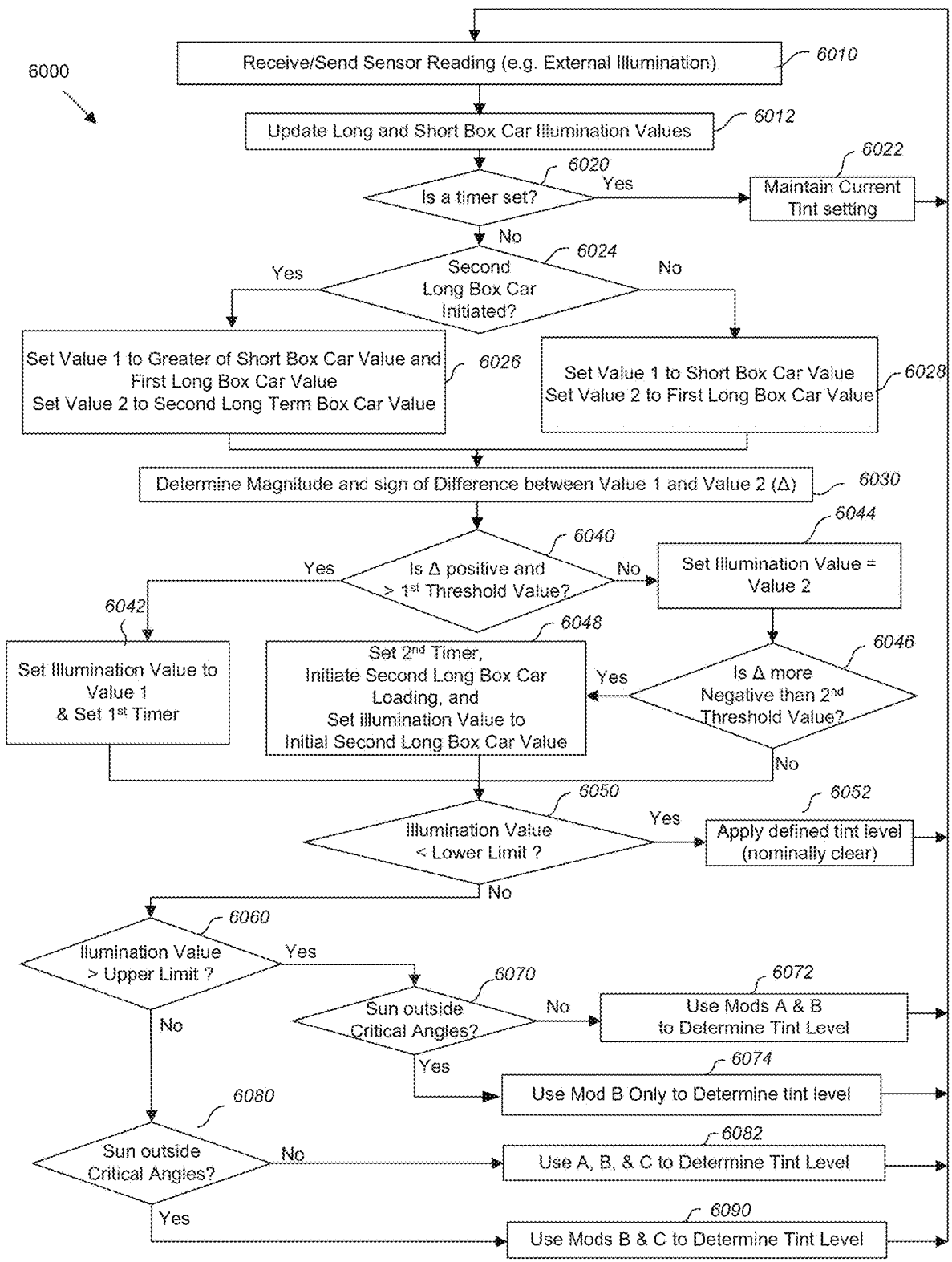
FIG. 29A is a flowchart of a control method that uses box car values to make tinting decisions, according to embodiments.
Figure 29B:
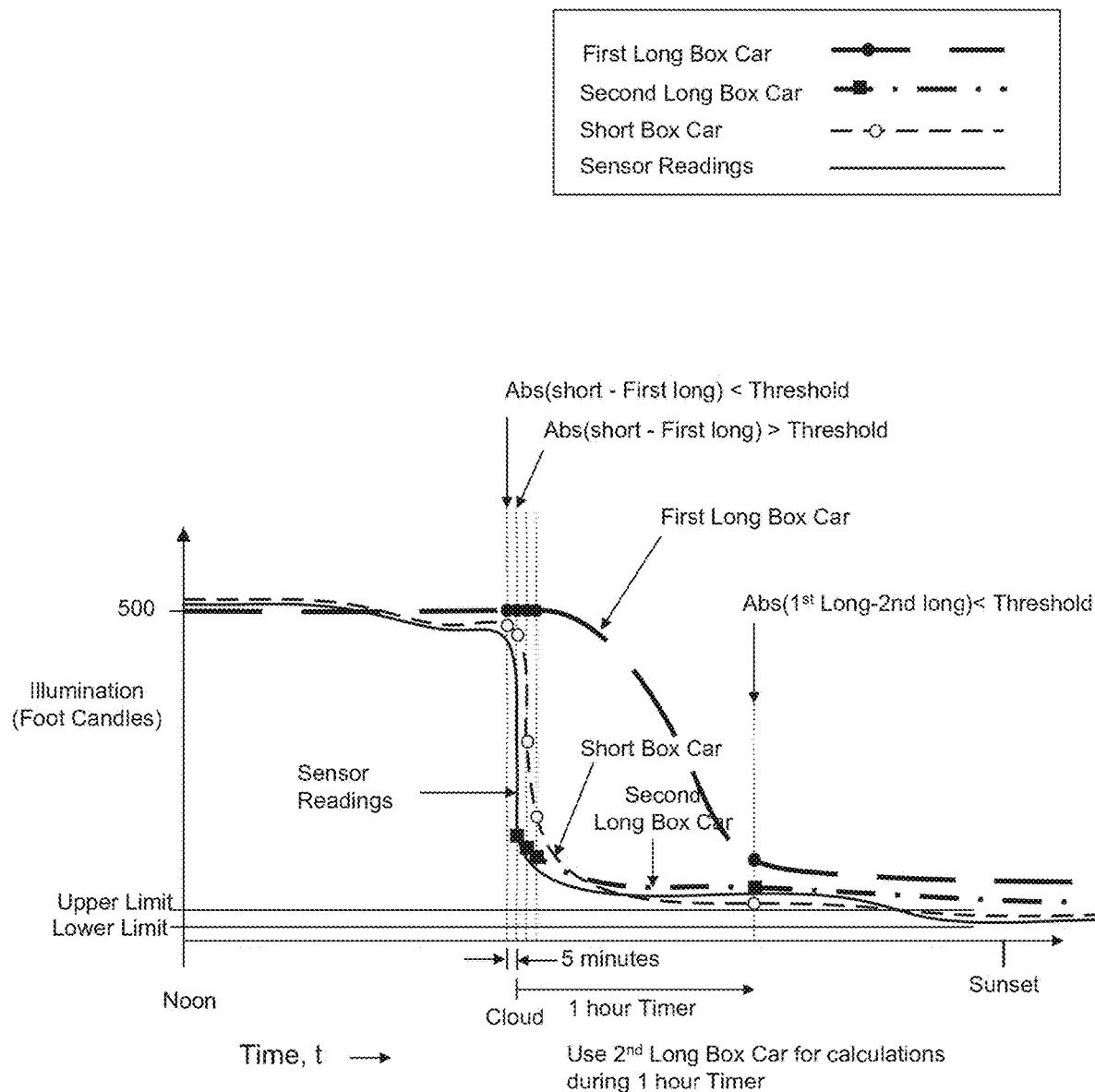
FIG. 29B is a plot of illumination values including sensor readings, short box car values, and long box car values determined during time, t, during a day.

In some aspects, the long box car value is updated with sensor readings and is never reset during the day. If sensor readings were to change significantly during the day (e.g., when a storm front arrived), these long box car values would lag substantially behind the rapid change in sensor readings and would not reflect the rapid change. For example, the long box car values are significantly higher than the sensor readings after a substantial drop in external illumination. If these high long box car values are used to calculate a tint level, the windows may be over-tinted until the long box cars had time to load with more current sensor readings. In certain aspects, control methods reset the long box car after a rapid change in illumination so that the long box car can be loaded with more current sensor readings. FIGS. 28A-B are illustrations of control methods that reset loading of the long box car. In other aspects, control methods use a second long box car that is initiated with a significant change in illumination condition. FIGS. 29A-B are illustrations of control methods that have a second long box car. In these cases, the control methods can use long box car values that are closer to the current sensor readings and may avoid over tinting the windows after a rapid drop in illumination.

FIG. 28A is a flowchart 5000 of a control method that resets loading of a long box car, according to embodiments. The long box car is reset and starts reloading current sensor readings after a rapid change in sensor readings. The long box car is reset when the negative difference between the short box car value and long box car value is more negative than a second negative threshold value. That is, a negative difference that is more negative than the negative threshold value indicates a rapid change in sensor readings. At the same time, the control method starts a second timer. The control method uses the reset long box car value to calculate tint level that will be maintained during the second timer. Since the long box car starts reloads with new sensor readings when the conditions rapidly change, the long box car value closely follows sensor readings for a time and the control method will determine tint levels that closely correspond to the current changing sensor readings after the rapid change.

More specifically with reference to FIG. 28A, sensor readings are sent by the sensor and received by the processor at step 5010. At step 5012, the long term and short term box car illumination values are updated with more current sensor readings received. If it is determined at step 5020 that a timer is set, then the current tint setting is maintained at step 5022 and the process returns to step 5010. If is determined that a timer is not set at step 5020, then the magnitude and sign of the difference between the short term and long term box car illumination values (Δ) is determined at step 5030. That is, Δ=Short Term Box Car value−Long Term Box Car value. If it is determined at step 5030 that Δ is positive and greater than a first positive threshold value, then the illumination value is set to the short term box car illumination value, a first timer is set at step 5042, and the method proceeds to step 5050. If it is determined at step 5030 that Δ is positive and less than the positive threshold value or is a negative value, then the illumination value is set to the long term box car illumination value at step 5044. At step 5046, it is determined whether Δ is more negative than a second negative threshold value. If Δ is more negative than the second threshold value, this is an indication of a significant drop in illumination. In this case, a second timer is set and the long box car is reset (emptied of values) at step 5048 to start loading again, and the method proceeds to step 5050. If 4 is not more negative than the second negative threshold value, the method directly proceeds to step 5050. At step 5050, it is determined whether the set illumination value is less than a lower limit. If less than the lower limit, a defined tint level (e.g., nominally clear) is applied at step 5052 and the process returns to step 5010. If the set illumination value for the system is greater than a lower limit, it is determined whether the set illumination value for the system is greater than an upper limit at step 5060. If it is determined that the set illumination value for the system is greater than an upper limit, then it is determined whether the sun azimuth is outside the critical angles at 5070. If the sun is within the critical angles, Modules A and B are used to determine a final tint level applied to the tintable window and the process returns to step 5010. If the sun is outside the critical angles, only Module B is used to determine the final tint state at step 5074 and the process returns to step 5010. If it is determined that the set illumination value for the system is not greater than an upper limit at step 5060, then it is determined whether the sun is outside the critical angles at 5080. If the sun is within the critical angles, Modules A, B, and C are used to determine a final tint level at step 5082 applied to the tintable window and the process returns to step 5010. If the sun is outside the critical angles, only Modules B and C are used to determine the final tint level at step 5090 applied to the tintable window and the process returns to step 5010.

FIG. 28B illustrates a scenario of sensor readings and box car values during time, t, during a portion of a day. This scenario assumes a bright sunny day (500 W/m$^2$) at noon and the box car curves are tracking together for the most part at this time, with calculations going on every 5 minutes. At the first vertical dotted black line (regular 5 min interval calculations) there has been a slight drop in sensor readings and the short term box car value is slightly higher than the long term box car value, which lags behind the sensor readings. Since the negative difference between the short term and long term values is more negative than the negative threshold value, the long term box car value is used to determine tint level. At the very next calculation, the sensor readings are showing a large drop in external illumination (e.g., storm front arrived). The negative difference is more negative than the negative threshold value and the control method triggers a 1 hour timer (changing condition has caused this event, made delta sufficient to trigger the timer) and the long box car is reset. The control method sets the illumination value to the reset long box car value to determine a tint level to use during the timer period. Since the long term box car value is above the upper limit and the sun is within the critical angles, Modules A and B are used to determine the tint level based on the reset long box car value. At the end of the second timer period, the negative difference between short box car and long box car values is more negative than the negative threshold value so that the illumination is set to the long term box car value with readings taken since the reset.

At the end of the second timer period, if the logic did not reset the long box car, the second timer would have been again implemented and the long box car value would have been used during the time period (as before). As you can see, this would have inappropriately over-tinted the window since the current sensor readings (and associated short box car value) show it is a dull day and the window does not need to be tinted as high as long box car value would seem to indicate. In this scenario, a long term box car is reset at the timer start period. In other words, once the timer is triggered, this simultaneously triggers resetting the long box car to start loading with new sensor data. Using this reset logic, at the end of the second timer, the short term box car value is compared with the reset long box car value and the delta would more closely reflect current sensor readings.

FIG. 29A is a flowchart 6000 of a control method that initiates a second long box car when there is a rapid change in sensor readings. The values of the newly-initiated second long box car closely track the sensor readings during the rapid change. The first long box car lags behind the sensor readings.

With reference back to FIG. 29A, sensor readings of illumination values are sent by the sensor and received by the processor at step 6010. At step 6012, box car illumination values are updated with the received sensor readings. If it is determined at step 6020 that a timer is set, then the current tint setting is maintained (i.e. no calculation of new tint level) at step 6022 and the process returns to step 6010. If is determined that a timer is not set at step 6020, it is determined whether a second long box car has been initiated at step 6024. If a second long box car is determined to be initiated at step 6024, Value 1 is set to the greater of the short box car and the first long box car illumination values and Value 2 is set to the second long box car illumination value. If a second long box car has not been initiated, Value 1 is set to the short box car illumination value and Value 2 is set to the second long box car illumination value. At step 6030, the magnitude and sign of the difference between Value 1 and Value 2 (Δ) is determined. If it is determined at step 6030 that Δ is positive and greater than a first positive threshold value, then at step 6042, the illumination value is set to Value 1 and a first timer is set, and then the method proceeds to step 6050. If it is determined at step 6030 that Δ is positive and less than the first positive threshold value or Δ is a negative value, then the illumination value is set to Value 2 at step 6044. At step 6046, it is determined whether Δ is more negative than a second negative threshold value. If Δ is more negative than the second negative threshold value, then there has been a significant drop in illumination. In this case, a second timer is set, a second long box car is initiated, and the illumination value is set to the initial value of the second long box car at step 6048, and the method proceeds to step 6050. If Δ is not more negative than the second threshold value, the method directly proceeds to step 6050. At step 6050, it is determined whether the set illumination value is less than a lower limit. If less than the lower limit, a defined tint level (e.g., nominally clear) is applied at step 6052 and the process returns to step 6010. If the set illumination value for the system is greater than a lower limit, it is determined whether the set illumination value for the system is greater than an upper limit at step 6060. If it is determined that the set illumination value for the system is greater than an upper limit, then it is determined whether the sun azimuth is outside the critical angles at 6070. If the sun is not outside the critical angles, Modules A and B are used to determine a final tint level applied to the tintable window and the process returns to step 6010. If the sun is outside the critical angles, only Module B is used to determine the final tint state at step 6074 and the process returns to step 6010. If it is determined that the set illumination value for the system is not greater than an upper limit at step 6060, then it is determined whether the sun is outside the critical angles at 6080. If the sun is not outside the critical angles, Modules A, B, and C are used to determine a final tint level at step 6082 applied to the tintable window and the process returns to step 6010. If the sun is outside the critical angles, only Modules B and C are used to determine the final tint level at step 6090 applied to the tintable window and the process returns to step 6010.

FIG. 29B illustrates a scenario of sensor readings and box car values during time, t, during a portion of a day. This scenario assumes a bright sunny day (500 W/m$^2$) at noon and the box car curves are tracking together for the most part at this time, with calculations going on every 5 minutes. At the first vertical black line (regular 5 min interval calculations) there has been a slight drop in sensor readings and the short term box car value is slightly higher than the first long term box car value, which lags behind the sensor readings. Since the negative difference between the short and first long box car values is below the threshold value, the first long box car value is used to determine tint level. At the very next calculation, the sensor readings are showing a larger drop in external illumination. In this case, the negative difference is more negative than the negative threshold value and the control method triggers a 1 hour timer (changing condition has caused this event, made delta sufficient to trigger the timer) and a second long box car is initiated. In addition, the illumination value is set to the initial second long box car value. Since this initial second long term box car value is above the upper limit and the sun is within the critical angles, Modules A and B are used to determine the tint level based on the initial second long box car value. At the end of the second timer period, the first long box car value is greater than the short box car value and the positive difference between the second long box car value and first long box car value is below the first threshold value. The control method uses the first long box car illumination value to determine a tint level that will be used during the first timer.

In certain embodiments, Module A may increase tint in a window if calculated direction of solar radiation through the window is within critical acceptance angles associated with a glare scenario in an occupied area of the room with the window. The direction of solar radiation is calculated based on Sun azimuth and/or Sun altitude. FIG. 25B, for example, shows critical acceptance angles, Z1 and Z2 associated with a desk in a room. In this example, when the sun is located in a position that provides solar radiation at an azimuth angle within the critical acceptance angles, Z1 and Z2, solar radiation is generating glare onto an area occupied by the desk. In response, Module A may send a control signal to increase tint state in the window to provide comfort from the glare. Outside the critical acceptance angles, Z1 and Z2, the direct parallel rays of solar radiation do not impinge on the desk area and Module A may return a control command of "clear tint state." Another example of a set of critical acceptance angles, $\Theta_1$ and $\Theta_2$, associated with Sun azimuth is shown in FIG. 20. In some cases, two sets of critical angles associated separately with Sun Azimuth and Sun Altitude respectfully may be used. In these cases, Module A may turn on to increase tint state if the calculated Sun azimuth is within the first set of critical angles and the sun altitude is within the second set of critical angles.

X1. Module a Based on Three-Dimensional Projection of Light

In certain embodiments, Module A determines whether glare is on an occupancy area by using a three-dimensional projection of light through the room from one or more apertures (e.g., tintable windows). The three-dimensional projection of light may be considered to be a volume of light in a room where the outside light directly penetrates into the room. For example, the three dimensional projection may be defined by parallel light rays from the sun through a window. The direction of the three-dimensional projection into the room is based on Sun azimuth and/or Sun altitude. The three-dimensional projection of light can be used to determine two-dimensional light projections (P-images) at intersections of one or more planes in the room. The size and shape of a P-mage from an aperture is based on the dimensions and orientation of the aperture and a directional vector of the solar radiation calculated based on the sun azimuth and/or Sun altitude. The P-images are determined based on the assumption that the sun generates parallel light rays at an infinite distance away from an aperture. With this assumption, a horizontally-oriented aperture provides a two-dimensional light projection onto a horizontal surface with the same shape and size as the actual aperture.

In certain cases, Module A determines a P-image at a particular plane of interest by calculating a P-image offset. A P-image offset can refer to an offset distance at the particular plane between a geometric center of the projected image and a vertical axis at the geometric center of the aperture. The P-image offset can be determined based on dimensions of the aperture, the sun azimuth and altitude, and the normal distance between the plane of the aperture and the plane of interest. With the P-image offset, Module A can determine a projection image by building out the projected aperture area around the P-image offset.

Once Module A determines the light projection at a particular plane, Module A determines the amount that the light projection or a glare area associated with the light projection overlaps the occupancy region (i.e. region occupied in the room). An occupancy region can refer to an area at a plane of interest (e.g., plane at a desk) that defines boundaries in space that when crossed by the three-dimensional light projection or the glare area infers a glare scenario. In some cases, an occupancy region may be all or part of a two dimensional surface (e.g., a desk top) or a volume such as a region in front of the occupant's head, possibly including a desktop. If the light projection or glare area is determined to be outside of the occupancy region, a glare scenario is determined to not exist.

In some cases, Module A may calculate a glare area at the plane of interest based on the light projected through one or more apertures. A glare area can refer to an area at a plane of interest that is impinged upon by the light projected through the one or more apertures. In some cases, Module A defines a glare area as an area between the vertical axis at the geometric center of an effective aperture and the outer boundaries of the P-image at the plane of interest. In one case, the geometric center of an aperture can refer to the centroid of the shape of the aperture or the center of mass. The glare area may be defined having different shapes such as, for example, a rectangular, circular, or annular shape, and may be in rectangular or polar coordinates. After determining the glare area from one or more apertures, Module A may then determine that a glare scenario exists if the glare area overlaps with an occupancy region.

In certain cases, Module A determines a tint level based on the calculated amount of overlap of the light projection or the glare area with the occupancy region. For example, if the light projection has any overlap with the occupancy region, Module A may turn on to increase the tint state to address the glare scenario. If the light projection does not overlap with the occupancy region, Module A may return a "clear tint state" command.

Figure 30:
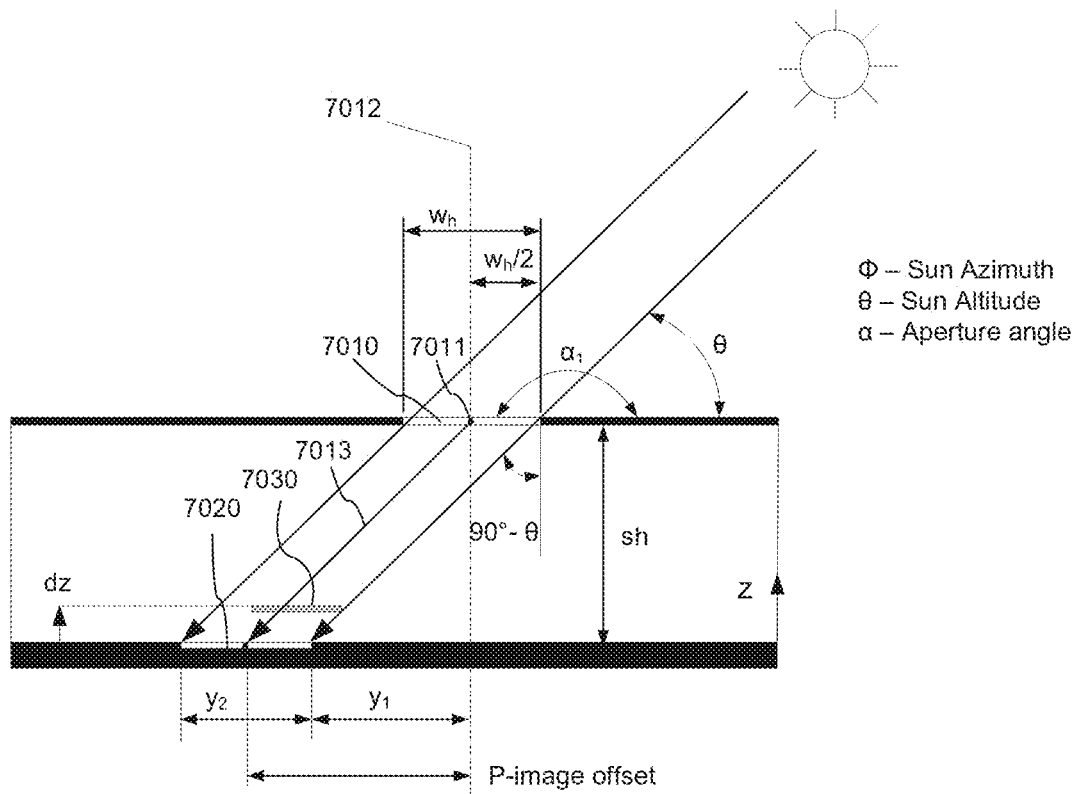
FIG. 30 is a schematic drawing of a side view of a room with a horizontal circular aperture in the form of a skylight to illustrate a three-dimensional projection of light through the room to the floor, according to embodiments.

FIG. 30 illustrates a schematic drawing of a side view of a room with a single horizontal and circular aperture 7010 in the form of a skylight in the ceiling, according to an embodiment. The room has a desk 7030 that defines the occupancy region in the room. The circular aperture 7010 has a diameter of $w_h$. The aperture 7010 is at a Window Azimuth of $\alpha_1$. The geometric center of the circular aperture 7010 is at the center of the circular aperture 7010 at $w_h/2$. A vertical axis 7012 at the geometric center 7011 of the aperture 7010 is shown. Solar radiation from the sun is shown as a three dimensional cylinder of light rays projected to the floor. The Solar radiation is shown having a Sun altitude of θ. In this illustration, the light projection (P-image) 7020 of the aperture 7010 is determined at the plane of the floor as an approximation of a projection at the plane of the desk 7030 at dz. In other examples, aperture 7010 may be projected to other planes such as at the plane at the upper surface of the desk 7030. In certain embodiments of Module A, the P-image offset may be determined by projecting the geometric center of the aperture 7010 to the plane at the floor or other plane of interest along a directional vector 7013 associated with the sun azimuth and altitude. In some cases, the light projection (P-image) 7022 of the aperture 7010 is determined by "building out" the aperture 7010 around the P-image offset. In FIG. 30, the P-image 7020 is shown laterally offset at the floor by a distance of P-image offset from the vertical axis 7012. In this example, Module A defines the glare area by the outer edges of the projection image 7020 at the plane at the floor.

Figure 31:
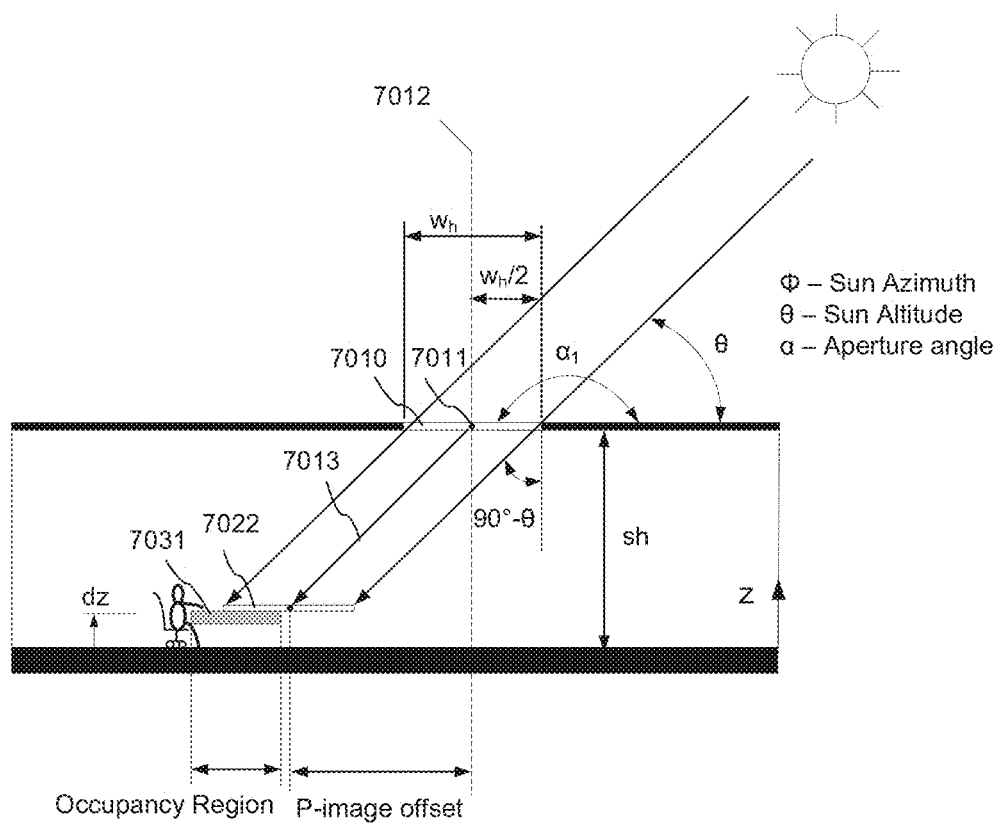
FIG. 31 is a schematic drawing of a side view and a top view of the room of FIG. 30 with projection to a desk in the room, according to an embodiment.
Figure 31:
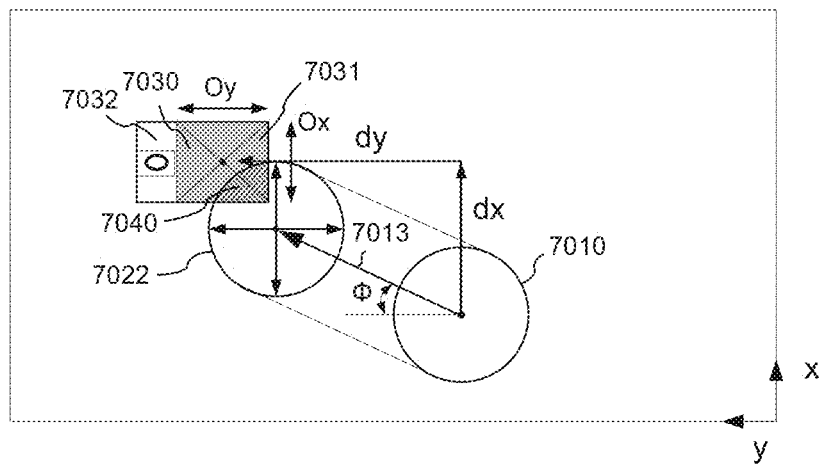

FIG. 31 is a schematic drawing of a side view (top) and a sectional view (bottom) of the room shown in FIG. 30 with the single horizontal circular aperture 7010 in the form of a skylight, according to an embodiment. In this example, the room has a desk 7031 that defines the occupancy region and the light projection (P-image) 7022 is determined at the plane of the desk 7031 at z-position of dz. In this example, the P-image offset is determined by projecting the geometric center of the aperture 7010 along a directional vector 7013 associated with the sun azimuth and altitude to the plane at the desk 7031. The light projection (P-image) 7022 of the aperture 7010 may be determined by "building out" the aperture around the P-image offset. In other cases, a light projection can be determined at a plane at the floor, for example, as shown in FIG. 30. In FIG. 31, the P-image 7022 is shown laterally offset by a distance of a P-image offset from the vertical axis 7012 at the geometric center of the aperture 7010.

In FIG. 31, the bottom illustration is a sectional view of the room at z=dz. In this illustration, the occupancy region 7030 has a centroid that is offset from the vertical axis 7012 by dx and dy at the plane of interest at the desk 7031 at z-position of dz. As shown in FIG. 31, the calculated glare area partially overlaps the occupancy region 7030 defined by the desk 7031 at the plane of interest by an overlapping area 7040. When the glare area exceeds the predetermined threshold (by dimension or-and/or the area) Module A may cause a tint change to reduce glare. The occupancy region 7030 has dimensions $O_x \times O_y$ in the illustration for a rectangular aperture, or may be specified as a diameter for a circle, the facet lengths of a polygon, triangle, trapezoid, or other coordinates appropriate for the aperture. In other examples, the occupancy region may include both the area defined by the desk 7031 and the area 7032 defined by the occupant at the desk 7031. In other examples, there may be multiple occupancy regions associated with multiple occupants. The P-image position will change with the time of day following the directional vector 7013, determined by the azimuth and altitude of the sun, and will illuminate one or more of the occupancy regions in the course of a day. When the overlap exceeds a predetermined threshold Module A will tint the glass to the prescribed value for that occupancy region and time of day.

Figure 32:
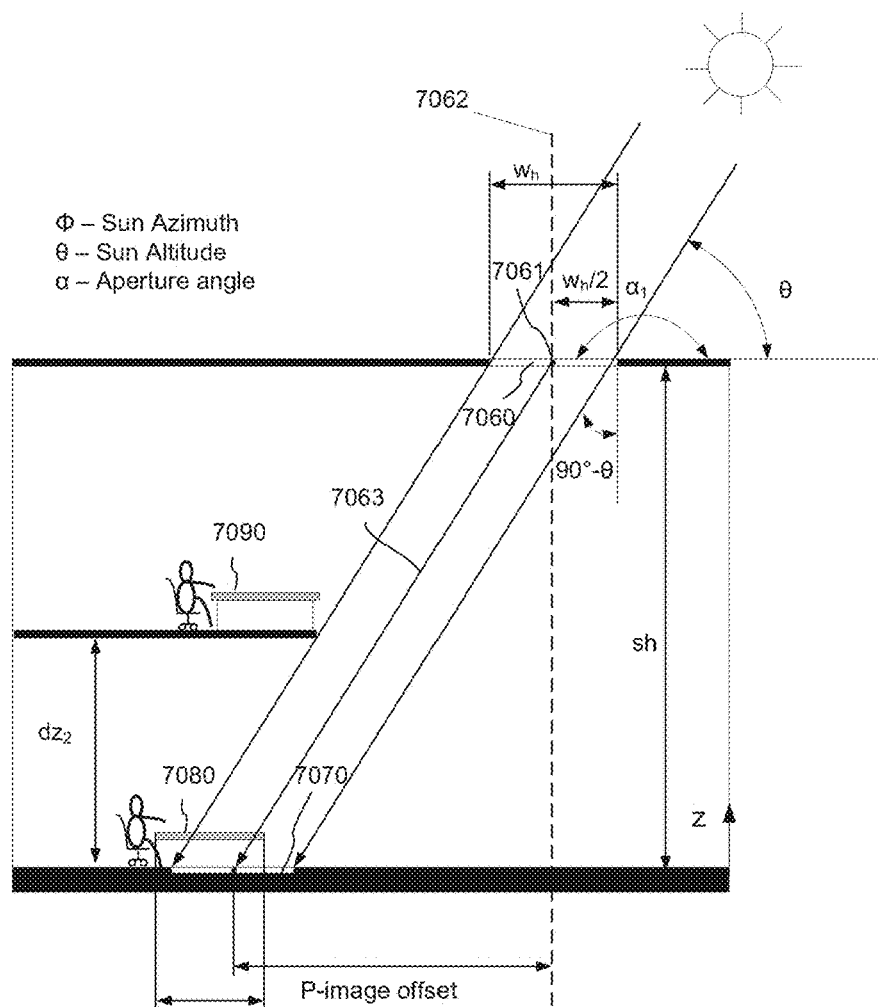
FIG. 32 is a schematic drawing of a side view and a top view of a room with the single horizontal circular aperture in the form of a skylight, according to an embodiment.

FIG. 32 illustrates a schematic drawing of a side view (top) and a sectional view (bottom) of a room having two floors and a horizontal circular aperture 7060 in the form of a skylight, according to an embodiment. In this example, first floor has a desk 7090 and the second floor has a desk 7090. The aperture 7060 has a geometric center 7061. The P-image offset may be determined by projecting the geometric center 7061 along a directional vector 7063 associated with the sun azimuth and altitude to the plane of interest, which in this case is the plane at the floor of the first floor, for example, as an approximation of a projection at the plane of the desk at dz. The light projection (P-image) 7070 of the aperture 7060 is determined by building out the aperture at the P-image offset at the plane of interest. The light projection (P-image) 7070 of the aperture 7060 is shown provided at the plane of the floor and is shown laterally offset by a distance of a P-image offset from the vertical axis 7062 at the geometric center 7061. In this illustration, the occupancy region 7091 of desk 7090 has a centroid that is offset from the vertical axis 7062 by dx2 and dy2 at the plane of the desk 7090 and the occupancy region 7081 of desk 7080 has a centroid that is offset from the vertical axis 7062 by dx1 and dy1 at the plane of the desk 7080. As shown in FIG. 32, the calculated glare area of the light projection 7070 partially overlaps the occupancy region 7081 defined by the desk 7080 at an overlapping area 7095. As shown, the light projection does not provide glare onto the desk 7090 on the second floor.

Figure 33:
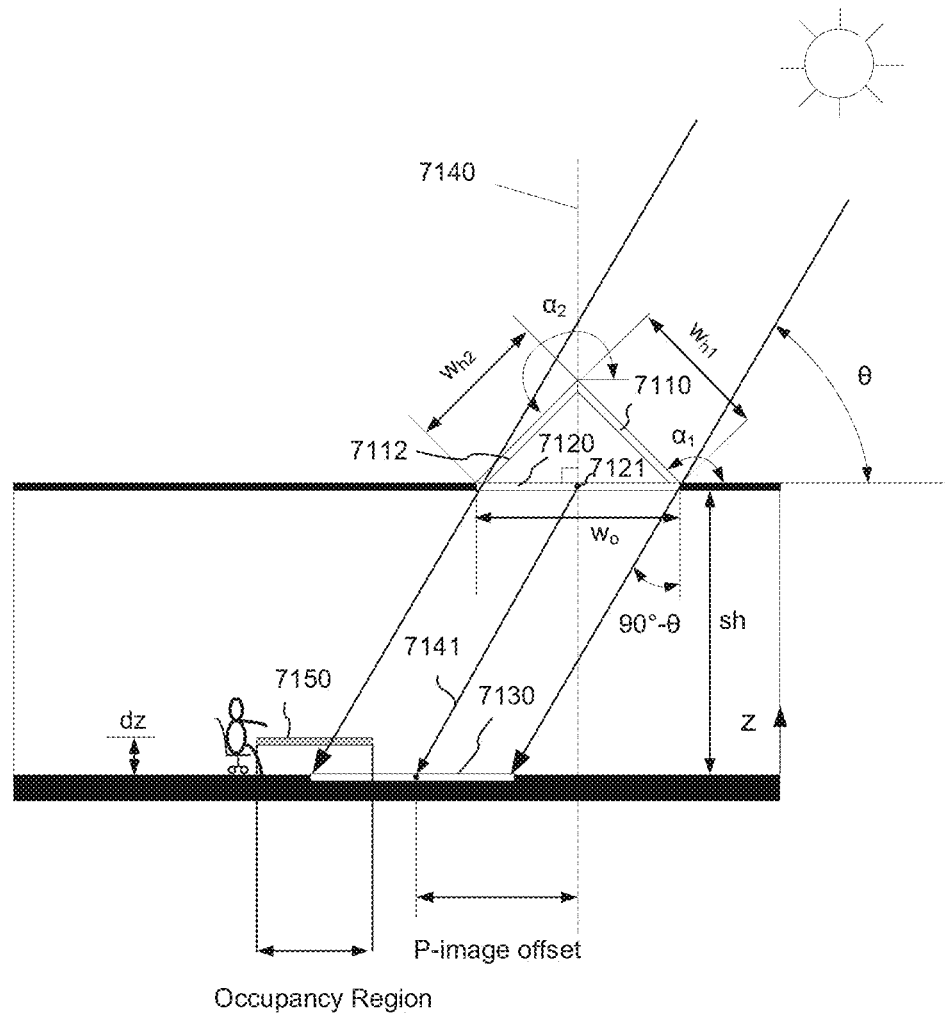
FIG. 33 is a schematic drawing of a side view of a room with a multi-faceted skylight comprising a first aperture and a second aperture, according to an embodiment.

FIG. 33 illustrates a schematic drawing of a side view of a room with a desk 7150, a first aperture 7110, and a second aperture 7112, according to an embodiment. The width of the first aperture 7110 is $w_{h1}$ and the width of the second aperture 7112 is $w_{h2}$. The first aperture 7110 is at an angle from the horizontal of $\alpha_1$, which is 135 degrees in this case. The two apertures 7110 and 7112 have an effective aperture 7120 with a centroid 7121. The first aperture 7110 is at an angle from the horizontal of $\alpha_1$. The second aperture 7112 is at an angle from the horizontal of $\alpha_2$. The P-image offset may be determined by projecting the geometric center of the effective aperture 7120 along a directional vector 7141 associated with the sun azimuth and altitude to the plane at the floor. The light projection (P-image) 7130 of the effective aperture 7120 is provided at the plane of the floor, for example, as an approximation of a projection at the plane of the desk at dz. The P-image 7130 is shown laterally offset by a distance of a P-image offset from the vertical axis 7140 at the geometric center of the effective aperture 7120. The glare area of the P-image 7130 partially overlaps the occupancy region defined by the desk 7150.

Figure 34:
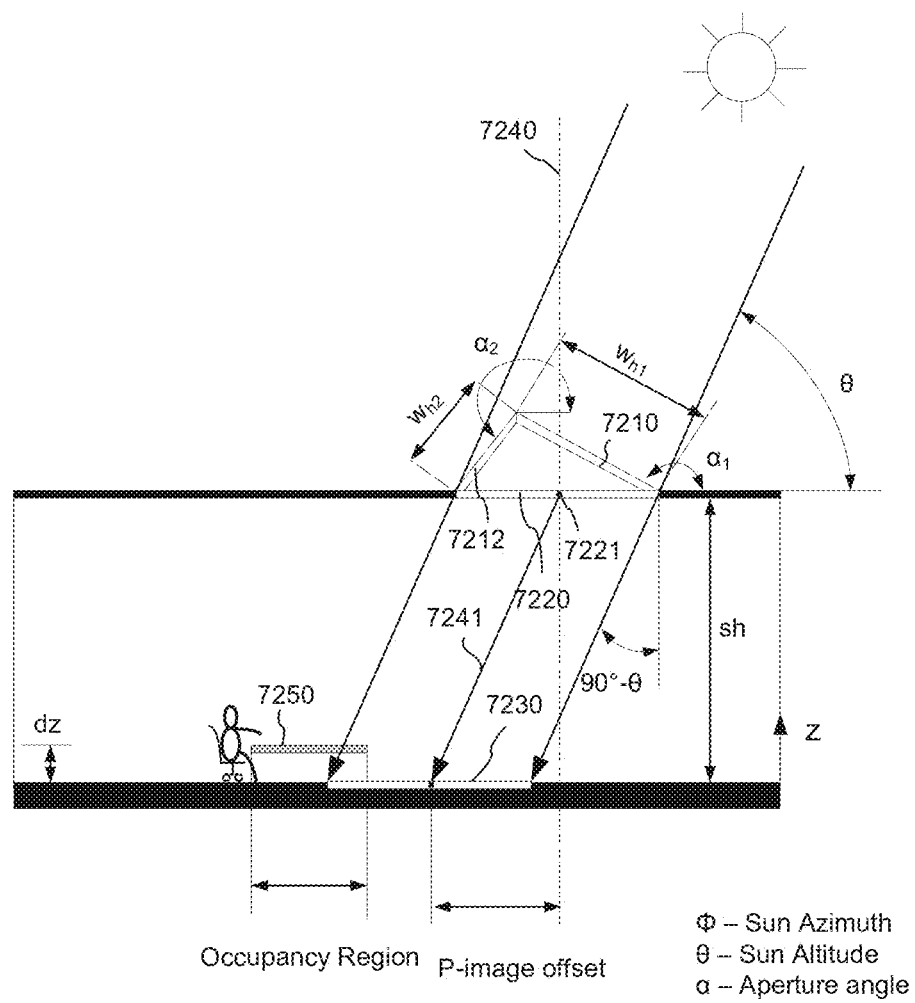
FIG. 34 illustrates a schematic drawing of a side view of a room with a multi-faceted skylight comprising a first aperture and a second aperture, and with a desk, according to an embodiment.

FIG. 34 illustrates a schematic drawing of a side view of a room with a multi-faceted skylight comprising a first aperture 7210 and a second aperture 7212, and with a desk 7250, according to an embodiment. The width of the first aperture 7210 is $w_{h1}$ and the width of the second aperture 7212 is $w_{h2}$. The first aperture 7210 is at an angle from the horizontal of $\alpha_1$. The second aperture 7212 is at an angle from the horizontal of $\alpha_2$. The two apertures 7210 and 7212 have an effective aperture 7220 with a geometric center

7221. The image P-image offset may be determined by projecting the geometric center of the effective aperture 7220 along a directional vector 7241 associated with the sun azimuth and altitude to the plane of interest, which in this case is the plane of the floor, for example, as an approximation of a projection at the plane of the desk at dz. The light projection (P-image) 7230 of the effective aperture 7220 is provided at the plane of the floor. The P-image 7230 is shown laterally offset by a distance of a P-image offset from the vertical axis 7240 at the geometric center of the effective aperture 7220. The glare area of the P-image 7230 partially overlaps the occupancy region defined by the desk 7250.

Figure 35:
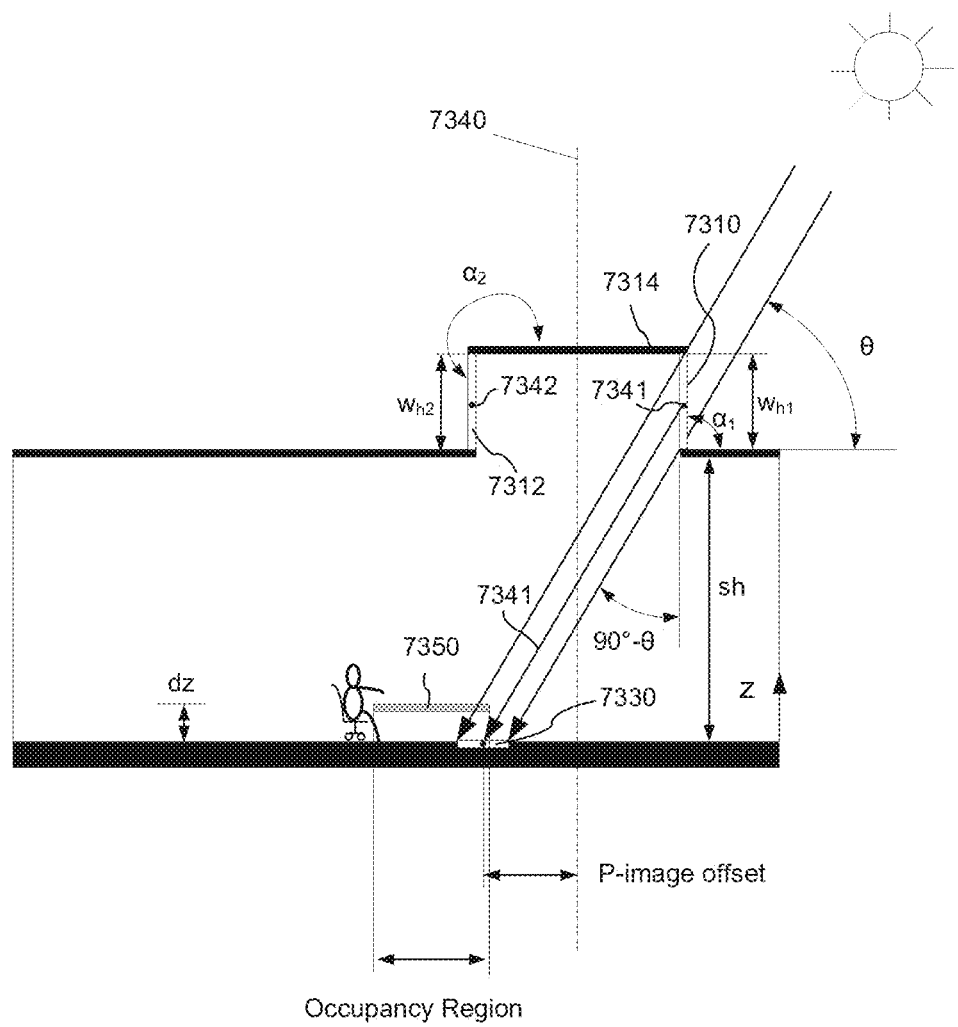
FIG. 35 is a schematic drawing of a side view of a room with a multi-faceted skylight comprising a facet that blocks light, according to an embodiment.

FIG. 35 illustrates a schematic drawing of a side view of a room with a multi-faceted skylight comprising a first aperture 7310, a second aperture 7312, and a facet 7314 without an aperture, according to an embodiment. The room also has a desk 7350. The two apertures 7310 and 7312 have geometric centers 7341 and 7342 respectively. The width of the first aperture 7310 is $w_{h1}$ and the width of the second aperture 7312 is $w_{h2}$. The first aperture 7310 is at an angle from the horizontal of $\alpha_1$, which is 90 degrees in this case. The second aperture 7212 is at an angle from the horizontal of $\alpha_2$, which is 270 degrees in this case. In this illustration, a light projection (P-image) 7330 of the first aperture 7310 is provided at the plane of the floor as an approximation of a projection at the plane of the desk at dz. In this case, the facet 7314 without the aperture can block light from the first and/or second aperture 7312 depending on the direction of the solar radiation. That is, when the sun altitude θ is less than the angle $\alpha_2$ of the second aperture 7321, solar radiation rays do not directly impinge the second aperture 7321 since the facet 7314 is blocking. In the illustration, the sun altitude θ is less than the angle $\alpha_2$ so that the second aperture 7312 does not receive solar radiation. In this case, the effective aperture is only based on the first aperture 7310 and the geometric center of the first aperture 7310 is used to determine the P-image offset and the projection. The P-image offset may be determined by projecting the geometric center of the aperture 7310 along a directional vector 7341 associated with the sun azimuth and altitude to floor. The P-image 7330 of the first aperture 7312 is shown laterally offset by a distance of a P-image offset from the vertical axis 7340 at the geometric center of both first aperture 7310 and the second aperture 7312. The glare area of the P-image 7330 partially overlaps the occupancy region defined by the desk 7350.

Figure 36:
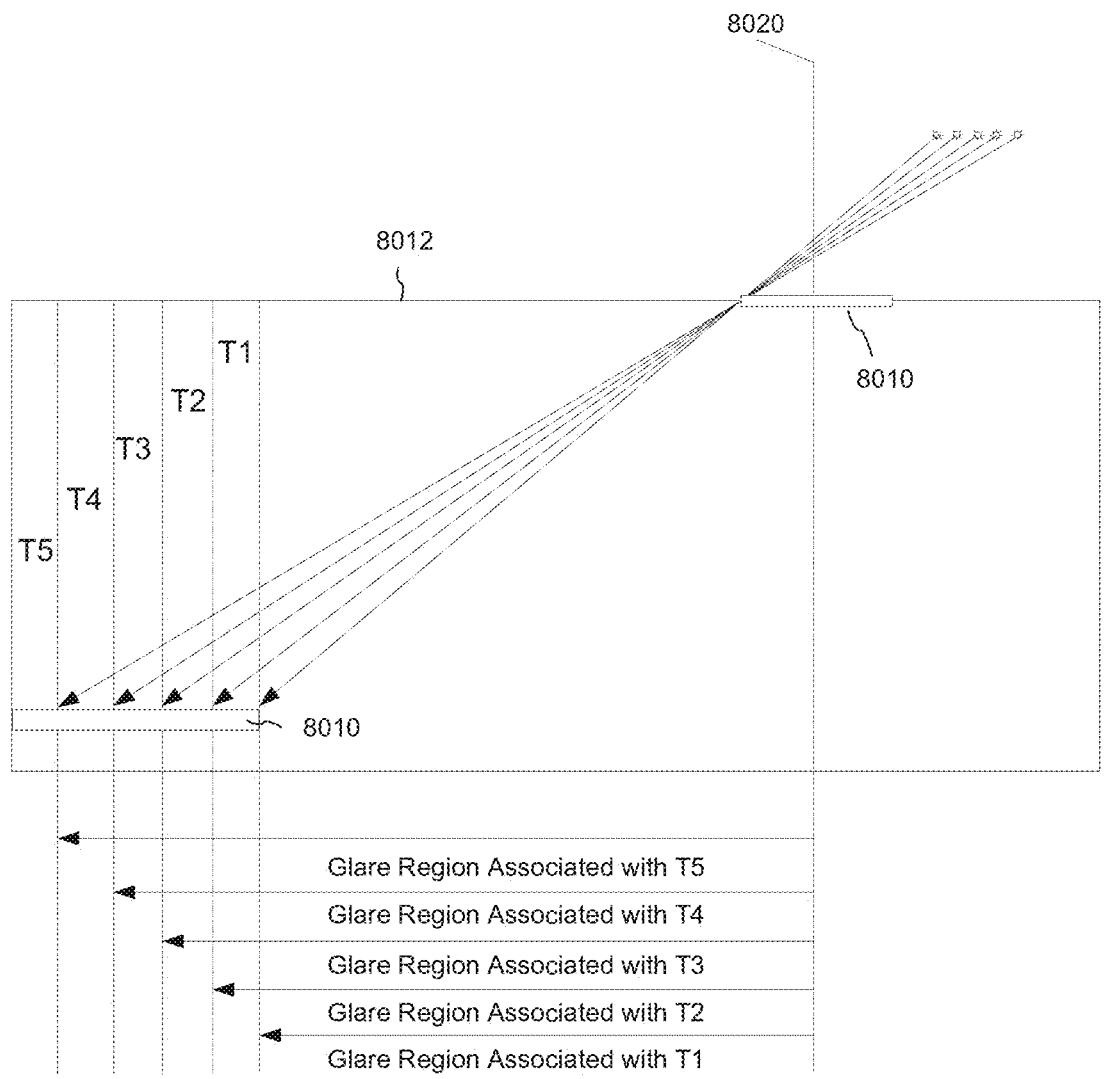
FIG. 36 is a schematic drawing depicting a method that provides an end tint state that corresponds to the relative portion of the occupancy region covered by the glare area, according to an embodiment.

In some cases, the amount of overlap of the occupancy area with the glare area of the P-image can be used by Module A to determine an appropriate tint state. In these cases, Module A may determine higher tint states for higher levels of overlap. In some cases, the tint state is determined based on the amount of overlap. In other cases, the tint state is determined based on the percentage of overlap to the amount of occupancy area used. FIG. 36 depicts a schematic drawing of a room with a skylight having an aperture 8010 and a desk 8012, according to an embodiment. A vertical axis 8020 is shown through the geometric center of the aperture 8010. In this illustration, the sun is shown at five Sun altitudes and the edges of five glare areas are shown corresponding with the five Sun altitudes associated with five directional vectors. The schematic drawing also illustrates a method of determining an appropriate tint state for different overlaps. With each increasing glare area overlapping into the occupancy region defined by the desk 8010, the tint level increases from T1 to T5.

Figure 37:
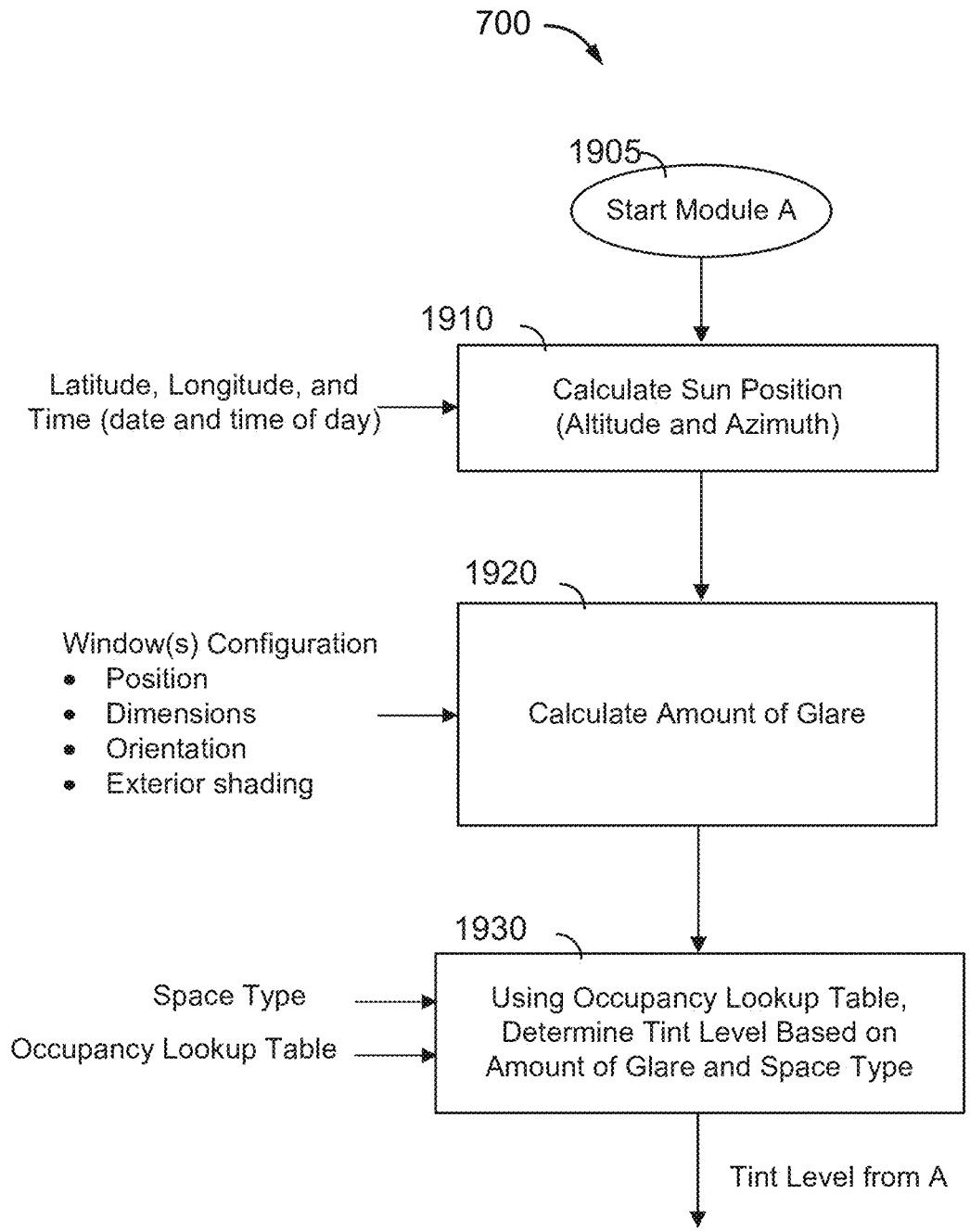
FIG. 37 is a flowchart with details of step 700 of FIG. 8 corresponding to an embodiments of Module A that use a three dimensional light projection.

FIG. 37 is a flowchart showing details of step 700 of FIG. 8 with a Module A that uses a three dimensional light projection, according to embodiments. At step 1905, Module A begins. At step 1910, the window controller 450 uses Module A to calculate the position of the sun for the latitude and longitude coordinates of the building and the date and time of day of a particular instant in time, $t_i$. The latitude and longitude coordinates may be input from the configuration file. The date and time of day may be based on the current time provided by the timer. The sun position is calculated at the particular instant in time, $t_i$, which may be in the future in some cases. In other embodiments, the position of the sun is calculated in another component (e.g., module) of the predictive control logic. The sun position is calculated in terms of Sun azimuth and/or Sun altitude.

At step 1920, window controller 450 uses Module A to calculate the amount of glare into a room or whether there is a glare at a particular instant in time used in step 1910. Module A calculates the amount of glare using a three-dimensional projection of light rays through the room from the one or more unblocked apertures (e.g., windows) based on a direction vector determined by the sun azimuth and altitude. Module A determines the P-image(s) of the one or more unblocked apertures using the directional vector and the configuration information. The configuration information may include one or more of the location of the one or more apertures (e.g. electrochromic windows), the dimensions of the one or more apertures, whether the apertures are blocked or unblocked, the orientation of each of the one or more apertures, the dimensions of the room, and any details regarding exterior shading or other structures that may be blocking the solar radiation from entering the one or more apertures. The window configuration information is input from the configuration file associated with the electrochromic window 505. Module A determines the amount of glare or determination of glare in a room based on an intersection of the P-image of the unblocked apertures with an occupancy region at a particular plane of interest. In some cases, Module A determines which of the one or more apertures is unblocked i.e., receiving solar radiation. For example, in FIG. 35, the second aperture 7342 oriented at 270 degrees is blocked from receiving the solar radiation in the illustration. To determine the P-image(s) of the unblocked apertures at a particular plane of interest, Module A first determines a geometric center of the one or more unblocked apertures. In some cases, the geometric center may be the combined centroid of the shapes of the apertures. Module A then determines a P-image offset by projecting the geometric center of the one or more unblocked apertures in the direction of the directional vector of the three-dimensional projection of light based on the sun azimuth and altitude to the plane of interest. The directional vector of the three-dimensional projection of light is based on the sun azimuth and Sun altitude calculated at the particular instant in time in step 1910. Module A determines the P-image offset based on the geometric center of the one or more unblocked apertures, the directional vector associated with the sun azimuth and altitude, and the normal distance between the one or more apertures and the plane of interest. Module A then "builds out" a P-image by generating an effective aperture area around the projected geometric center of the one or more unblocked apertures at the plane of interest. In certain cases, Module A determines the glare area based on the outer boundaries of the P-image at the plane of interest. Illustrations of glare area determined for different aperture arrangements are shown in FIGS. 31-37.

At step 1930, a tint level is determined that will provide occupant comfort from the amount of glare from the P-image(s) of the unblocked apertures determined in step 1920.

At step 1930, Module A determines the amount of overlap between the occupancy area and the p-image(s) of the unblocked apertures. Based on the amount of overlap, Module A determines a desired tint level for the determined amount of overlap in the occupancy lookup table. The occupancy lookup table is provided as input from the configuration file for the particular aperture. In some cases, the amount of overlapping area or percentage of encroachment (i.e. percentage of overlapping area of the occupancy area) may be used to determine the end tint state. For example, Module A may not increase tint state if there is a little to no overlapping area (e.g. a small corner of a desk). A larger amount or percentage of overlapping area (e.g., more than 50% of a desk) may result in a higher tint state.

Figure 38:
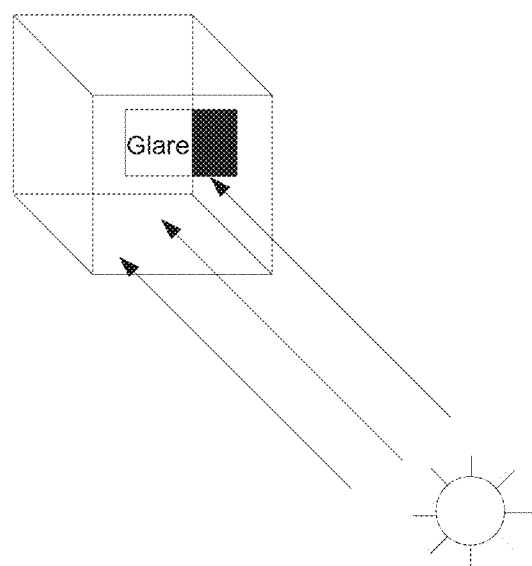
FIG. 38 is a schematic drawing of a side view of a room with several multi-faceted skylights and a projection, according to embodiments.

FIG. 38 illustrates a schematic drawing of a three dimensional projection of light intersecting a portion of a surface with glare, according to embodiments.

Modifications, additions, or omissions may be made to any of the above-described predictive control logic, other control logic and their associated control methods (e.g., logic described with respect to FIG. 18, logic described with respect to FIGS. 7, 8, 9, 12, and 13, and logic described with respect to FIG. 14) without departing from the scope of the disclosure. Any of the logic described above may include more, fewer, or other logic components without departing from the scope of the disclosure. Additionally, the steps of the described logic may be performed in any suitable order without departing from the scope of the disclosure.

Also, modifications, additions, or omissions may be made to the above-described systems (e.g., system described with respect to FIG. 17) or components of a system without departing from the scope of the disclosure. The components of the system may be integrated or separated according to particular needs. For example, the master network controller 1403 and intermediate network controller 1405 may be integrated into a single window controller. Moreover, the operations of the systems can be performed by more, fewer, or other components. Additionally, operations of the systems may be performed using any suitable logic comprising software, hardware, other logic, or any suitable combination of the preceding.

It should be understood that the present invention as described above can be implemented in the form of control logic using computer software in a modular or integrated manner Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Python using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. An apparatus for controlling tint of one or more tintable windows comprising at least one controller configured to:
    (a) communicatively couple to the one or more tintable window;
    (b) receive, or direct receipt of, a schedule generated by a user in which the user selects an occupancy lookup table that comprises spatial occupancy configuration of a space in which the one or more tintable windows are disposed; and
    (c) instruct, or direct instructing, the one or more tintable windows to transition or maintain the tint based at least in part on the schedule.

2. The apparatus of claim 1, wherein the spatial occupancy configuration comprises (I) an arrangement of internal building elements, (II) an arrangement of a desk and/or a wall, and/or (III) an arrangement of a workspace.

3. A method of controlling tint of one or more tintable windows, the method comprising:
    (a) receiving a schedule generated by a user in which the user selects an occupancy lookup table that comprises spatial occupancy configuration of a space in which the one or more tintable windows are disposed; and
    (b) transitioning or maintaining the tint based at least in part on the schedule.

4. The method of claim 3, wherein the spatial occupancy configuration comprises (I) an arrangement of internal building elements, (II) an arrangement of a desk and/or a wall, and/or (III) an arrangement of a workspace.

5. A non-transitory computer readable media for controlling tint of one or more tintable windows, the non-transitory computer readable media, when read by at least one processor, is configured to execute operations comprising:
    (a) receiving, or direct receiving, a schedule generated by a user in which the user selects an occupancy lookup table that comprises spatial occupancy configuration of a space in which the one or more tintable windows are disposed; and
    (b) instructing, or direct instructing, the one or more tintable windows to transition or maintain the tint based at least in part on the schedule.

6. The non-transitory computer readable media of claim 5, wherein the spatial occupancy configuration comprises (I) an arrangement of internal building elements, (II) an arrangement of a desk and/or a wall, and/or (III) an arrangement of a workspace.

* * * * *